US011312836B2

(12) United States Patent
Constantinou et al.

(10) Patent No.: US 11,312,836 B2
(45) Date of Patent: Apr. 26, 2022

(54) METHODS OF MANUFACTURING ARTICLES UTILIZING FOAM PARTICLES

(71) Applicant: NIKE, Inc., Beaverton, OR (US)

(72) Inventors: Jay Constantinou, Beaverton, OR (US); Harleigh Doremus, Portland, OR (US); Luis Folgar, Beaverton, OR (US); Brandon Kvamme, Beaverton, OR (US); Joseph Thomas Muth, North Plains, OR (US); Denis Schiller, Vancouver, WA (US)

(73) Assignee: NIKE, Inc., Beaverton, OR (US)

( * ) Notice: Subject to any disclaimer, the term of this patent is extended or adjusted under 35 U.S.C. 154(b) by 214 days.

(21) Appl. No.: 16/688,501

(22) Filed: Nov. 19, 2019

(65) Prior Publication Data
US 2020/0181352 A1 Jun. 11, 2020

Related U.S. Application Data

(60) Provisional application No. 62/776,124, filed on Dec. 6, 2018, provisional application No. 62/776,129, filed on Dec. 6, 2018.

(51) Int. Cl.
C08J 9/232 (2006.01)
C08J 9/224 (2006.01)
B41M 5/00 (2006.01)

(52) U.S. Cl.
CPC ............ C08J 9/232 (2013.01); B41M 5/0041 (2013.01); C08J 9/224 (2013.01); C08J 2203/22 (2013.01); C08J 2387/00 (2013.01)

(58) Field of Classification Search
CPC ........ C08J 9/232; C08J 9/224; C08J 2203/22; C08J 2387/00; C08J 2367/00; C08J 9/236;
(Continued)

(56) References Cited

U.S. PATENT DOCUMENTS 3,503,840 A 3/1970 Parrish
4,252,910 A 2/1981 Schaefer
(Continued)

FOREIGN PATENT DOCUMENTS

CN 2888936 Y 4/2007
CN 101016385 8/2007
(Continued)

OTHER PUBLICATIONS

International Search Report issued for PCT/US2019/062249, dated Feb. 5, 2020.
(Continued)

Primary Examiner — Kara B Boyle
(74) Attorney, Agent, or Firm — Thomas | Horstemeyer, LLP

(57) ABSTRACT

Methods for manufacturing articles, including articles of footwear, apparel, and sporting equipment are provided. The methods comprise decorating a plurality of foam particles. The decorating can comprise applying a coating on the foam particles, or embossing or debossing the foam particles, or both. The decorating can comprise applying a coating on the foam particles by printing, painting, dyeing, applying a film, or any combination thereof. The plurality of foam particles are affixed utilizing aspects of additive manufacturing methods. This abstract is intended as a scanning tool for purposes of searching in the particular art and is not intended to be limiting of the present disclosure.

20 Claims, 14 Drawing Sheets

(58) Field of Classification Search
CPC .............. B41M 5/0041; B41M 5/0088; B41M 5/0094; B41M 1/04; B41M 5/0052; B41M 1/30; B41M 1/40; B41M 5/0064; B41M 5/0047; B41M 1/12; A43B 13/04; A43B 13/00; B33Y 80/00; B29D 35/122
See application file for complete search history.

(56) References Cited

U.S. PATENT DOCUMENTS

| | | | |
|---|---|---|---|
| 5,007,111 | A | 4/1991 | Adams |
| 6,219,939 | B1 | 4/2001 | Kita et al. |
| 6,300,386 | B1 | 10/2001 | Karukaya et al. |
| 7,202,284 | B1 | 4/2007 | Limerkens et al. |
| 7,207,125 | B2 | 4/2007 | Jeppesen et al. |
| 7,797,856 | B2 | 9/2010 | Andrews et al. |
| 8,327,559 | B2 | 12/2012 | Berger et al. |
| 8,414,811 | B1 | 4/2013 | De Santis et al. |
| 2002/0045040 | A1 | 4/2002 | Kanada et al. |
| 2002/0093115 | A1 | 7/2002 | Jang et al. |
| 2004/0140078 | A1 | 7/2004 | Liu et al. |
| 2004/0162358 | A1 | 8/2004 | Yamamoto et al. |
| 2004/0265504 | A1 | 12/2004 | Magnin et al. |
| 2005/0049322 | A1 | 3/2005 | Kanada et al. |
| 2006/0026863 | A1 | 2/2006 | Liu |
| 2006/0061000 | A1 | 3/2006 | Chun et al. |
| 2007/0182070 | A1 | 8/2007 | Monsheimer et al. |
| 2007/0238056 | A1 | 10/2007 | Baumann et al. |
| 2007/0295451 | A1 | 12/2007 | Willis |
| 2008/0161438 | A1 | 7/2008 | Wang et al. |
| 2009/0145004 | A1 | 6/2009 | Jones |
| 2009/0277047 | A1 | 11/2009 | Polegato Moretti |
| 2009/0313853 | A1 | 12/2009 | Tadin |
| 2010/0047550 | A1 | 2/2010 | Prissok et al. |
| 2010/0178488 | A1 | 7/2010 | Yasuda et al. |
| 2010/0222442 | A1 | 9/2010 | Prissok et al. |
| 2010/0287795 | A1 | 11/2010 | Van Niekerk |
| 2011/0047720 | A1 | 3/2011 | Maranan et al. |
| 2011/0266717 | A1 | 11/2011 | Nehls et al. |
| 2011/0283560 | A1 | 11/2011 | Portzline et al. |
| 2012/0302655 | A1 | 11/2012 | Kanada et al. |
| 2013/0017391 | A1 | 1/2013 | Kato et al. |
| 2013/0227861 | A1 | 9/2013 | Prissok et al. |
| 2014/0096882 | A1 | 4/2014 | Kitano et al. |
| 2014/0115925 | A1 | 5/2014 | Hurd et al. |
| 2014/0223783 | A1 | 8/2014 | Wardlaw et al. |
| 2014/0259801 | A1 | 9/2014 | Grondin |
| 2014/0272379 | A1 | 9/2014 | Watkins et al. |
| 2015/0258707 | A1 | 9/2015 | Hirata |
| 2015/0273572 | A1 | 10/2015 | Ederer et al. |
| 2015/0290877 | A1 | 10/2015 | Darland |
| 2015/0290893 | A1 | 10/2015 | Darland |
| 2016/0067916 | A1 | 3/2016 | Hirata et al. |
| 2016/0075113 | A1 | 3/2016 | Chang et al. |
| 2016/0144573 | A1 | 5/2016 | Hirata et al. |
| 2016/0227876 | A1 | 8/2016 | Le et al. |
| 2016/0325495 | A1 | 11/2016 | Kuhn et al. |
| 2016/0353833 | A1 | 12/2016 | Hesterberg et al. |
| 2017/0072599 | A1 | 3/2017 | Huang et al. |
| 2018/0035755 | A1* | 2/2018 | Reinhardt ................ C08J 9/232 |
| 2018/0162048 | A1 | 6/2018 | Gibson et al. |
| 2019/0126541 | A1 | 5/2019 | Chaffins et al. |

FOREIGN PATENT DOCUMENTS

| | | |
|---|---|---|
| CN | 102741038 | 10/2012 |
| CN | 103717658 | 4/2014 |
| CN | 105121528 | 12/2015 |
| CN | 105167320 | 12/2015 |
| CN | 107353428 A | 11/2017 |
| CN | 109476081 A | 3/2019 |
| DE | 3605662 C1 | 6/1987 |
| DE | 102010041521 A1 | 3/2012 |
| DE | 102011108744 A1 | 1/2013 |
| EP | 1852242 A1 | 11/2007 |
| EP | 1979401 A1 | 10/2008 |
| EP | 2649896 A2 | 10/2013 |
| EP | 3132703 A1 | 2/2017 |
| EP | 366107 A1 | 6/2020 |
| JP | 2002361749 A1 | 12/2002 |
| WO | 8906501 A1 | 7/1989 |
| WO | 9606881 A2 | 3/1996 |
| WO | 9929203 A1 | 6/1999 |
| WO | 02061011 A1 | 8/2002 |
| WO | 2006015440 A1 | 2/2006 |
| WO | 2007025690 A1 | 3/2007 |
| WO | 2009055451 A1 | 4/2009 |
| WO | 2009095935 A1 | 8/2009 |
| WO | 2009146368 A | 12/2009 |
| WO | 2012065926 A | 5/2012 |
| WO | 2013013784 A1 | 1/2013 |
| WO | 2014126799 A1 | 8/2014 |
| WO | 2014150119 A1 | 9/2014 |
| WO | 2014150122 A2 | 9/2014 |
| WO | 2015200179 A1 | 12/2015 |
| WO | 2016146537 A1 | 9/2016 |
| WO | 2016186837 A1 | 11/2016 |

OTHER PUBLICATIONS

International Search Report issued for PCT/US2019/062275, dated Feb. 11, 2020.
Bast: "Infinergy. The first expanded TPU—as elastic as rubber but lighter", Jan. 1, 2013, XP055496693, Retrieved from the Internet: URL:https://www.basf.com/documents/cn/en/chinaplas/InfinergyEN_updated.pdf [retrieved on Aug. 1, 2018].
Hartmann, M., Jan. 31, 2013, machine translation of DE102011108744 (Year: 2013).
International Preliminary Report on Patentability for PCT/2018/035561 dated Aug. 16, 2019.
International Search Report and Written Opinion for PCT/2016/030656 dated Mar. 8, 2016.
International Search Report and Written Opinion for PCT/2018/035554 dated Sep. 17, 2018.
International Search Report and Written Opinion for PCT/2018/035561 dated Sep. 17, 2018.
International Preliminary Report on Patentability for PCT/2018/035554 dated Jun. 5, 2019.
Written Opinion for PCT/2018/035561 dated May 31, 2019.
Chengbiao Ge el. al, "Steam-chest molding of expanded thermoplastic polyu-rethane bead foams and their mechanical properties", published in Chemical Engineering Science 174 (2017) 337-346 on Sep. 8, 2017.
International Preliminary Report on Patentability for PCTUS2019062275 dated Jun. 26, 2020.
Search Report for European Application No. 20154428.5 dated Apr. 2, 2020.
Search Report for International Application No. PCTUS201422278 dated Aug. 1, 2014.
Written Opinion of the International Preliminary Examining Authority for PCTUS2019062249 dated Jun. 22, 2020.
International Preliminary Report on Patentability for PCT/US2019/062249 dated Mar. 10, 2021.
International Preliminary Report on Patentability for PCT/US2020/061016 dated Sep. 1, 2021.

* cited by examiner

METHODS OF MANUFACTURING ARTICLES UTILIZING FOAM PARTICLES

CROSS-REFERENCE TO RELATED APPLICATIONS

This application claims the benefit of U.S. Provisional Application Nos. 62/776,124 and 62/776,129, each filed on Dec. 6, 2018, each of which is incorporated herein by reference in its entirety.

TECHNICAL FIELD

The present disclosure generally relates to methods of manufacturing and decorating articles utilizing foam particles in an additive manufacturing method.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

DETAILED DESCRIPTION

Figure 1:
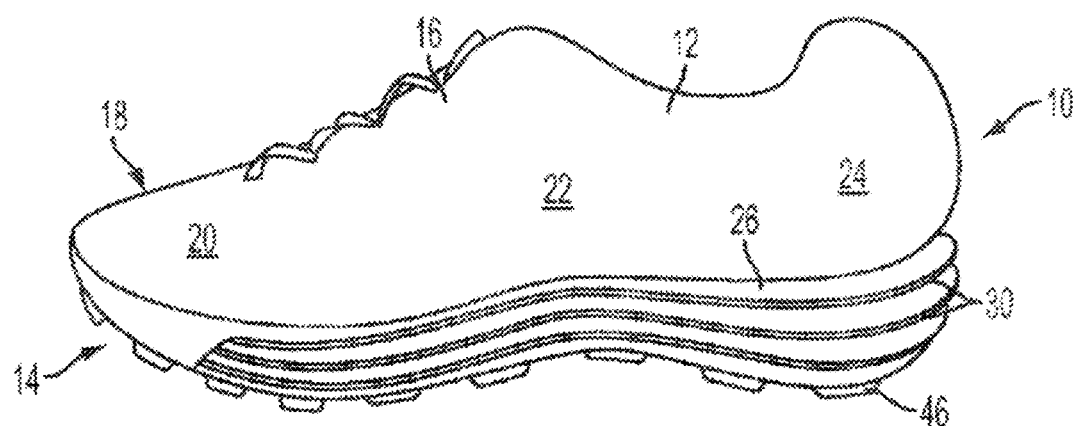
FIG. 1 is an elevation view of an article of footwear with a sole component according to the present disclosure.

The present disclosure pertains to methods of decorating components formed from a plurality of affixed foam particles. The present disclosure also pertains to articles including the decorated components formed from a plurality of foam particles, including articles manufactured according to the manufacturing methods described herein, which include aspects of additive manufacturing methods. These new methods of manufacturing which include aspects of additive manufacturing methods offer new ways to integrate decorating steps into the manufacturing processes, as well as unique and aesthetically appealing decorated components.

These manufacturing methods which incorporate aspects of additive manufacturing are highly desirable for manufacturing many types of articles due the speed, customizability, and flexibility of these methods. In particular, these manufacturing methods are useful alternatives for manufacture of components that are currently manufactured by traditional molding, casting, or machining methods at great expense or with great difficulty. In some cases, the desired component may not even be suitable to manufacture by traditional molding, casting, or machining methods.

In has been found that aspects of certain additive manufacturing methods can be used with foam particles comprising thermoplastic elastomers. The ability to use foam particles in additive manufacturing methods permits methods to manufacture components with properties, e.g., bulk density, that are not possible using polymeric powders. The disclosed methods can comprise affixing a plurality of foam particles to each other to form a structure, as well as affixing the plurality of foam particles to a surface of a component such as a textile element or a solid resin element. The resulting structures also have a unique physical appearance. The disclosed methods further comprise decorating such structures using various techniques, such as by coating the foam particles or the structures, embossing or debossing the structures, or both.

Moreover, it has been found that the disclosed methods permit the decoration of articles that combines the useful performance and material properties found with foamed polymeric materials in processes with the flexibility, customizability, and rapid throughput of an additive manufacturing method. In particular, it has been found that the disclosed decorating methods using foam particles can be used to decorate components used in the manufacture of footwear, such as pre-forms, midsoles, outsoles, sockliners, and heel-cushioning pads. It has been found that the disclosed methods decrease article decoration and build time by at least one-third while permitting the fabrication of components with a plurality of sub-regions comprising differentially affixed foam particles. The plurality of sub-regions can be discrete regions comprising desired geometries and/or shapes. Alternatively, the article can comprise a gradient of differentially affixed foam particles. It has been found that the method can provide a decorated article with a regions of highly affixed foam particles such as an article exterior edge or an interior edge delineating a sub-region within which are completely un-affixed foam particles.

The present disclosure is directed to a method of forming an article, the method comprising decorating a portion of a plurality of foam particles. Optionally, the method can further comprise arranging the plurality of foam particles, wherein the arranged plurality of foam particles comprises a first thermoplastic elastomeric material, and wherein the arranged plurality of foam particles has a number average particle size of about 0.04 millimeters to about 10 millimeters in a longest dimension and affixing together at least a portion of the plurality of foam particles, wherein the arranging and affixing are carried out for two or more iterations, forming a component. When the method further comprises the arranging and affixing, the decorating can occur before, during or after the arranging and affixing. The decorating can occur during the affixing. The decorating can occur following the affixing. The decorating can comprise applying a coating on the portion, or embossing or debossing the portion, or both. The decorating can comprise applying a coating on the portion, wherein applying the coating further comprises printing on the portion, painting on the portion, dyeing the portion, applying a film on the portion, or any combination thereof.

The present disclosure is also directed to a method of forming an article, the method comprising arranging a plurality of foam particles, wherein the arranged plurality of foam particles comprises a first thermoplastic elastomeric material, and wherein the arranged plurality of foam particles has a number average particle size of about 0.04 millimeters to about 10 millimeters in a longest dimension and affixing together at least a portion of the plurality of foam particles with a first binding material, wherein the arranging and affixing are carried out for two or more iterations, forming a component, wherein the affixing together at least a portion of the plurality of foam particles comprises: depositing the first binding material in a binding material target area, wherein the binding material target area comprises at least a portion of the arranged plurality of foam particles, and wherein the depositing coats at least a portion of defining surfaces of the arranged plurality of foam particles with the first binding material; and curing deposited first binding material coating on at least a portion of the defining surfaces of the arranged plurality of foam particles within at least the first binding material target area, wherein curing comprises affixing at least a portion of the arranged plurality of foam particles within the target area. The method can further comprise using a second binding material to affix a second portion of the plurality of foam particles, or to affix a second plurality of foam particles in the manner described above, except using the second binding material. The first binding material can impart a first color to the foam particles, and the second binding material can impart a second color to the foam particles which differs from the first color in at least one of hue, value and chroma.

The present disclosure is also directed to an article comprising: a decorated component formed of a plurality of affixed foam particles, wherein each individual foam particle of the plurality of affixed foam particles is formed of a thermoplastic elastomeric material, and includes one or more binding regions on an outer surface of the individual foam particle affixing the individual foam particle to one or more adjacent foam particles, the one or more adjacent foam particles comprise a thermoplastic elastomeric material, the component formed of the plurality of affixed foam particles includes a plurality of gaps between foam particles; wherein, prior to affixing, the plurality of foam have a number average particle size of about 0.04 millimeters to about 10 millimeters in a longest dimension; and wherein a portion of the plurality of affixed foam particles of the component comprises a coating, or a surface of the component including a portion of foam particles is embossed or debossed, or both.

In a first aspect, the present disclosure is directed to a method of forming an article, the method comprising: decorating a portion of a plurality of foam particles, wherein the method optionally further comprises: arranging a plurality of foam particles, wherein the arranged plurality of foam particles comprises a first thermoplastic elastomeric material, and wherein the arranged plurality of foam particles has a number average particle size of about 0.04 millimeters to about 10 millimeters in a longest dimension; and affixing together at least a portion of the plurality of foam particles, wherein the arranging and affixing are carried out for two or more iterations, forming a component.

In a second aspect, the present disclosure is directed to an article made by a disclosed method.

In a third aspect, the present disclosure is directed to article comprising: a component formed of a plurality of affixed foam particles, wherein each individual foam particle of the plurality of affixed foam particles is formed of a thermoplastic elastomeric material, and includes one or more binding regions on an outer surface of the individual foam particle affixing the individual foam particle to one or more adjacent foam particles, the one or more adjacent foam particles comprise a thermoplastic elastomeric material, the component formed of the plurality of affixed foam particles includes a plurality of gaps between foam particles; wherein, prior to affixing, the plurality of foam have a number average particle size of about 0.04 millimeters to about 10 millimeters in a longest dimension; and wherein a portion of the plurality of affixed foam particles of the component comprises a coating, or a surface of the component including a portion of foam particles is embossed or debossed, or both.

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A method of forming an article, the method comprising: decorating a portion of a plurality of foam particles, wherein the method optionally further comprises: arranging a plurality of foam particles, wherein the arranged plurality of foam particles comprises a first thermoplastic elastomeric material, and wherein the arranged plurality of foam particles has a number average particle size of about 0.04 millimeters to about 10 millimeters in a longest dimension; and affixing together at least a portion of the plurality of foam particles, wherein the arranging and affixing are carried out for two or more iterations, forming a component.

Aspect 2. The method according to any one of Aspects 1 to 95, wherein the decorating comprises: applying a coating on the portion; or embossing or debossing the portion; or both.

Aspect 3. The method according to any one of Aspects 1 to 95, wherein the applying the coating on the portion of the plurality of foam particles comprises printing on the portion, painting on the portion, dyeing the portion, applying a film on the portion, or any combination thereof.

Aspect 4. The method according to any one of Aspects 1 to 95, wherein the portion of the plurality of foam particles have a first color, and the coating has a second color which is different than the first color.

Aspect 5. The method according to any one of Aspects 1 to 95, wherein, when measured according to the CIE 1976 color space under a given illumination condition at an observation angle between −15 degrees and +60 degrees, the first color has a first color measurement having coordinates L1* and a1* and b1*, and the second color has a second color measurement having coordinates L2* and a2* and b2*, wherein: the L1* value is at least 10 percent greater or lesser than the L2* value; the a1* coordinate value is at least 10 percent greater or lesser than the a2* coordinate value; the b1* coordinate value is at least 10 percent greater or lesser than the b2* coordinate value; or a combination thereof.

Aspect 6. The method according to any one of Aspects 1 to 95, wherein, when measured according to the CIE 1976 color space under a given illumination condition at an observation angle between −15 degrees and +60 degrees, the first color has a first color measurement having coordinates L1* and a1* and b1*, and the second color has a second color measurement having coordinates L2* and a2* and b2*, wherein the L1* and L2* values may be the same or different, wherein the a1* and a2* coordinate values may be the same or different, wherein the b1* and b2* coordinate values may be the same or different, and wherein the ΔE*ab between the first color measurement and the second color measurement is greater than or equal to about 60, where $\Delta E^{*}ab=[(L1^{*}-L2^{*})^{2}+(a1^{*}-a2^{*})^{2}+(b1^{*}-b2^{*})^{2}]^{1/2}$, optionally is greater than or equal to about 80, or optionally is greater than or equal to about 100.

Aspect 7. The method according to any one of Aspects 1 to 95, wherein, when measured according to the CIELCH color space under a given illumination condition at an observation angle between −15 degrees and +60 degrees, the first color has a first color measurement having coordinates $L_1^*$ and $C_1^*$ and $h_1°$, and the second color has a second color measurement having coordinates $L_2^*$ and $C_2^*$ and $h_1°$, wherein: the $L_1^*$ value is at least 10 percent greater or lesser than the $L_2^*$ value; the $C_1^*$ coordinate value is at least 10 percent greater or lesser than the $C_2^*$ coordinate value; the $h_1°$ coordinate value is at least 10 percent greater or lesser than the $h_2°$ coordinate value; or a combination thereof.

Aspect 8. The method according to any one of Aspects 1 to 95, wherein the arranging a plurality of foam particles comprises depositing an essentially planar layer comprising the plurality of foam particles.

Aspect 9. The method according to any one of Aspects 1 to 95, wherein the arranging a plurality of foam particles comprises arranging a plurality of first foam particles comprising a first thermoplastic elastomeric material and a plurality of second foam particles comprising a second thermoplastic elastomeric material.

Aspect 10. The method according to any one of Aspects 1 to 95, wherein the method comprises mixing together the plurality of first foam particles with the plurality of second foam particles prior to the arranging.

Aspect 11. The method according to any one of Aspects 1 to 95, wherein the arranging and affixing are carried out for three or more iterations.

Aspect 12. The method according to any one of Aspects 1 to 95, wherein the arranging and affixing are carried out for three iterations to 500 iterations.

Aspect 13. The method according to any one of Aspects 1 to 95, wherein the decorating is performed during an iteration, after an iteration, between two or more iterations, or a combination thereof.

Aspect 14. The method according to any one of Aspects 1 to 95, wherein the decorating is performed on the component after the last iteration.

Aspect 15. The method according to any one of Aspects 1 to 95, wherein the decorating is performed between the arranging and the affixing.

Aspect 16. The method according to any one of Aspects 1 to 95, wherein affixing together at least a portion of the plurality of foam particles comprises: depositing a binding material in a binding material target area, wherein the binding material target area comprises at least a portion of the arranged plurality of foam particles, and wherein the depositing coats at least a portion of defining surfaces of the arranged plurality of foam particles with the binding material; and curing deposited binding material coating at least a portion of the defining surfaces of the arranged plurality of foam particles within at least the binding material target area, wherein curing comprises affixing at least a portion of the arranged plurality of foam particles within the target area.

Aspect 17. The method according to any one of Aspects 1 to 95, wherein the curing comprises solidifying the deposited binding material and binding the deposited binding material to the coated at least a portion of the defining surfaces of the arranged plurality of foam particles.

Aspect 18. The method according to any one of Aspects 1 to 95, wherein the curing comprises: applying energy to the deposited binding material and the arranged plurality of foam particles in an amount and for a duration sufficient to soften the first thermoplastic elastomer material of the coated at least a portion of the defining surfaces of the arranged plurality of foam particles; and decreasing a temperature of the region of the arranged plurality of foam particles to a temperature at or below which the softened thermoplastic elastomer material re-solidifies; thereby affixing at least a portion of the coated at least a portion of the defining surfaces of the arranged plurality of foam particles in the binding material target area.

Aspect 19. The method according to any one of Aspects 1 to 95, wherein the applying energy comprises applying energy to substantially all of the arranged plurality of foam particles.

Aspect 20. The method according to any one of Aspects 1 to 95, wherein the applying energy comprises applying energy within the infrared spectrum.

Aspect 21. The method according to any one of Aspects 1 to 95, wherein the binding material comprises one or more monomers, one or more polymers, or combinations thereof; and wherein curing comprises: forming at least one chemical bond between the one or more monomers, the one or more polymers, or the combinations thereof of the binding material; and/or forming at least one chemical bond between the coated at least a portion of the defining surfaces of the arranged plurality of foam particles in the binding material target area and the one or more monomers, the one or more polymers, or the combinations thereof of the binding material; thereby affixing the coated at least a portion of the arranged plurality of foam particles to each other or to uncoated foam particles in the binding material target area.

Aspect 22. The method according to any one of Aspects 1 to 95, wherein depositing a binding material comprises depositing the binding material by jetting, spraying, or combinations thereof; wherein the binding material comprises a solvent; wherein the method further comprises, following the depositing, dissolving at least a portion of the defining surfaces of the arranged plurality of foam particles with the solvent, forming dissolved defining surfaces of the arranged foam particles; and wherein the curing comprises, following the dissolving, removing at least a portion of the solvent of the binding material and solidifying the at least a portion of the dissolved defining surfaces of the arranged foam particles; thereby affixing at least a portion of the arranged plurality of foam particles to each other or to uncoated foam particles in the binding material target area.

Aspect 23. The method according to any one of Aspects 1 to 95, wherein the depositing comprises depositing a first binding material and a second binding material; wherein the first binding material comprises a solvent; wherein the second binding material comprises a binding thermoplastic elastomer material which is soluble in the solvent; and wherein the curing comprises removing the solvent and solidifying the binding thermoplastic elastomer material on at least a portion of the defining surfaces of the arranged foam particles; thereby affixing at least a portion of the arranged plurality of foam particles to each other or to uncoated foam particles in the binding material target area.

Aspect 24. The method according to any one of Aspects 1 to 95, wherein the plurality of foam particles comprise foam particles having a density of about 0.1 grams per cubic centimeter to about 0.8 grams per cubic centimeter.

Aspect 25. The method according to any one of Aspects 1 to 95, wherein the plurality of foam particles has a bulk density of about 80 grams per liter to about 200 grams per liter.

Aspect 26. The method according to any one of Aspects 1 to 95, wherein affixing together at least a portion of the plurality of foam particles comprises: increasing a temperature of at least a portion of the plurality of foam particles with actinic radiation under conditions effective to melt or soften a portion of the first thermoplastic elastomer material at a first surface of at least one of the plurality of foam particles; and decreasing the temperature of the melted or softened portion of the first thermoplastic elastomer material, thereby solidifying the melted or softened portion of the first thermoplastic elastomer material and forming a plurality of fused foam particles; wherein the increasing the temperature is carried out for at least one iteration.

Aspect 27. The method according to any one of Aspects 1 to 95, wherein the increasing the temperature of at least a portion of the plurality of foam particles with actinic radiation under conditions effective to melt or soften a portion of the first thermoplastic elastomer material at a first surface of at least one of the plurality of foam particles further comprises intermingling melted first thermoplastic elastomer material from the first surface of the foam particle with a melted first thermoplastic elastomer material at a second surface of an adjacent foam particle; and wherein the decreasing the temperature of the melted or softened portion of the first thermoplastic elastomer material comprises decreasing a temperature of the intermingled thermoplastic elastomer material, thereby solidifying the melted portion of the thermoplastic elastomer and forming the plurality of fused foam particles.

Aspect 28. The method according to any one of Aspects 1 to 95, wherein the plurality of foam particles has a bulk density of about 80 grams per liter to about 200 grams per liter.

Aspect 29. The method according to any one of Aspects 1 to 95, wherein the increasing the temperature of at least a portion of the plurality of foam particulates comprises increasing the temperature of a target area of the plurality of foam particulates.

Aspect 30. The method according to any one of Aspects 1 to 95, wherein the increasing the temperature of the target area of the plurality of foam particles comprises increasing the temperature of the target area of the plurality of foam particles with a directed energy beam of actinic radiation.

Aspect 31. The method according to any one of Aspects 1 to 95, wherein the directed energy beam of actinic radiation is a laser beam.

Aspect 32. The method according to any one of Aspects 1 to 95, wherein the laser beam has a beam width of about 0.1 millimeter to about 0.7 millimeter.

Aspect 33. The method according to any one of Aspects 1 to 95, wherein the directed energy beam of actinic radiation has a scan pattern such that the directed energy beam of actinic radiation is directed in an x-y plane; and wherein the directed energy beam of actinic radiation is configured to vary an amount of energy for an amount of time directed to each point in the x-y plane.

Aspect 34. The method of any one of Aspects 1 to 95, wherein the first thermoplastic elastomer material or the second thermoplastic elastomer material or both comprises a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, or any blend thereof.

Aspect 35. The method according to any one of Aspects 1 to 95, wherein the first thermoplastic elastomer material or second thermoplastic elastomer material or both comprises a thermoplastic polyether block amide copolymer.

Aspect 36. The method according to any one of Aspects 1 to 95, wherein the first thermoplastic elastomer material or second thermoplastic elastomer material or both is characterized by a range of at least 10 degrees C. over which the first thermoplastic elastomer material or the second thermoplastic elastomer material exhibits softening and melting behavior as determined using differential scanning calorimetry.

Aspect 37. The method according to any one of Aspects 1 to 95, wherein the printing comprises screen printing, pad printing, ink jet printing, 3D printing, flexographic printing, heat transfer printing, or any combination thereof.

Aspect 38. The method according to any one of Aspects 1 to 95, wherein printing comprises printing a marking onto one or more foam particles.

Aspect 39. The method according to any one of Aspects 1 to 95, wherein printing comprises printing a marking onto at least a portion of an exterior surface of the component after forming the component.

Aspect 40. The method according to any one of Aspects 1 to 95, wherein printing comprises printing comprises depositing at least one ink onto a target print area of the component.

Aspect 41. The method according to any one of Aspects 1 to 95, wherein printing comprises depositing a plurality of inks onto a target print area of the component.

Aspect 42. The method according to any one of Aspects 1 to 95, wherein at least one ink comprises a CMYK formulation or an RGB formulation.

Aspect 43. The method according to any one of Aspects 1 to 95, wherein at least one ink comprises a sublimation ink formulation.

Aspect 44. The method according to any one of Aspects 1 to 95, wherein printing comprises depositing sublimation ink on the outer surface of the component, and then increasing the temperature of the component above the sublimation temperature of the sublimation ink.

Aspect 45. The method according to any one of Aspects 1 to 95, wherein depositing a sublimation ink on the outer surface of the component comprises providing a release paper printed with sublimation ink, and transferring the sublimation ink from the release paper to the surface of the component.

Aspect 46. The method according to any one of Aspects 1 to 95, wherein at least one ink comprises a formulation including an infrared radiation-absorber, and printing comprises depositing the ink in a target location that will be exposed to infrared radiation.

Aspect 47. The method according to any one of Aspects 1 to 95, further comprising adding a primer layer to a surface of the component, and printing on the primer layer.

Aspect 48. The method according to any one of Aspects 1 to 95, wherein the primer layer comprises a pigment, a dye, or both.

Aspect 49. The method according to any one of Aspects 1 to 95, wherein the primer layer comprises a paint, an ink, or both.

Aspect 50. The method according to any one of Aspects 1 to 95, wherein the primer layer comprises a reground, and at least partially degraded, polymer.

Aspect 51. The method according to any one of Aspects 1 to 95, wherein the primer layer comprises a polymeric coating composition.

Aspect 52. The method according to any one of Aspects 1 to 95, wherein the coating is a crosslinked coating including a matrix of crosslinked polymers, and optionally includes a plurality of solid pigment particles entrapped in the matrix of crosslinked polymers.

Aspect 53. The method according to any one of Aspects 1 to 95, wherein the matrix of crosslinked polymers includes crosslinked elastomeric polymers, optionally, the crosslinked elastomeric polymers include crosslinked polyurethane homopolymers or copolymers or both, and optionally the crosslinked polyurethane copolymers include crosslinked polyester polyurethanes.

Aspect 54. The method according to any one of Aspects 1 to 95, wherein the coating is a product of crosslinking a polymeric coating composition, the polymeric coating composition comprises a dispersion of polymers, and optionally comprises at least one of a crosslinking agent, a plurality of solid pigment particles, a dye, and an organic solvent Aspect 55. The method according to any one of Aspects 1 to 95, wherein the primer layer has a percent transmittance of about 40 percent or less.

Aspect 56. The method according to any one of Aspects 1 to 95, wherein printing comprises providing a printed film and affixing the printed film to at least a portion of an exterior surface of the component.

Aspect 57. The method according to any one of Aspects 1 to 95, wherein the printing comprises an additive manufacturing process which deposits a polymeric material onto the exterior surface of the component, thereby creating a topography having a greater surface area on the exterior surface of the component as compared to the topography on the exterior surface of the component prior to the printing.

Aspect 58. The method according to any one of Aspects 1 to 95, wherein the printing comprises printing a three-dimensional structure onto an exterior surface of the component.

Aspect 59. The method according to any one of Aspects 1 to 95, wherein the printing comprises: receiving a set of predetermined information for the three-dimensional structure; wherein the set of predetermined information includes a first thickness for a region of the three-dimensional structure, and a thickness for a structural layer; calculating a number of structural layers to be printed in the region to achieve the first thickness for the region of the three-dimensional structure; instructing a printing device to print a one or more structural layers onto the component using the set of predetermined information, wherein the number of structural layers is equal to the calculated number of structural layers; printing the one or more structural layers onto the component to provide the three-dimensional structure having the first thickness.

Aspect 60. The method according to any one of Aspects 1 to 95, wherein the printing further comprises printing one or more color layers.

Aspect 61. The method according to any one of Aspects 1 to 95, wherein dyeing comprises dyeing the foam particles, the affixed foam particles, the binding material, the component or a portion thereof, or combinations thereof.

Aspect 62. The method according to any one of Aspects 1 to 95, wherein the dyeing comprises spraying a dye composition onto a target dye area.

Aspect 63. The method according to any one of Aspects 1 to 95, wherein the dyeing comprises spraying the dye composition onto at least a portion of the outer surface area of the component.

Aspect 64. The method according to any one of Aspects 1 to 95, wherein dyeing comprises adding a dye composition to the binding material.

Aspect 65. The method of any one of Aspects 1 to 95, wherein the dyeing comprises immersing at least a portion of the component into a dye composition.

Aspect 66. The method according to any one of Aspects 1 to 95 wherein the dye composition comprises a dye solution comprising at least one dye.

Aspect 67. The method according to any one of Aspects 1 to 95 wherein the dye solution is an aqueous dye solution Aspect 68. The method according to any one of Aspects 1 to 95, wherein the dye solution includes from about 1 percent by volume to about 50 percent by volume of a water-soluble organic solvent Aspect 69. The method according to any one of Aspects 1 to 95, wherein the water-soluble organic solvent is a solvent selected from the group consisting of methanol, ethanol, n-propanol, acetone, methyl ethyl ketone, butyl acetate, and combinations thereof Aspect 70. The method according to any one of Aspects 1 to 95, wherein the at least one dye is an acid dye.

Aspect 71. The method according to any one of Aspects 1 to 95 wherein the acid dye is an anionic acid dye.

Aspect 72. The method according to any one of Aspects 1 to 95, wherein the at least one dye is a disperse dye.

Aspect 73. The method according to any one of Aspects 1 to 95, wherein the dye solution comprises a quaternary ammonium compound.

Aspect 74. The method according to any one of Aspects 1 to 95, wherein the quaternary ammonium compound is a soluble tetrabutylammonium compound.

Aspect 75. The method according to any one of Aspects 1 to 95, wherein the soluble tetrabutylammonium compound includes tetrabutylammonium bromide or tetrabutylammonium chloride or both.

Aspect 76. The method according to any one of Aspects 1 to 95, wherein the dye solution includes from about 0.1 to about 5 equivalents of the quaternary ammonium compound per equivalent of the at least one dye.

Aspect 77. The method according to any one of Aspects 1 to 95, wherein the dye solution includes from about 0.001 g/L to about 5.0 g/L of the at least one dye.

Aspect 78. The method according to any one of Aspects 1 to 95, wherein the dye solution includes from about 0.01 g/L to about 2.0 g/L of the anionic dye.

Aspect 79. The method according to any one of Aspects 1 to 95, wherein the dye composition includes infrared absorbing dye.

Aspect 80. The method according to any one of Aspects 1 to 95, wherein the infrared absorbing dye is an anthraquinone dye, cyanine dye, polymethine dye, azomethine dye, azo dye, polyazo dye, diimonium dye, aminium dye, phthalocyanine dye, naphthalocyanine dye, indocyanine dye, naphthoquinone dye, indole phenol dye, triallylmethane dye, metal complex dye, dithiol nickel complex dye, azo cobalt complex dye, a squarylium dye, or combinations thereof.

Aspect 81. The method according to any one of Aspects 1 to 95, wherein the infrared absorbing dye is added to the binding material at from about 0.001 weight percent to about 0.08 weight percent based on the total weight of the binding material.

Aspect 82. The method according to any one of Aspects 1 to 95, wherein the infrared absorbing dye is added to the binding material at from about 0.005 weight percent to about 0.06 weight percent based on the total weight of the binding material.

Aspect 83. The method according to any one of Aspects 1 to 95, wherein applying the coating comprises applying a coating to the foam particles, the affixed foam particles, the binding material, the component or a portion thereof, or combinations thereof.

Aspect 84. The method according to any one of Aspects 1 to 95, wherein applying the coating comprises depositing a colorant composition onto a target colorant area.

Aspect 85. The method according to any one of Aspects 1 to 95, wherein the depositing comprises brushing, spraying, or coating a colorant composition onto a target colorant area.

Aspect 86. The method according to any one of Aspects 1 to 95, wherein applying the coating comprises immersing at least a portion of the component into a colorant composition.

Aspect 87. The method according to any one of Aspects 1 to 95, wherein applying the coating comprises adding a colorant composition to the binding material.

Aspect 88. The method according to any one of Aspects 1 to 95, wherein the colorant composition comprises a pigment, an ink, a dye, a paint, or a combination thereof.

Aspect 89. The method according to any one of Aspects 1 to 95, wherein embossing or debossing the component or a portion thereof comprises: contacting a first surface of the component with a second surface of a relief device; and, following the contacting, removing the second surface of the relief device from the first surface of the component, while retaining an embossed or debossed texture on the first surface on the component.

Aspect 90. The method according to any one of Aspects 1 to 95, further comprising: prior to or during the contacting, increasing the temperature of the first surface of the component to a temperature above one of: a creep relaxation temperature, a heat deflection temperature, a Vicat softening temperature or a melting temperature of the thermoplastic material of the first surface, to at least partially melt or soften the first surface.

Aspect 91. The method according to any one of Aspects 1 to 95, further comprising: during or after the contacting, decreasing the temperature of the first surface of the component to a temperature below: a creep relaxation temperature, a heat deflection temperature, a Vicat softening temperature or a melting temperature of the thermoplastic material of the first surface, to at least partially resolidify the first surface.

Aspect 92. The method according to any one of Aspects 1 to 95, wherein the relief device comprises a drum, a plate, a roller, a mold, or a release paper.

Aspect 93. The method according to any one of Aspects 1 to 95, wherein the second surface of the relief device comprises a relief pattern, and the method results in forming an imprint of the relief pattern on the first surface of the component.

Aspect 94. The method according to any one of Aspects 1 to 95, wherein the relief device is a mold having a mold surface; and the step of contacting the second surface of the relief device with the first surface of the component comprises inserting the component into the mold so that the first surface of the component contacts the mold surface of the mold.

Aspect 95. The method according to any one of Aspects 1 to 95, further comprising applying a pressure between the second surface of the relief device and the first surface of the component.

Aspect 96. An article comprising an article made by method according to any one of the foregoing Aspects.

Aspect 97. The article according to any one of Aspects 96 to 148, wherein the article is a component used in manufacture of an article of footwear, apparel, or sporting equipment.

Aspect 98. The article according to any one of Aspects 96 to 148, wherein the component used in manufacture of an article of footwear, apparel or sporting equipment is a cushioning element for an article of footwear or an impact absorbing element.

Aspect 99. The article according to any one of Aspects 96 to 148, wherein the cushioning element for an article of footwear is a midsole, an outsole, a combination midsole-outsole unit, a sock-liner, an ankle collar, or a heel-cushioning pad.

Aspect 100. The article according to any one of Aspects 96 to 148, wherein the component used in manufacture of an article of footwear, apparel or sporting equipment is a pre-form.

Aspect 101. The article according to any one of Aspects 96 to 148, wherein the article is a padding component used in manufacture of a sports helmet, a backpack, apparel, sports uniform padding, or combat gear.

Aspect 102. The article according to any one of Aspects 96 to 148, wherein the article is a component used in manufacture of an article of tactical equipment.

Aspect 103. The article according to any one of Aspects 96 to 148, wherein the article of tactical equipment is a pack, pack frame, gear bag, chest rig, rifle sling, belt, holster, vest, or jacket Aspect 104. The article according to any one of Aspects 96 to 148, wherein the component used in manufacture of an article of tactical equipment is a padding component.

Aspect 105. The article according to any one of Aspects 96 to 148, wherein the article is a component used in manufacture of an article of work safety equipment.

Aspect 106. The article according to any one of Aspects 96 to 148, wherein the article of work safety equipment is a safety suit, work helmet, work boot, or work glove.

Aspect 107. The article according to any one of Aspects 96 to 148, wherein the component used in manufacture of an article of work safety equipment is a padding component.

Aspect 108. An article comprising: a component formed of a plurality of affixed foam particles, wherein each individual foam particle of the plurality of affixed foam particles is formed of a thermoplastic elastomeric material, and includes one or more binding regions on an outer surface of the individual foam particle affixing the individual foam particle to one or more adjacent foam particles, the one or more adjacent foam particles comprise a thermoplastic elastomeric material, the component formed of the plurality of affixed foam particles includes a plurality of gaps between foam particles; wherein, prior to affixing, the plurality of foam have a number average particle size of about 0.04 millimeters to about 10 millimeters in a longest dimension; and wherein a portion of the plurality of affixed foam particles of the component comprises a coating, or a surface of the component including a portion of foam particles is embossed or debossed, or both.

Aspect 109. The article of any one of Aspects 96 to 148, wherein the gaps between the foam particles occupy at least 10 percent of a total volume of the component.

Aspect 110. The article of any one of Aspects 96 to 148, wherein prior to affixing, at least 20 percent of the plurality of foam particles are spheroid or ellipsoid in shape and at least 20 percent of the spheroid or ellipsoid foam particles in the component retain a substantially spheroid or ellipsoid shape.

Aspect 111. The article of any one of any one of Aspects 96 to 148, wherein the plurality of affixed foam particles includes layers of affixed foam particles, and an average number of layers per millimeter in the component is from about 0.1 layer per millimeter to about 2.5 layers per millimeter.

Aspect 112. The article of any one of Aspects 96 to 148, wherein the average number of layers per millimeter in the component is from about 0.3 layers per millimeter to 2 layers per millimeter.

Aspect 113. The article of any one of any one of Aspects 96 to 148, wherein the component comprises from 3 to 100 layers.

Aspect 114. The article of any one of Aspects 96 to 148, wherein the component comprises from 3 to 50 layers.

Aspect 115. The article of any one of Aspects 96 to 148, wherein the coating comprises an ink, a paint, a dye, a film, or any combination thereof.

Aspect 116. The article of any one of any one of Aspects 96 to 148, wherein an individual foam particle of the plurality of affixed foam particles of the component has a first color, and the coating has a second color which is different from the first color.

Aspect 117. The article of any one of Aspects 96 to 148, wherein each individual foam particle of the plurality of affixed foam particles of the component has a first color and the coating has a second color that is different from the first color.

Aspect 118. The article of any one of Aspects 96 to 148, wherein, when measured according to the CIE 1976 color space under a given illumination condition at an observation angle between −15 degrees and +60 degrees, the first color has a first color measurement having coordinates L1* and a1* and b1*, and the second color has a second color measurement having coordinates L2* and a2* and b2*, wherein: the L1* value is at least 10% percent greater or lesser than the L2* value; the a1* coordinate value is at least 10 percent greater or lesser than the a2* coordinate value; the b1* coordinate value is at least 10 percent greater or lesser than the b2* coordinate value; or a combination thereof.

Aspect 119. The article of any one of Aspects 96 to 148, wherein, when measured according to the CIE 1976 color space under a given illumination condition at an observation angle between −15 degrees and +60 degrees, the first color has a first color measurement having coordinates L1* and a1* and b1*, and the second color has a second color measurement having coordinates L2* and a2* and b2*, wherein the L1* and L2* values may be the same or different, wherein the a1* and a2* coordinate values may be the same or different, wherein the b1* and b2* coordinate values may be the same or different, and wherein the ΔE*ab between the first color measurement and the second color measurement is greater than or equal to about 60, where ΔE*ab=[(L1*−L2*)2+(a1*−a2*)2+(b1*−b2*)2]½, optionally is greater than or equal to about 80, or optionally is greater than or equal to about 100.

Aspect 120. The article of any one of Aspects 96 to 148, wherein, when measured according to the CIELCH color space under a given illumination condition at an observation angle between −15 degrees and +60 degrees, the first color has a first color measurement having coordinates L1* and 01* and h1°, and the second color has a second color measurement having coordinates L2* and 02* and h2°, wherein: the L1* value is at least 10 percent greater or lesser than the L2* value; the C1* coordinate value is at least 10 percent greater or lesser than the C2* coordinate value; the h1° coordinate value is at least 10 percent greater or lesser than the h2° coordinate value; or a combination thereof.

Aspect 121. The article according to any one of Aspects 96 to 148, wherein the binding regions include a portion of the thermoplastic elastomer material from the surface of the individual foam particle intermingled with a portion of the thermoplastic elastomer material from the surface of the one or more adjacent foam particles.

Aspect 122. The article according to any one of Aspects 96 to 148, wherein the binding regions include a binding material, a portion of the thermoplastic elastomer material from at least one of the foam particles or the one or more adjacent foam particles, a portion of the thermoplastic elastomer material from the individual foam particle intermingled with a portion of the thermoplastic elastomer material from at least one of the one or more adjacent foam particles, or any combination thereof.

Aspect 123. The article according to any one of Aspects 96 to 148, wherein the binding regions include dissolved and re-solidified thermoplastic elastomer material from the individual foam particle, from the at least one of the one or more adjacent foam particles, or both.

Aspect 124. The article according to any one of Aspects 96 to 148, wherein the binding regions include dissolved and re-solidified binder material from the individual foam particle, from the at least one of the one or more adjacent foam particles, or both.

Aspect 125. The article according to any one of any one of Aspects 96 to 148, wherein the coating of the portion of foam particles comprises a printed marking on an exterior surface of the article.

Aspect 126. The article according to any one of Aspects 96 to 148, wherein the printed marking comprises at least one ink.

Aspect 127. The article according to any one of Aspects 96 to 148, wherein the printed marking comprises a plurality of inks.

Aspect 128. The article according to any one of Aspects 96 to 148, wherein at least one of the inks comprises a CMYK formulation or an RGB formulation.

Aspect 129. The article according to any one of Aspects 96 to 148, wherein at least one of the inks comprises a sublimation ink formulation.

Aspect 130. The article according to any one of Aspects 96 to 148, wherein at least one of the inks comprises a formulation including an infrared radiation-absorber.

Aspect 131. The article according to any one of any one of Aspects 96 to 148, comprising a primer layer disposed between the exterior surface of the article and the printed marking.

Aspect 132. The article according to any one of Aspects 96 to 148, wherein the primer layer comprises a pigment, a dye, or both.

Aspect 133. The article according to any one of Aspects 96 to 148, wherein the primer layer comprises a paint, an ink, or both.

Aspect 134. The article according to any one of Aspects 96 to 148, wherein the primer layer comprises a reground, and at least partially degraded, polymer.

Aspect 135. The article according to any one of Aspects 96 to 148, wherein the primer layer is a coating, wherein the coating comprises a polymeric coating composition.

Aspect 136. The article according to any one of Aspects 96 to 148, wherein the coating is a crosslinked coating including a matrix of crosslinked polymers, and optionally includes a plurality of solid pigment particles entrapped in the matrix of crosslinked polymers.

Aspect 137. The article according to any one of Aspects 96 to 148, wherein the matrix of crosslinked polymers includes crosslinked elastomeric polymers, optionally, the crosslinked elastomeric polymers include crosslinked polyurethane homopolymers or copolymers or both, and optionally the crosslinked polyurethane copolymers include crosslinked polyester polyurethanes.

Aspect 138. The article according to any one of Aspects 96 to 148, wherein the coating is a product of crosslinking a polymeric coating composition, the polymeric coating composition comprises a dispersion of polymers, and optionally comprises at least one of a crosslinking agent, a plurality of solid pigment particles, a dye, and an organic solvent Aspect 139. The article of any one of Aspects 96 to 148, wherein the primer layer has a percent transmittance of about 40 percent or less.

Aspect 140. The article according to any one of any one of Aspects 96 to 148, comprising a three-dimensional structure on an exterior surface of the article.

Aspect 141. The article according to any one of any one of Aspects 96 to 148, wherein one or more of the foam particles, the binding material, the component, or a combination thereof, include a colorant, an ink, a dye, a paint, or a pigment.

Aspect 142. The article according to any one of any one of Aspects 96 to 148, wherein at least a portion of the exterior surface of the article has an embossed or debossed texture.

Aspect 142. The article according to any one of any one of Aspects 96 to 148, wherein the article is characterized by a plurality of sub-regions comprising a first sub-region characterized by a first property and a second sub-region characterized by a second property, wherein the first property is not equal to the second property, and wherein the first property and the second property are flexural modulus, stiffness, bulk density, or resilience.

Aspect 143. The article according to any one of Aspects 96 to 148, wherein the first property is at least 10 percent greater than the second property.

Aspect 144. The article according to any one of Aspects 96 to 148, wherein the article is characterized by a plurality of cross-sectional sub-regions comprising a first sub-region characterized by a first flexural modulus and a second sub-region characterized by a second flexural modulus, wherein the first flexural modulus is not equal to the second flexural modulus.

Aspect 145. The article according to any one of Aspects 96 to 148, wherein the article is characterized by a plurality of cross-sectional sub-regions comprising a first sub-region characterized by a first bulk density and a second sub-region characterized by a second bulk density, wherein the first bulk density is not equal to the second bulk density.

Aspect 146. The article according to any one of Aspects 96 to 148, wherein the article is characterized by a plurality of cross-sectional sub-regions comprising a first sub-region characterized by a first stiffness and a second sub-region characterized by a second stiffness, wherein the first stiffness is not equal to the second stiffness.

Aspect 147. The article according to any one of Aspects 96 to 148, wherein the article is characterized by a plurality of cross-sectional sub-regions comprising a first sub-region characterized by a first resilience and a second sub-region characterized by a second resilience, wherein the first resilience is not equal to the second resilience.

Aspect 148. An article of footwear, comprising: an upper operably coupled with a sole structure, wherein the sole structure comprises a cushioning element including an article according to any one of any one of Aspects 96 to 148.

Articles Manufactured Using the Disclosed Methods.

Footwear 10 is an exemplary article of athletic footwear that comprises one or more components article made using the methods of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of an article made using the disclosed methods as described herein, or a multi-component assembly formed of a plurality of monolithic components, where at least one of the monolithic components is formed entirely of the article made using the disclosed methods as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

The component can be a sole component, such as a sole component 14 depicted in FIGS. 1-5, that includes article made using the disclosed methods as described herein. The component can be an insert such as insert 36 or insert 60 depicted in FIGS. 4-5 that includes article made using the disclosed methods as described herein. The sole components and inserts for sole components can be made partially or entirely of article made using the disclosed methods as described herein. Any portion of a sole component or an insert for a sole component can be made of article made using the disclosed methods as described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include article made using the disclosed methods as described herein.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. The sole component can be an insole or sockliner or can be a multi-component assembly including an insole or sockliner, can further include an insole or sockliner located within the upper, where the insole or sockliner is formed entirely or partially of article made using the disclosed methods as described herein. Articles of footwear described herein can include an insole or sockliner formed entirely or partially of article made using the disclosed methods as described herein.

Figure 2:
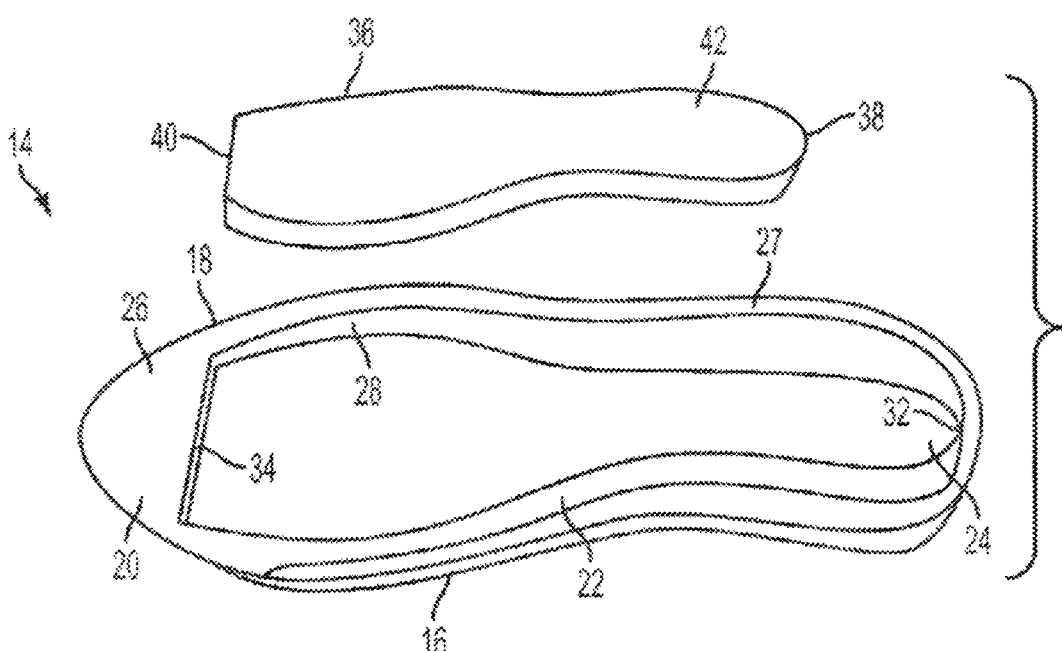
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. Ribs 30 can extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. It is to be appreciated that a separate outsole component could be secured to the lower surface of first portion 26. When a separate outsole component is secured to the lower surface of first portion 26, the first portion 26 is a midsole component. The article can be a midsole component for an article of footwear.

The article can be an insert, such as insert 36 that can be received in recess 28, as illustrated in FIG. 2. Insert 36 can provide cushioning or resiliency in the sole component. First portion 26 can provide structure and support for insert 36. The first portion 26 can be formed of a material of higher density and/or hardness as compared to insert 36 such as, for example, non-foam materials including rubber and thermoplastic polyurethane, as well as foam materials. The insert 36 can be formed of article made using the disclosed methods as described herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. The rear surface 32 of recess 28 can be curved to substantially follow the contour of the rear of heel portion 24 and the front surface 34 of recess 28 extends transversely across first portion 26.

Figure 3:
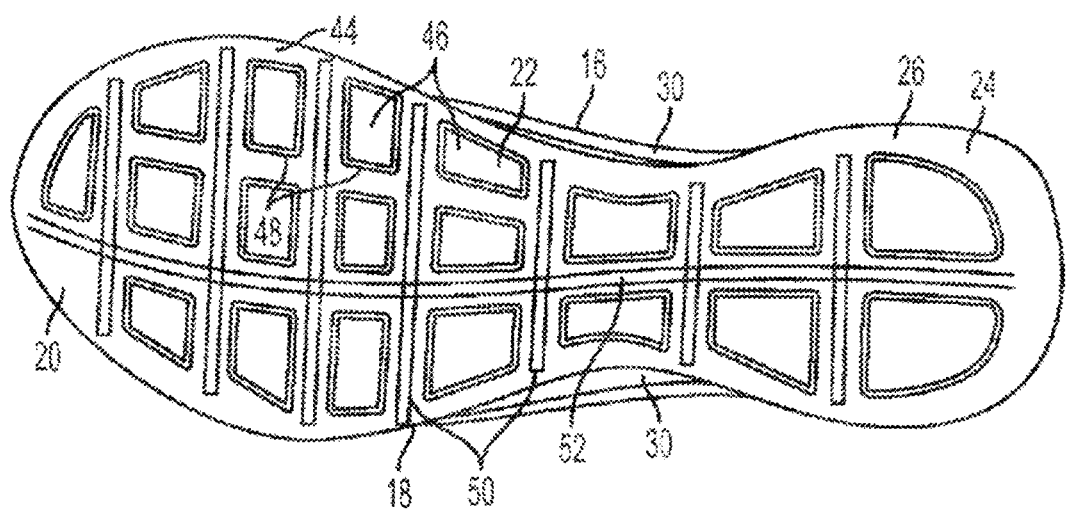
FIG. 3 is a plan view of the bottom of the sole component of the article of footwear of FIG.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
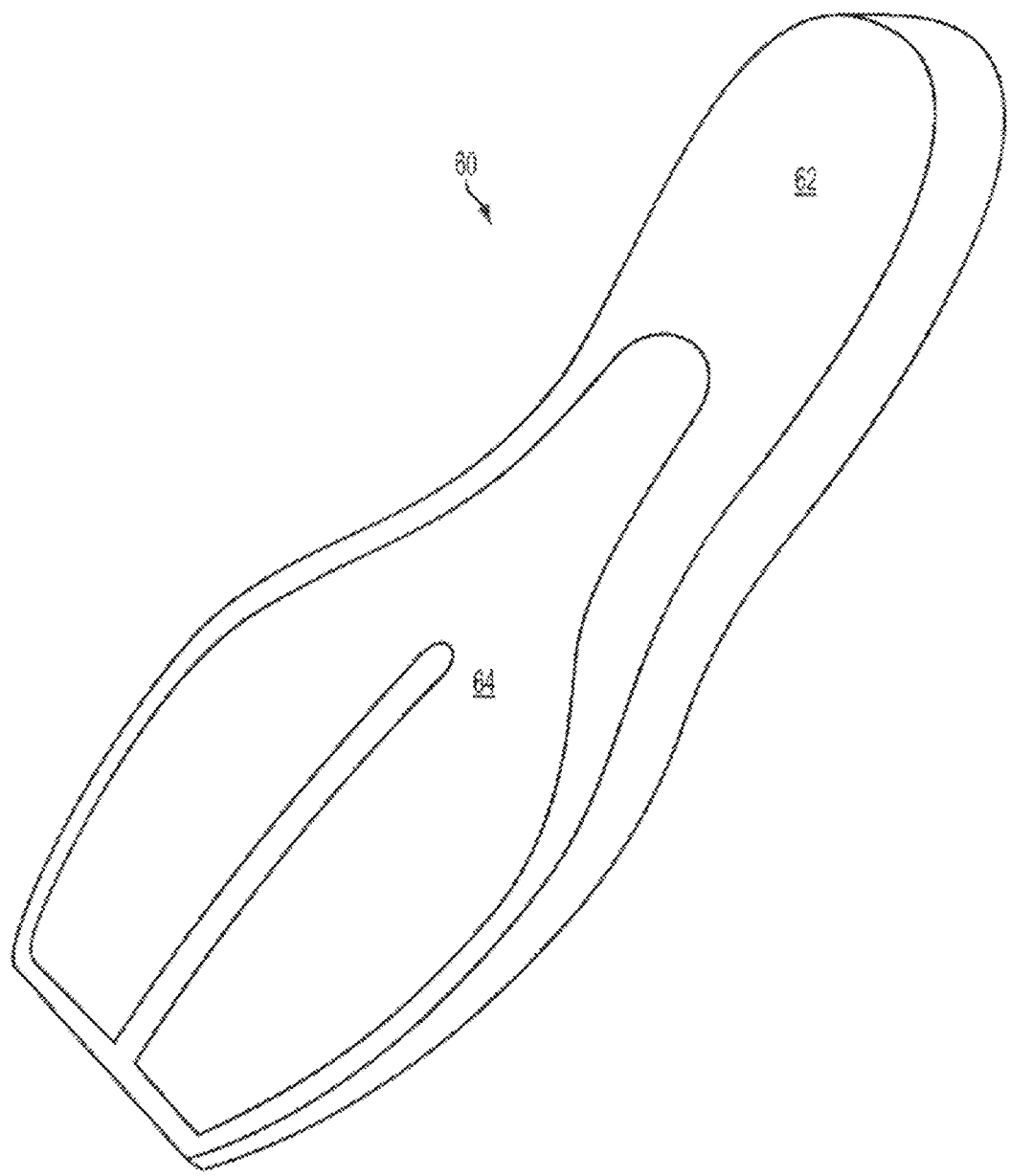
FIG. 4 is a bottom view of an insert for use in a sole component of an article of footwear.
Figure 5:
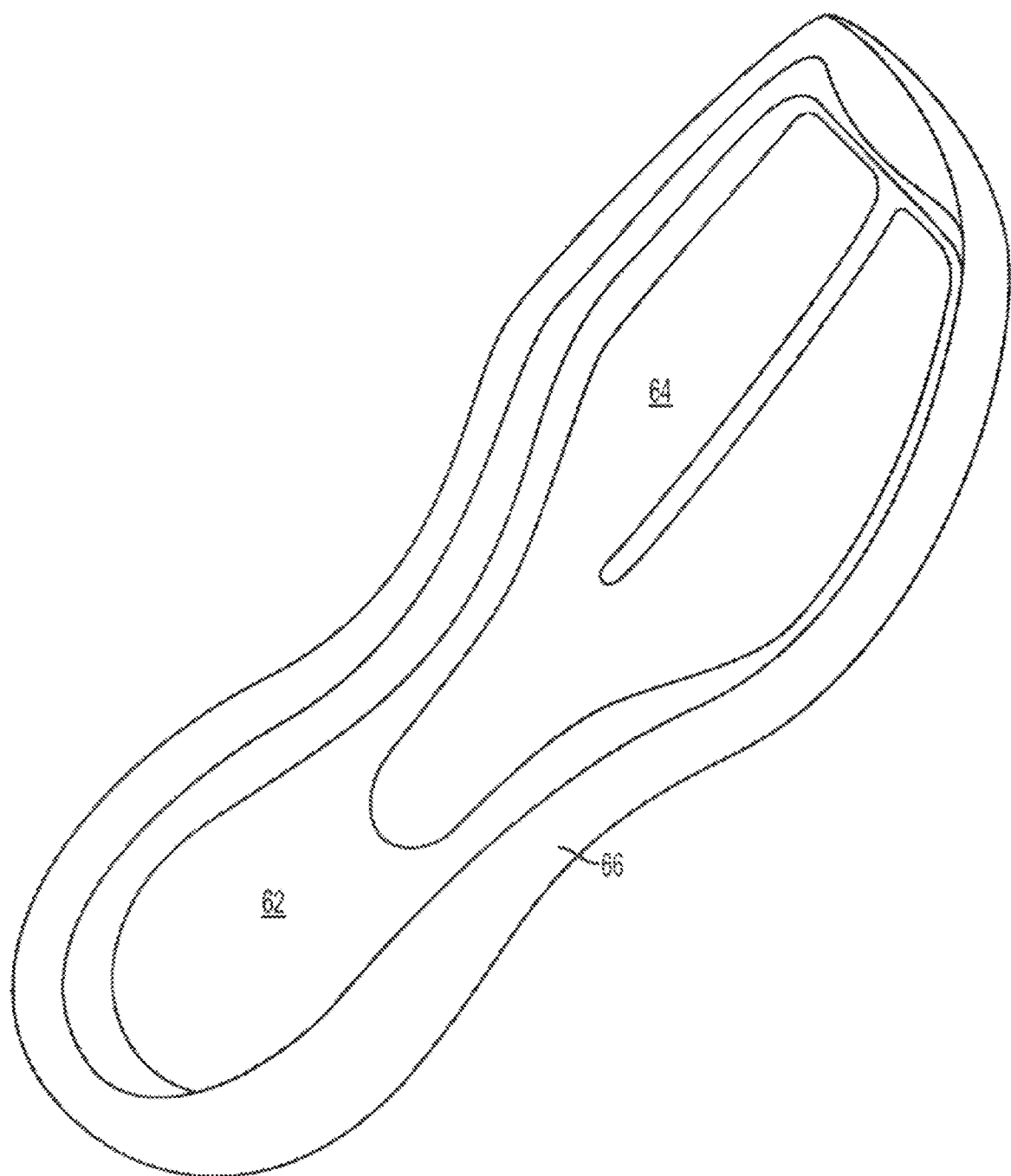
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is article made using the disclosed methods as described herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is article made using the disclosed methods as described herein, can also be used. In the example illustrated in FIGS. 4 and 5, a portion of a first material 62 can be used in the heel region of the insert, and a portion of a second material 64 can be used in the toe region of the insert. A higher density material can be used to support the heel region, while a lower density material can be used to support the toe region. For example, the density of the first material can be at least 0.02 grams per cubic centimeter greater than the density of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

Figure 6:
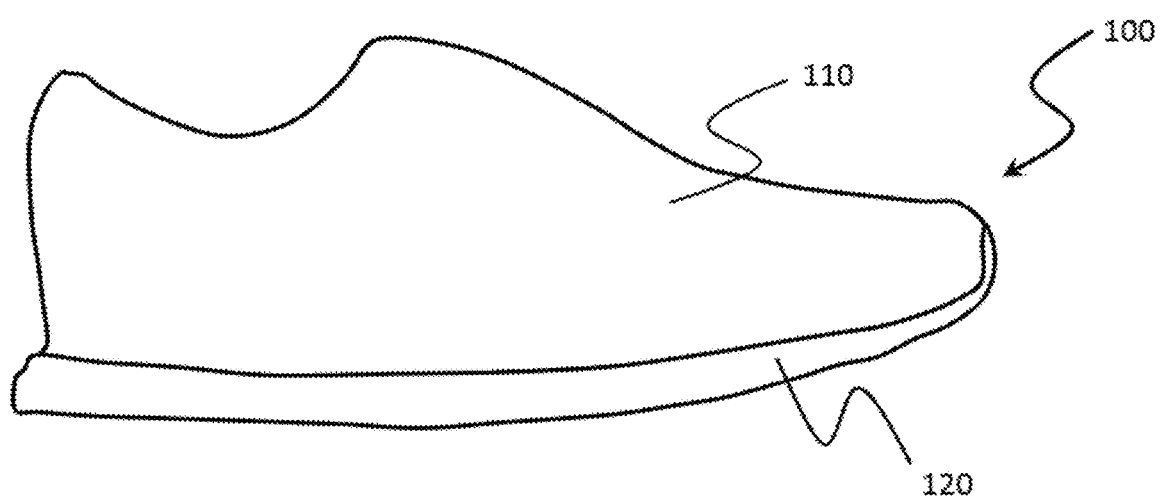
FIG. 6 is a lateral view of an article of footwear showing a shoe upper and sole component.
Figure 7:
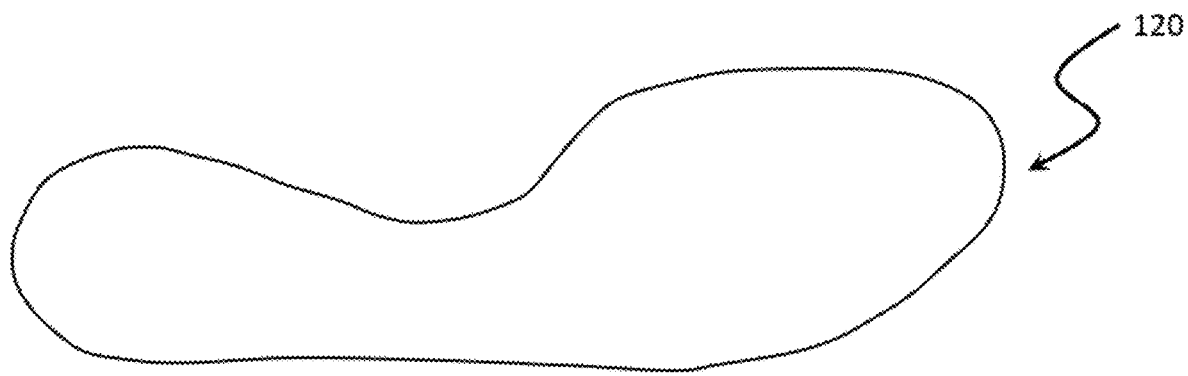
FIG. 7 is a plan view of the bottom of a sole component.

FIG. 6 shows a lateral view of an article of footwear 100, such as an article of athletic footwear, having an upper 110 and a sole component 120. The article of footwear 100 may further comprise other components typical of footwear or athletic footwear, e.g., midsole, sockliner, padded collar, and the like. However, for ease of discussion herein, only the upper 110 and the sole component 120 are specifically shown in the figure. The disclosed article can be a sole component 120 with a lateral shape as shown in FIG. 6, or other lateral shapes as determined by the requirements of a particular article of footwear. FIG. 7 shows a corresponding plan view of a sole component 120 for which the corresponding lateral view is shown in FIG. 6. The disclosed article can be a sole component 120 with a plan view shape as shown in FIG. 7, or other plan view shapes as determined by the requirements of a particular article of footwear.

Figure 8:
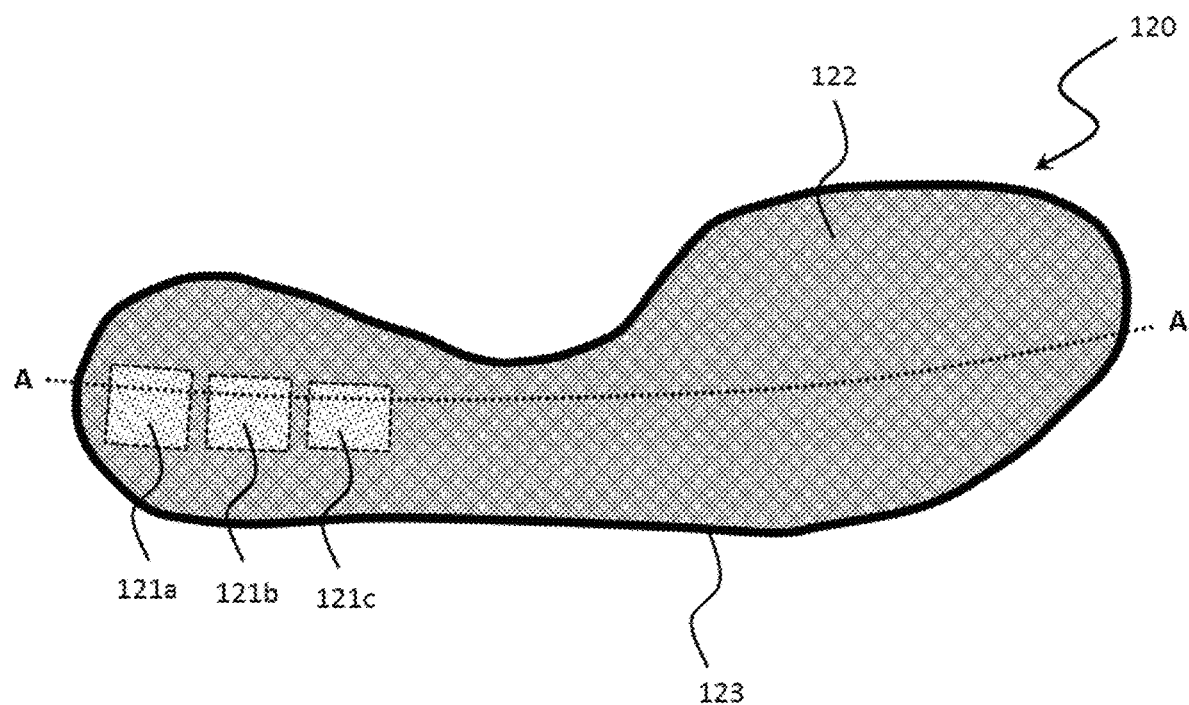
FIG. 8 is a bottom cross-sectional view of the sole component shown in FIG. 7 depicting sub-regions of varied foam particle fusion.

FIG. 8 shows a plan view of a sole component 120 comprising three sub-regions of differing properties prepared using the disclosed methods described herein. A sole component 120 can comprise two or more sub-regions with different properties such as density, flexural modulus, resilience, and the like that can be associated with, for example, different types of foam particles, or different binders, or differing levels of heating each sub-regions is subjected to in the method. For example, sub-regions 121a, 121b, and 121c have a defined plan view geometry located roughly within the heel portion of the sole component. Although these sub-regions, 121a, 121b, and 121c, are shown with a rectangular geometry, one skilled in the art can appreciate that any number of geometries are possible and are contemplated in the present disclosure. Moreover, the arrangement of these sub-regions, 121a, 121b, and 121c, can be varied to provide the desired performance characteristics for the sole component based on geometry, size, and location of a desired sub-region with a desired density.

The foam particles within these sub-regions, 121a, 121b, and 121c, may be completely non-affixed. For example, an energy beam, as it passed over the x-y coordinates within 121a, 121b, and 121c, can pause the energy beam emission within these sub-regions; or the binding material may deposited in a pattern such that no binding material is deposited within sub-regions 121a, 121b, and 121c. Accordingly, the density of these sub-regions, 121a, 121b, and 121c, can be less than other sub-regions that are exposed to one or more iterations of an energy beam, or that receive binding material, as the case may be. Alternatively, the foam particles within these sub-regions, 121a, 121b, and 121c, can be subjected to only a single iteration of exposure to an energy beam. The foam particles within these sub-regions, 121a, 121b, and 121c, can be subjected to 2-7 iterations of exposure to an energy beam, but fewer iterations of exposure to the energy beam than sub-regions 122 or 123. Alternatively, the foam particles within these sub-regions, 121a, 121b, and 121c, can receive a fraction of the binding material deposited in other regions such as sub-regions 122 or 123.

In contrast, sub-region 122 in FIG. 8 comprises affixed foam particles with approximately the same properties, e.g., density. For example, in some embodiments, the foam particles in sub-region 122 were exposed to the same intensity and duration of an energy beam. In other embodiments, the sub-region 122 includes a homogeneous composition of binding composition and foam particles. The sub-region 123 is essentially the edge of the sole component 120 in the plan view that is shown. The foam particles in this sub-region are characterized as being highly fused or highly bonded. The density of sub-regions 122 and 123 can be greater than the density of the sub-regions 121a, 121b, and 121c. The density of sub-region 123 can be greater than the density of sub-region 122.

Figure 9:
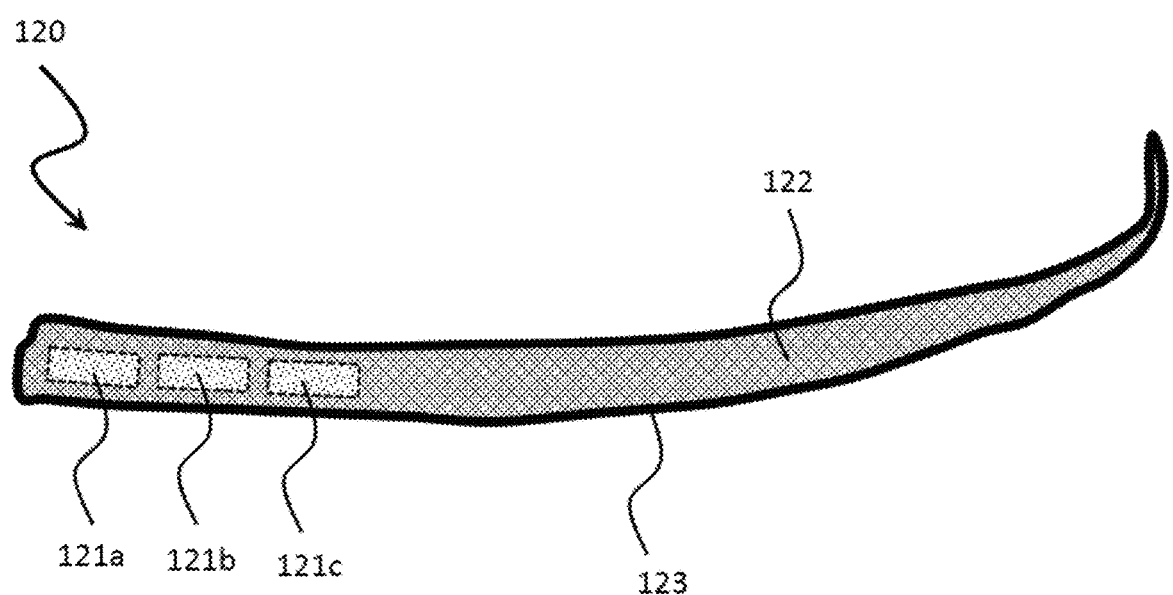
FIG. 9 is a lateral cross-sectional view of the sole component shown in FIG. 8 along line A-A depicting sub-regions of varied foam particle fusion.

FIG. 9 shows a cross-sectional view of a sole component 120 shown in FIG. 8 along line A-A. The cross-sectional view shows that sub-regions 121a, 121 b, and 121c can have not only defined plan view geometries, but also extend along different portions of the depth (or z-axis) of the sole component 120.

Figure 10:
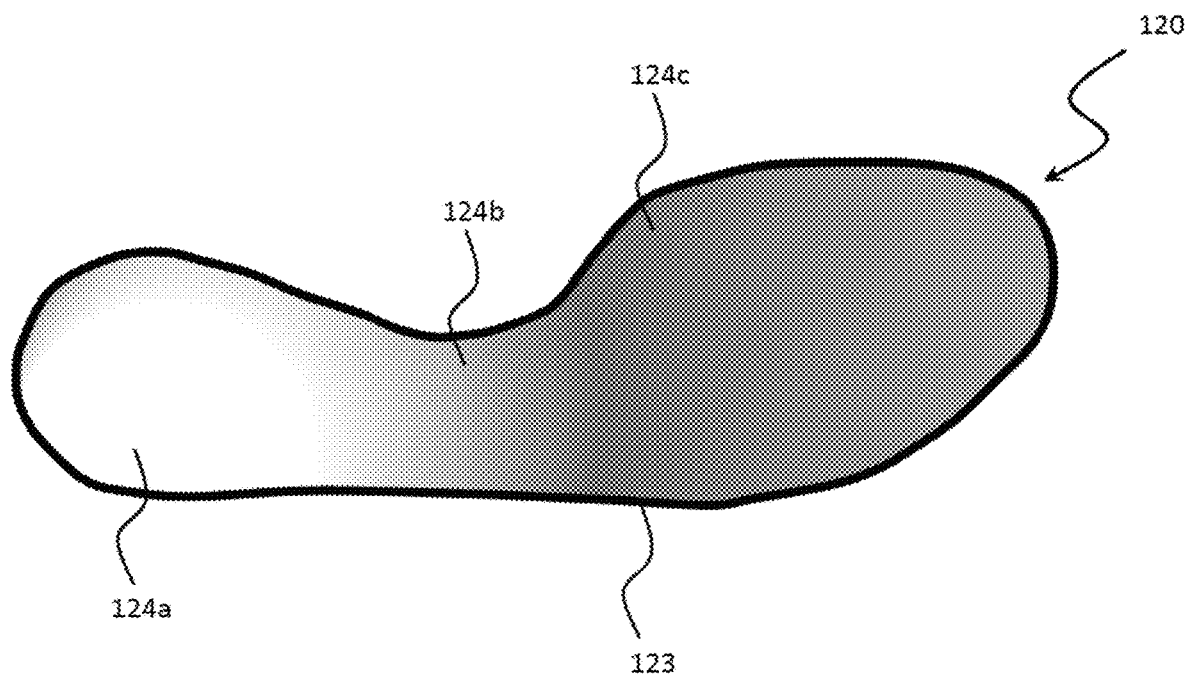
FIG. 10 is a bottom cross-sectional view of the sole component shown in FIG. 7 depicting sub-regions of varied foam particle fusion.
Figure 11:
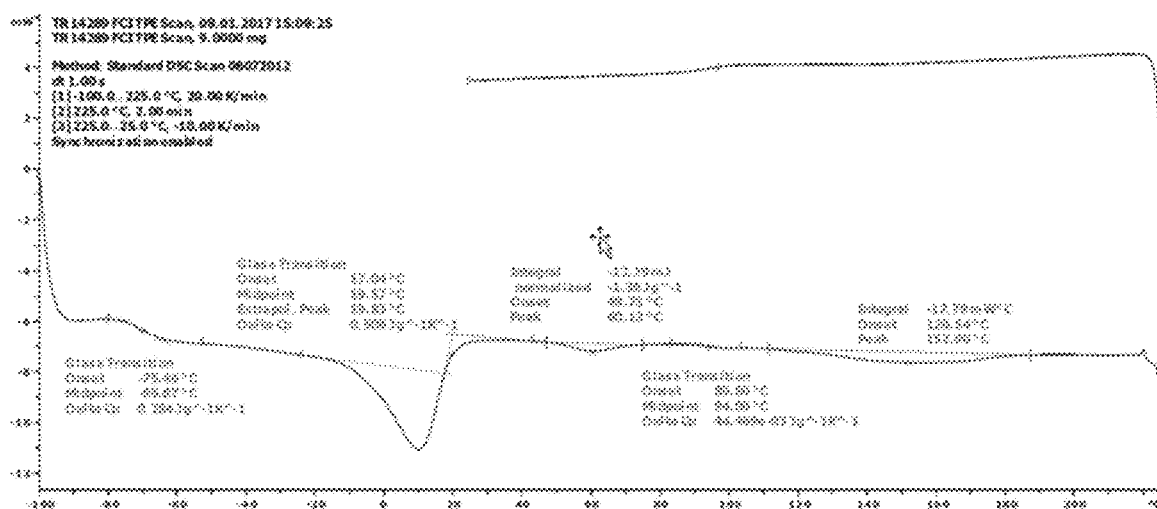
FIG. 11 shows representative differential scanning calorimetry data for representative disclosed thermoplastic elastomer foam particles. The foam particles were prepared using a thermoplastic block copolyester comprising crystalline (or hard) segments comprising polybutylene terephthalate and amorphous (or soft) segments comprising polyether (referred to herein as "thermoplastic COPE foam particles").
Figure 12:
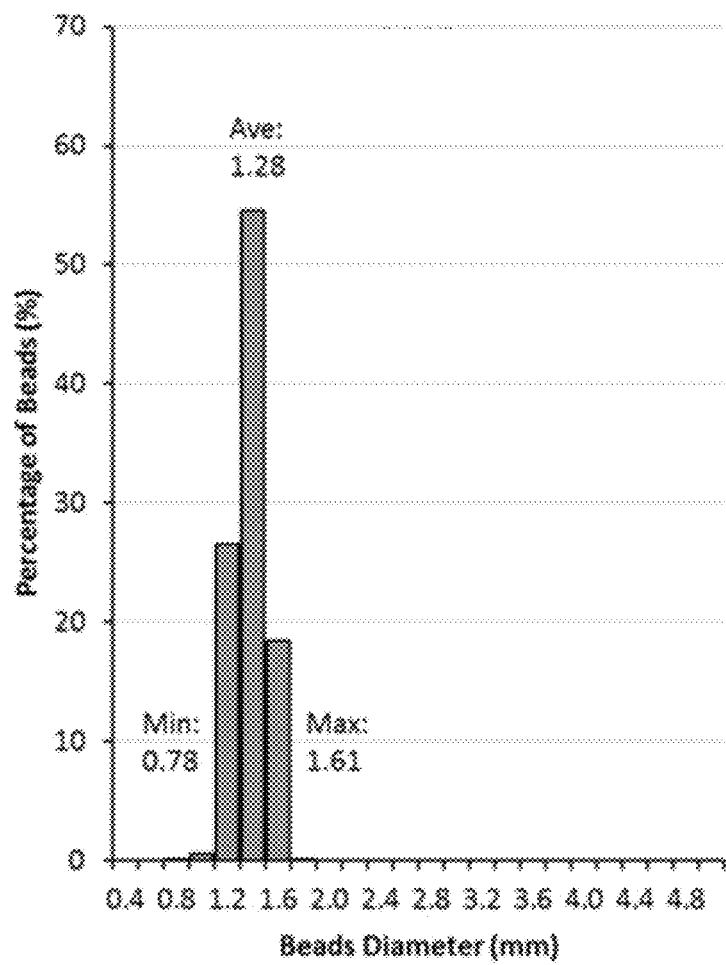
FIG. 12 shows representative particle size distribution data for representative disclosed thermoplastic elastomer foam particles (sample size=2,000 foam particles), for which roundness or circularity distribution data are shown in FIG. 12.
Figure 13:
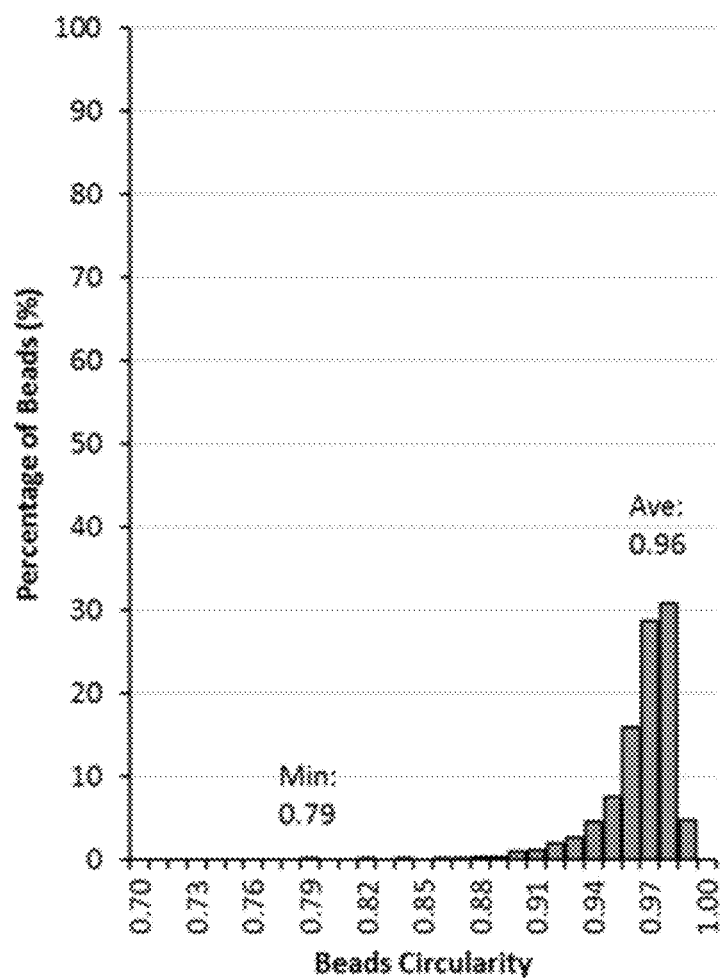
FIG. 13 shows representative roundness or circularity distribution data for the representative disclosed thermoplastic elastomer foam particles (sample size=2,000 foam particles), for which particle size distribution data are shown in FIG. 12.

FIG. 10 shows a plan view of a sole component 120 comprising a gradient change in fusion of the foam particles contained therein. For example, the variables of energy beam output and exposure time can be changed in very small x-y dimensional steps such that the level of fusion of foam particles has a gradient characteristic from sub-region 124a sub-region to 124b to sub-region 124c. Alternatively, the deposition of binding material onto the foam particles has a gradient characteristic from sub-region 124a sub-region to 124b to sub-region 124c. Accordingly, a property associated with the level of fusions, e.g., density of the sub-region, can vary in a gradient manner from one sub-region to another sub-region. In FIG. 10, the level of fusion of the foam particles is denoted by the grayscale shown, with lighter regions having a lower level of fusion of foam particles and darker regions having a higher level of fusion of foam particles. As shown in FIG. 10, the sole component 120 comprises a further sub-region, 123, that defines a highly fused or bonded outer edge of the sole component 120.

While the disclosed methods described herein can be used for making any of a variety of components, including a variety of components for an article of footwear, the components can include a pre-form midsole, an outsole, a sock-liner, a heel-cushioning pad, an insole, or an insert. Additional articles can include a tongue padding, a collar padding, and a combination thereof. As described above and detailed more completely below, the articles made using the disclosed methods described herein can exhibit sub-regions having different properties such as, but not limited to, bulk density, resiliency, or flexural modulus. The sub-regions can be discrete regions having a property distributed more or less uniformly within the sub-region. The article manufactured by the disclosed methods may be characterized by a gradient distribution of the property along an x-axis, y-axis, and/or z-axis of the article.

The article can be a padding component in shinguards, shoulder pads, chest protectors, masks, helmets or other headgear, knee protectors, and other protective equipment; a component placed in an article of clothing between textile layers; or may be used for other known padding applications for protection or comfort, especially those for which weight of the padding is a concern.

The present disclosure relates to an article made by a disclosed method as described herein. The article can be used in the manufacture of an article of footwear. The article used in the manufacture of an article of footwear can be a midsole, an outsole, a sock-liner, or a heel-cushioning pad, or can be a pre-form which is compression molded to form a midsole, an outsole, a sock-liner, or a heel-cushioning pad. The article can be a padding component used in a sports helmet, a backpack, apparel, sports uniform padding, or combat gear.

In various examples, the article is characterized by a plurality of sub-regions comprising a first sub-region characterized by a first property and a second sub-region characterized by a second property, wherein the first property is not equal to the second property, and wherein the first property and the second property are flexural modulus, stiffness, bulk density, or resilience.

In various examples, the article is characterized by a plurality of cross-sectional sub-regions comprising a first sub-region characterized by a first flexural modulus and a second sub-region characterized by a second flexural modulus, wherein the first flexural modulus is not equal to the second flexural modulus.

In various examples, the article is characterized by a plurality of cross-sectional sub-regions comprising a first sub-region characterized by a first bulk density and a second sub-region characterized by a second bulk density, wherein the first bulk density is not equal to the second bulk density.

In various examples, the article is characterized by a plurality of cross-sectional sub-regions comprising a first sub-region characterized by a first stiffness and a second sub-region characterized by a second stiffness, wherein the first stiffness is not equal to the second stiffness.

In various examples, the article is characterized by a plurality of cross-sectional sub-regions comprising a first sub-region characterized by a first resilience and a second sub-region characterized by a second resilience, wherein the first resilience is not equal to the second resilience.

Methods of Manufacturing a Component Using Foam Particles.

The present disclosure pertains to methods for forming an article, the methods comprising: arranging a plurality of foam particles, wherein the arranged plurality of foam particles comprises a thermoplastic material, and wherein the arranged plurality of foam particles has a number average particle size of about 0.04 millimeters to about 10 millimeters in a longest dimension; and affixing together at least a portion of the plurality of foam particles, wherein the arranging and affixing are carried out for two or more iterations, forming a component; and decorating a portion of the plurality of foam particles. As described in more detail below the decorating can comprise applying a coating to the portion of the plurality of foam particles, embossing or debossing the portion of the plurality of foam particles, or both.

The methods described herein comprise various disclosed steps, each of which can be repeated, and as used herein, "iteration" is understood to refer to a repetition of a step or collection of steps. For example, a disclosed method can comprise steps such as arranging the plurality of foam particles, and affixing together at least a plurality of foam particles, as described above. Accordingly, it is understood that the present disclosure encompasses one or more iteration of each step independently of the other steps. For example, the arranging step can be repeated for one or more iterations, independently of other steps or iterations of steps. In a similar manner, the affixing can be repeated for one or more iterations independently of iterations of the arranging step. In other contexts, an iteration can comprise one or more repetitions of an ensemble or group of steps. For example, a method can include one or more iterations involving a combination or sequence of the arranging and the affixing steps. It will be understood that an iteration can include one or more other steps, collectively or independently, or portions of steps as described herein. Accordingly, a cycle, comprising a sequence of steps, can be repeated for one or more iterations. The number of iterations can be from 1 to about 500 iterations, from 1 to about 400 iterations, from 1 to about 300 iterations, from 1 to about 250 iterations, from 1 to about 200 iterations, from 1 to about 150 iterations, from 1 to about 100 iterations, from 1 to about 90 iterations, from 1 to about 80 iterations, from 1 to about 70 iterations, from 1 to about 60 iterations, from 1 to about 50 iterations, from 1 to about 40 iterations, from 1 to about 30 iterations, from 1 to about 20 iterations, from 1 to about 10 iterations, from 1 to about 9 iterations, from 1 to about 8 iterations, from 1 to about 7 iterations, from 1 to about 6 iterations, from 1 to about 5 iterations, from 1 to about 4 iterations, from 1 to about 3 iterations, from 1 to about 2 iterations, any subrange within the foregoing ranges, or any set of values within the foregoing ranges.

The arranging a plurality of foam particles can comprise depositing a layer comprising the plurality of foam particles. The layer can be essentially planar. The component formed by the disclosed methods can be formed from a single layer. Alternatively, the component formed by the disclosed methods can be formed from at least two layers. The component can be formed from 2 to 50 layers; 2 to 40 layers; 2 to 30 layers; 2 to 25 layers; 2 to 20 layers; 2 to 15 layers; 2 to 10 layers; or 2 to 5 layers. The component can be formed layer-wise from a plurality of layers.

The arranging the plurality of foam particles step in the disclosed method comprises arranging using a roller mechanism, a wiper mechanism, a blower mechanism, or a combination thereof. An exemplary roller mechanism can comprise a smooth roller surface, or alternatively, a textured roller surface. The arranging the plurality of foam particles can comprise arranging using a wiper mechanism. It is understood that the arranging the plurality of foam particles can be arranging a layer of a plurality of foam particles.

The affixing together the portion of the plurality of foam particles can include affixing the arranged foam particles within a target area. As discussed further below, affixing can include depositing a binding material to a target area, and then curing the binding material to affix the plurality of foam particles within the target area. As discussed further below, affixing can include applying actinic radiation to a target area to fuse the plurality of foam particles within the target area. A target area is understood to comprise any region comprising a plurality of foam particles into which a binding material or actinic radiation is directed. The target area can comprise an external surface of a region or sub-region, as well as underlying portions that are contiguous or in communication with the external surface of a region or sub-region. The target area can comprise not only the exterior surfaces of the plurality of foam particles, but those portions of the plurality of foam particles accessible to the binding material. The target area can comprise not only the exterior surfaces of the plurality of foam particles, but those portions of the plurality of foam particles accessible to the actinic radiation used to soften and melt the foam particles. For example, a target area can be a portion of a layer of a plurality of foam particles. In some instances, binding material can be provided via a nozzle, such as a piezoelectric printhead, that is used to spray or coat a binding material on a subset of a plurality of foam particles in certain portions of the layer of the plurality of foam particles. Alternatively, the binding material can be provided to all or substantially all of a plurality of foam particles if the desired target area comprises all of the foam particles. In some instances, actinic radiation can be provided via a directed energy beam that is used to increase the temperature of a subset of a plurality of foam particles in certain portions of the layer of the plurality of foam particles. Alternatively, the actinic radiation can be provided to all or substantially all of a plurality of foam particles if the desired target area comprises all of the foam particles. In some embodiments, a component can include a plurality of target areas, each independently receiving a desired application of actinic radiation or binder material. For example, a method may include depositing a first binding material to a first target area, and a second binding material to a second target area. Likewise, a method could include applying actinic radiation under a first set of conditions to a first target area, and a second set of conditions to a second target area. A method could include depositing a binding material to a first target area and actinic radiation to a second target area. In this way, a component can be made having sub-regions with different properties.

Affixing Using Binding Material.

Affixing together at least a portion of the plurality of foam particles can include affixing the foam particles using one or more binding materials. The binding material can include any of the binding materials described herein.

Accordingly, the affixing can include depositing a binding material in a binding material target area, wherein the binding material target area comprises at least a portion of the arranged plurality of foam particles. The binding material can be liquid or solid. The binding material can comprise one or more binding materials. Depositing coats at least a portion of defining surfaces of the arranged plurality of foam particles with the binding material. After depositing, the deposited binding material is solidified or cured within at least the binding material target area, wherein the solidifying or curing results in affixing at least a portion of the arranged plurality of foam particles within the target area.

Solidifying or curing the binding material can comprise decreasing the temperature of the binding material to a temperature below a creep relaxation temperature, a heat deflection temperature, a Vicat softening temperature or a melting temperature of the binding material to at least partially solidify the binding material. The affixing can comprise applying energy to the deposited binding material and the arranged plurality of foam particles in an amount and for a duration sufficient to soften the binding materials; and decreasing a temperature of the region of the arranged plurality of foam particles to a temperature at or below which the softened binding material re-solidifies; thereby affixing at least a portion of the coated at least a portion of the plurality of foam particles in the binding material target area. Applying energy can comprise applying energy in the infrared spectrum.

The binding material can comprise one or more monomers, one or more polymers, or combinations thereof; and the solidifying or curing comprises: forming at least one chemical bond between the one or more monomers, the one or more polymers, or the combinations thereof of the binding material; and/or forming at least one chemical bond between the coated at least a portion of the defining surfaces of the arranged plurality of foam particles in the binding material target area and the one or more monomers, the one or more polymers, or the combinations thereof of the binding material; thereby affixing the coated at least a portion of the arranged plurality of foam particles to each other or to uncoated foam particles in the binding material target area.

The binding material can comprise a solvent for the foam particles, and following the depositing of the binding material, at least a portion of the defining surfaces of the arranged plurality of foam particles is dissolved with the solvent, forming dissolved defining surfaces of the arranged foam particles. Following the dissolving, the solidifying and curing comprises, removing at least a portion of the solvent of the binding material and solidifying the at least a portion of the dissolved defining surfaces of the arranged foam particles, thereby affixing at least a portion of the arranged plurality of foam particles to each other or to uncoated foam particles in the binding material target area.

The method can include depositing a first binding material comprising a solvent and a second binding material that is a binding thermoplastic elastomer that is soluble in the solvent. The solidifying or curing can comprise removing the solvent and solidifying the binding thermoplastic elastomer material on at least a portion of the defining surfaces of the arranged foam particles, thereby affixing at least a portion of the arranged plurality of foam particles to each other or to uncoated foam particles in the binding material target area.

Depositing the binding material can include jetting or spraying the binding material onto a target area of an arranged portion of a plurality of foam particles. For example, the binding material can be dispensed through one or more nozzles, e.g., piezoelectric nozzles. A device comprising multiple nozzles can be configured such that each nozzle can be individually controlled in order to vary fluid dispensing velocity, droplet size, and/or other properties that alter the area of a target area unto which binding material is deposited with each depositing iteration and/or the amount of binding material deposited unto a target area with each depositing iteration. The binding material can be deposited via one or more nozzles at a frequency of about 0.1, 0.5, 1, 2, 3, 4, 5, 6, 7, 8, 9, 10, 15, 20 kilohertz, a range encompassed by an of the foregoing values, or a set of values within a range encompassed by an of the foregoing values. The binding material can be deposited via one or more nozzles such that the droplet dispensed from each nozzle is about 1, 2, 3, 4, 5, 10, 15, 20, 25, 30, 35, 40, 45, 50, 55, 60, 70, 80, 90, 100, 150, 200 micrometers in the longest dimension, a range encompassed by an of the foregoing values, or a set of values within a range encompassed by an of the foregoing values. In some instances, the droplet dispensed from the one or more nozzles is spherical or ellipsoid.

Affixing Using Actinic Radiation

Affixing together the plurality of foam particles can comprise using actinic radiation to fuse a portion of the foam particles to each other.

Accordingly, the disclosed methods can comprise heating a target area with comprising a plurality of foam particles with a directed energy beam under conditions effective to fuse a portion of the plurality of foam particles comprising one or more thermoplastic elastomers. Heating of a target area can be carried out for one or multiple iterations. Heating a target area with a directed energy beam can comprise selective laser sintering of the foam particles.

The affixing can comprise increasing a temperature of at least a portion of the plurality of foam particles with actinic radiation under conditions effective to melt or soften a portion of the first thermoplastic elastomer material at a first surface of at least one of the plurality of foam particles; and decreasing the temperature of the melted or softened portion of the first thermoplastic elastomer material, thereby solidifying the melted or softened portion of the first thermoplastic elastomer material and forming a plurality of fused foam particles; wherein the increasing the temperature is carried out for at least one iteration.

In some embodiments, the increasing the temperature of at least a portion of the plurality of foam particles with actinic radiation under conditions effective to melt or soften a portion of the first thermoplastic elastomer material at a first surface of at least one of the plurality of foam particles further comprises intermingling melted first thermoplastic elastomer material from the first surface of the foam particle with a melted first thermoplastic elastomer material at a second surface of an adjacent foam particle. In some embodiments, the decreasing the temperature of the melted or softened portion of the first thermoplastic elastomer material comprises decreasing a temperature of the intermingled thermoplastic elastomer material, thereby solidifying the melted portion of the thermoplastic elastomer and forming the plurality of fused foam particles.

It is understood that the arranging and heating steps can be repeated on a given layer in order to achieve the desired properties for the layer or for sub-regions within the layer.

The directed energy beam can be a laser beam. The laser beam can be emitted by a gas dynamic laser, a diode laser, or a lead salt laser. The laser beam can be emitted by a carbon dioxide laser. The laser beam can be within the infrared spectrum. The laser beam can broadly comprise the all or most of the infrared spectrum, or alternatively, the laser beam can comprise sub-regions of the infrared spectrum such as the far infrared spectrum, the near infrared spectrum, the mid infrared spectrum.

The laser beam can comprise two or more laser beams, wherein each laser beam is directed at the target area. Each of the two or more laser beams can comprise a different portion of the electromagnetic light spectrum. For example, the laser beam can comprise one laser emitting in the near infrared spectrum and a second laser beam emitting in the far infrared spectrum.

The laser beam can emit a beam with a wavelength of about 700 nanometers to about 1 millimeters; about 1 micrometers to about 20 micrometers; about 3 micrometers to about 15 micrometers; about 3 micrometers to about 8 micrometers; about 8 micrometers to about 15 micrometers; or about 9 micrometers to about 11 micrometers.

The laser beam can have a beam width of about 0.1 millimeters to about 0.7 millimeters; about 0.2 millimeters to about 0.6 millimeters; about 0.3 millimeters to about 0.5 millimeters; or about 0.3 millimeters to about 0.4 millimeters. The laser beam can be de-focused.

The laser beam can have a scan pattern such that each pass of the laser beam overlaps the adjacent pass of the laser beam by a fractional amount of about 0.1 to 0.5. The laser beam can have a scan pattern such that each pass of the laser beam overlaps the adjacent pass of the laser beam by a fractional amount of about 0.3.

The directed energy beam can have a power output of about 25 to about 75 watts; about 35 to about 55 watts; about 45 to about 65 watts; or about 50 to about 60 watts. The directed energy beam can have a power output of about 55 watts.

The processing conditions can include directing a directed energy beam at a scanning rate across a target area of about 7,500 millimeters per second to about 25,000 millimeters per second, or alternatively, at a scanning rate across a target area of about 10,000 millimeters per second to about 15,000 millimeters per second. The processing conditions can include directing a directed energy beam at a scanning rate across a target area of about 12,500 millimeters per second.

The heating of a given target area comprising a plurality of foam particles can be carried out for a varied number of iterations, e.g., 1 iterations to 500 iterations; 1 iterations to 10 iterations; 1 iterations to 8 iterations; 1 iterations to 7 iterations; 2 iterations to 10 iterations; 2 iterations to 8 iterations; or 2 iterations to 7 iterations. The heating a target area of the plurality of foam particles can be carried out for at least 2 iterations. Heating the target area can be carried out for 1 iteration, 2 iterations, 3 iterations, 4 iterations, 5 iterations, 6 iterations, or 7 iterations.

The heating of a target area can fuse a first foam particle to a second foam particle in the target area, wherein the first foam particle is melted to a depth of about 10 micrometers about 500 micrometers measured from the surface of the first foam particle, and wherein the second foam particle is melted to a depth of about 10 micrometers about 500 micrometers measured from the surface of the second foam particle. The heating of a target area can fuse a first foam particle to a second foam particle in the target area, wherein the first foam particle is melted to a depth of about 25 micrometers about 200 micrometers measured from the surface of the first foam particle, and wherein the second foam particle is melted to a depth of about 25 micrometers about 200 micrometers measured from the surface of the second foam particle.

The target area of the plurality of foam particles can have a density of about 0.100 grams per cubic centimeter to about 0.700 grams per cubic centimeter, or alternatively, about 0.300 grams per cubic centimeter to about 0.500 grams per cubic centimeter, after directing the energy beam at the target area.

The disclosed methods of forming an article can further comprise heating a plurality of target areas on the plurality of particles. The article can have a border region defined by a subset of the plurality of target areas. The article can include a first cross-sectional region including a subset of the plurality of target areas, and wherein the first cross-sectional region is heated. Alternatively, the article can include a first cross-sectional region including a subset of the plurality of target areas, and wherein the first cross-sectional region is not heated. The heating of the plurality of target areas can be carried out by directing the directed energy beam to each target area using a vector scan method. Alternatively, the heating of the plurality of target areas can be carried out by directing the directed energy beam to each target area using a raster scan method. The plurality of target areas can comprise a first plurality of target areas and a second plurality of target areas.

The disclosed methods can further comprise arranging a selective laser sintering powder on a surface of the article, such that the selective laser sintering powder comprises a second thermoplastic elastomer; and heating a target area of the laser sintering powder with a directed energy beam under conditions effective to fuse the laser sintering powder, wherein the heating the target area of the laser sintering powder is carried out for at least one iteration.

The selective laser sintering powder can be a conventional selective laser sintering powder comprising a thermoplastic elastomer. The thermoplastic elastomer, referred to herein immediately above, as the second thermoplastic elastomer, can independently comprise any thermoplastic elastomer, or combinations of thermoplastic elastomers, as disclosed herein, including, but not limited to, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, and any blend thereof. The selective laser sintering powder used can have a particle size of about 0.020 millimeters to about 0.100 millimeters. The selective laser sintering powder used can be a substantially unfoamed material.

The arranging the selective laser sintering powder on a surface of the article and the heating the target area of the laser sintering powder can be repeated for multiple iterations. In some cases, an iteration of the arranging comprises depositing a layer comprising the selective laser sintering powder. Multiple iterations of arranging and heating the selective laser sintering powder can be used to form a skin on an article manufactured using the disclosed methods using foam particles. Accordingly, the thickness of the skin can be modulated by the number of iterations of arranging and heating the selective laser sintering powdering that is placed on the surface of the foam article. The heating can be carried out for a period of time at a temperature such that the selective laser sintering powder fuses. In some instances, the heating can be carried out for a period of time at a temperature such that the selective laser sintering powder melts, such that the selective laser sintering powder flows in the melted state. That is, the heating can be at a temperature sufficient and a time sufficient to melt the selective laser sintering powder, thereby forming a melted selective laser sintering powder; and such that a portion of the melted selective laser sintering powder is flowable. A selective laser sintering powder can be selected based on the viscosity it will have in the melted state. For example, a more viscous melted selective laser sintering powder may be chosen if it is desired that it not penetrate significantly into the article (i.e., the foamed article prepared using the disclosed methods using foam particles). Alternatively, a selective laser sintering powdering have a low viscosity in the melted state may be desired when that it be capable of flowing more deeply into the foam article.

The arranging the selective laser sintering powder can include depositing the selective laser sintering powder on the surface of the article. Alternatively, the arranging the selective laser sintering powder can include spraying a suspension of the selective laser sintering powder in a solvent on the surface of the article. The solvent can either be water or an aqueous solution, or alternatively, an organic solvent.

The disclosed methods of forming an article can further comprise providing an additive to a layer. The additive can be provided during forming the layer of a plurality of foam particles. Alternatively, the additive can be provided after forming the layer of a plurality of foam particles and before directing the energy beam. The additive can be provided at the same or about the same time as directing the energy beam. The additive can be provided after directing the energy beam. It is understood that providing an additive can comprise spraying, sublimating, brushing, soaking, or other means suitable for bringing an additive in contact with at least one surface of the article.

The additive can be a polyurea or polyurethane coating. The polyurea or polyurethane coating can be sprayed onto the plurality of foam particles. The additive can comprise a binder, an adhesive, a lubricant, an anti-oxidant, a colorant, a filler, a laser sensitizing agent, and any combination thereof. The additive can be an adhesive. The adhesive can comprise a photocurable elastomeric resin, a heat activated resin, and combinations thereof.

The additive can comprise a laser sensitizing agent, such as an infrared absorber. An infrared absorber can be an infrared-absorbing dye or infrared-absorbing pigment. The infrared-absorbing pigment can be carbon black.

The disclosed methods can further comprise spraying or coating one or more layers of polyurea, polyurethane, or combinations thereof onto an article manufactured using the disclosed methods described herein. For example, an article, e.g., a sole component made using the disclosed methods or shoe comprising same, can be spray coated with one or more layers of a polyurea, a polyurethane, or combinations thereof. Suitable sprayable polyureas or polyurethanes are commercially available, e.g., STS 300 polyurethane, HIGHLINE 200 polyurethane, SUREGRIP polyurea, HIGHLINE 310 polyurea, or HIGHLINE 510 polyurea manufactured by ArmorThane USA, Inc. (Springfield, Mo., USA). At least the ground-facing surface of a sole component can be coated with a polyurea, a polyurethane, or combinations thereof. At least the ground-facing and side-surfaces of a sole component can be coated with a polyurea, a polyurethane, or combinations thereof.

Foam Particles.

Having described various methods for arranging and affixing foam particles, we further describe the foam particles. The foam particles used in the disclosed methods can be prepared via a suspension or an extrusion process. The term "foam particle" is used herein to refer to foamed polymers in particulate form, i.e., a foamed polymer in a particulate form such that the particulate has gas-filled cells, including an open cell structure, closed cell structure, or combinations thereof, within at least a portion of the interior volume of the foam particle. In some instances, greater than about 50 percent, about 60 percent, about 70 percent, about 80 percent, about 90 percent, or more of the interior volume of the foam particle can be formed from gas-filled cells. In some cases it is desirable that substantially all of the interior volume is formed from gas-filled cells. The foam particle can optionally have a skin covering greater than about 50 percent, about 60 percent, about 70 percent, about 80 percent, about 90 percent, or more of the exterior surface area of the foam particle. In some instances, the optional skin can cover substantially all of the exterior surface area of the foam particle. The foam particles can have a variety of shapes, or comprise a mixture of shapes, such as regularly shaped particles, such as rods, spheroid, ellipsoid, or ovoid shape; or such as irregularly shaped particles. The foam particles can optionally comprise a non-foam skin.

In a suspension process, the thermoplastic elastomer in the form of pellets can be heated with water, with a suspending agent, and with the blowing agent in a closed reactor to above the softening point of the pellets. The pellets are thereby impregnated by the blowing agent. It is then possible to cool the hot suspension, whereupon the particles solidify with inclusion of the blowing agent, and to depressurize the reactor. The pellets comprising blowing agent and obtained in this way are foamed via heating to give the foam particles. As an alternative, it is possible to depressurize the hot suspension suddenly, without cooling (explosion-expansion process), whereupon the softened beads comprising blowing agent immediately foam to give the foam particles.

In the extrusion process, the thermoplastic elastomer can be mixed, with melting, in an extruder with a blowing agent which is introduced into the extruder. The mixture comprising a blowing agent can be extruded and pelletized under conditions of pressure and temperature such that the thermoplastic elastomer does not foam. For example, a method being used for this purpose being underwater pelletization, which is operated with a water pressure of more than 2 bar to provide expandable beads comprising blowing agent, which are then foamed via subsequent heating to give the foam particles. Alternatively, the mixture can also be extruded and pelletized at atmospheric pressure. In this process, the melt extrudate foams and the product obtained via pelletization comprises the foam particles.

The thermoplastic elastomer can be used in the form of commercially available pellets, powder, granules, or in any other form. It is advantageous to use pellets. An example of a suitable form is what are known as minipellets whose preferred average diameter is from 0.2 to 10 millimeters, in particular from 0.5 to 5 millimeters. These mostly cylindrical or round minipellets are produced via extrusion of the thermoplastic elastomer and, if appropriate, of other additives, discharged from the extruder, and if appropriate cooling, and pelletization. In the case of cylindrical minipellets, the length can be 0.2 to 10 millimeters, or alternatively can be from 0.5 to 5 millimeters. The pellets can also have a lamellar shape. The average diameter of the thermoplastic elastomer comprising blowing agent is preferably from 0.2 to 10 millimeters.

The blowing agent can be selected at least in part depending upon the particular process used. In the case of the suspension process, the blowing agent used can comprise organic liquids or inorganic gases, or a mixture thereof. Liquids that can be used comprise halogenated hydrocarbons, but preference is given to saturated, aliphatic hydrocarbons, in particular those having from 3 to 8 carbon atoms. Suitable inorganic gases are nitrogen, air, ammonia, or carbon dioxide.

The blowing agent can be a supercritical fluid. Non-limiting examples of suitable supercritical fluids include carbon dioxide (critical temperature 31.1 degrees Celsius, critical pressure 7.38 megapascals), nitrous oxide (critical temperature 36.5 degrees Celsius, critical pressure 7.24 megapascals), ethane (critical temperature 32.3 degrees Celsius, critical pressure 4.88 megapascals), ethylene (critical temperature 9.3 degrees Celsius, critical pressure 5.12 megapascals), nitrogen (critical temperature −147 degrees Celsius, critical pressure 3.39 megapascals), and oxygen (critical temperature −118.6 degrees Celsius, critical pressure 5.08 megapascals). The blowing agent can be a supercritical fluid selected from supercritical nitrogen, supercritical carbon dioxide, or mixtures thereof. The blowing agent can comprise or consist essentially of supercritical carbon dioxide.

Supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 megapascals$^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. The supercritical fluid can comprise from about 0.1 mole percent to about 7 mole percent of the polar fluid, based on total fluid, when used to infuse a polyurethane elastomer, polyurea elastomer, or a polyamide elastomer.

Supercritical fluids can be used in combination. For example, in some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

In production of foam particles via an extrusion process, the blowing agent can comprise volatile organic compounds whose boiling point at atmospheric pressure of about 1013 millibar is from −25 degrees Celsius to 150 degrees Celsius. The organic compounds can have a boiling point at atmospheric pressure of about 1013 millibar from −10 degrees Celsius to 125 degrees Celsius. Hydrocarbons, which may be halogen-free, have good suitability, in particular alkanes having from 4 to 10 carbon atoms, for example the isomers of butane, of pentane, of hexane, of heptane, and of octane, including sec-pentane. Other suitable blowing agents are bulkier compounds, examples being alcohols, ketones, esters, ethers, and organic carbonates.

It is also possible to use halogenated hydrocarbons, but the blowing agent can be halogen-free. Very small proportions of halogen-containing blowing agents in the blowing agent mixture are however not to be excluded. It is, of course, also possible to use mixtures of the blowing agents mentioned.

The amount of blowing agent is preferably from 0.1 to 40 parts by weight, in particular from 0.5 to 35 parts by weight, and particularly preferably from 1 to 30 parts by weight, based on 100 parts by weight of thermoplastic elastomer used.

In the suspension process, operations are generally carried out batchwise in an impregnator, e.g. in a stirred-tank reactor. The thermoplastic elastomer is fed, e.g., in the form of minipellets, into the reactor, as are water or another suspension medium, and the blowing agent and, optionally, a suspending agent. Exemplary suspending agents include water-insoluble inorganic stabilizers such as tricalcium phosphate, magnesium pyrophosphate, and metal carbonates; and also polyvinyl alcohol and surfactants, such as sodium dodecylarylsulfonate. The amounts usually used of these are from 0.05 to 10 weight percent, based on the thermoplastic elastomer.

The reactor is then sealed, and the reactor contents are heated to an impregnation temperature which is usually at least 100 degrees Celsius. The blowing agent can be added prior to, during, or after heating of the reactor contents. The impregnation temperature should be in the vicinity of the softening point of the thermoplastic elastomer. For example, impregnation temperatures of from about 100 degrees Celsius to about 150 degrees Celsius, or alternatively from about 110 degrees Celsius to about 145 degrees Celsius can be used.

After the reactor is sealed, the pressure inside the reactor may be adjusted to a target pressure (e.g., an impregnation pressure). The target pressure of the reactor may be selected, for example, as a function of the amount and nature of the blowing agent, and also of the temperature. The target pressure (i.e., an impregnation pressure) is generally from 2 to 100 bar (absolute). The pressure can, if necessary, be regulated via a pressure-control valve or via introduction of further blowing agent under pressure. At the elevated temperature and superatmospheric pressure provided by the impregnation conditions, blowing agent diffuses into the polymer pellets. The impregnation time can be generally from 0.5 to 10 hours.

In one example of the suspension process, cooling of the heated suspension takes place after the impregnation process. The suspension is usually cooled to below a suitable temperature, e.g., about 100 degrees Celsius, the result being re-solidification of the thermoplastic and inclusion of the blowing agent. The material is then depressurized. The product is foam particles which are conventionally isolated from the suspension. Adherent water is generally removed via drying, e.g., in a pneumatic dryer. Subsequently or previously, if necessary, adherent suspending agent can be removed by treating the beads with a suitable solvent or reagent. By way of example, treatment with an acid, such as nitric acid, hydrochloric acid, or sulfuric acid, can be used in order to remove acid-soluble suspending agents, e.g. metal carbonates or tricalcium phosphate.

In the extrusion process, it may be desirable to introduce the thermoplastic elastomer, the blowing agent and optional additives together (e.g., in the form of a mixture) or separately from one another at one or various locations of the extruder. It is possible, but not required to prepare a mixture in advance from the solid components. By way of example, it is possible to begin by mixing the thermoplastic elastomer and, if appropriate, additives, and to introduce the mixture into the extruder, and then introduce the blowing agent into the extruder, so that the extruder mixes the blowing agent into to polymer melt. It is also possible to introduce a mixture of blowing agent and additives into the extruder, i.e. to premix the additives with the blowing agent.

In the extruder, the mentioned starting materials are mixed, at least partially concurrently with melting of the thermoplastic elastomer. Any of the conventional screw-based machines can be used as extruder, in particular single-screw and twin-screw extruders (e.g. Werner & Pfleiderer ZSK machines), co-kneaders, Kombiplast machines, MPC kneading mixers, FCM mixers, KEX kneading screw extruders, and shear-roll extruders, as known to one skilled in the art. The extruder can be operated at a temperature at which the thermoplastic elastomer is present in the form of a melt, e.g., from about 150 to about 250 degrees Celsius or from about 180 to about 210 degrees Celsius. However, the desired temperature will depend upon the melting temperature characteristics of the given thermoplastic elastomer.

The rotation, length, diameter, and design of the extruder screw(s), amounts introduced, and extruder throughput, are selected in a known manner in such a way as to give uniform distribution of the additives in the extruded thermoplastic elastomer.

In one example of the extrusion process, foam particles are produced. To prevent premature foaming of the melt comprising blowing agent on discharge from the extruder, the melt extrudate can be discharged from the extruder and pelletized under conditions of temperature and pressure such that essentially no foaming occurs. These conditions can be determined as a function of the type and amount of the polymers, of the additives, and in particular of the blowing agent. The ideal conditions can easily be determined via preliminary experiments.

A method of preparing the foam particles used in the disclosed methods and articles described herein is underwater pelletization in a waterbath whose temperature is below 100 degrees Celsius and which is subject to a pressure of at least 2 bar (absolute). Excessively low temperature should be avoided, because otherwise the melt hardens on the die plate, and excessively high temperature should also be avoided since otherwise the melt expands. As the boiling point of the blowing agent increases and the amount of the blowing agent becomes smaller, the permissible water temperature becomes higher and the permissible water pressure becomes lower. In the case of the particularly preferred blowing agent sec-pentane, the ideal waterbath temperature is from about 30 degrees Celsius to about 60 degrees Celsius and the ideal water pressure is from 8 to 12 bar (absolute). It is also possible to use other suitable coolants instead of water. It is also possible to use water-cooled die-face pelletization. In this process, encapsulation of the cutting chamber is such as to permit operation of the pelletizing apparatus under pressure. The foam particles can then isolated from the water and, if appropriate, dried.

The foam particles used in the disclosed methods and articles can be prepared using a continuous process in which a thermoplastic elastomer is melted in a first stage in a twin-screw extruder, and then the polymer melt is conveyed in a second stage through one or more static and/or dynamic mixing elements, and is impregnated with a blowing agent. The melt impregnated with the blowing agent can then be extruded through an appropriate die and cut to give foam particle material, e.g., using an underwater pelletization system (UWPS). A UWPS also can be used to cut the melt emerging from the die directly to give foam particle material or to give foam particle material with a controlled degree of incipient foaming. It is possible to control production of foam bead material by controlling the counter-pressure or temperature, or both, in the water bath of the UWPS.

Underwater pelletization is generally carried out at pressures in the range from 1.5 to 10 bar to produce the expandable polymer bead material. The die plate typically has a plurality of cavity systems with a plurality of holes. Generally, a hole diameter in the range from 0.2 to 1 millimeters can provide expandable polymer bead material with the preferred average bead diameter in the range from 0.5 to 1.5 millimeters. Expandable polymer bead material with a narrow particle size distribution and with an average particle diameter in the range from 0.6 to 0.8 millimeters leads to better filling of the automatic molding system, where the design of the molding has relatively fine structure. This also gives a better surface on the molding, with smaller volume of interstices.

The foam particles used in the disclosed methods and articles can have a broad range of shapes, including generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. As used herein, "generally" as used to describe a shape is intended to indicate an overall shape that may have imperfections and irregularities, such as bumps, dents, imperfectly aligned edges, corners, or sides, and so on.

The foam particles used in the disclosed methods and articles can be generally spherical or ellipsoidal. At least a portion of the foam particles can be ellipsoid shaped or generally ellipsoid shaped. For example, at least about 20 percent, or at least about 25 percent or at least about 30 percent of the foam particles are ellipsoid-shaped foam particles. At least a portion of the foam particles can be spheroid shaped or generally spheroid shaped. For example, at least about 20 percent, or at least about 25 percent or at least about 30 percent of the foam particles are spheroid-shaped foam particles.

At least a portion of the foam particles can be irregularly shaped. Alternatively, at least a portion of the foam particles can be regularly shaped or polyhedral shaped. In the case of non-spherical particles, the foam particles can have an aspect ratio, which is a ratio of the largest major diameter of a cross-section taken perpendicular to the major (longest) axis of the particle. The non-spherical foam particles can have an aspect ratio of about 0.1 to about 1.0; about 0.60 to about 0.99; of about 0.89 to about 0.99; or of about 0.92 to about 0.99. The foam particles can have a number average circularity value of about 0.60 to about 0.99, or from about 0.89 to about 0.99 or from about 0.92 to about 0.99.

The foam particles used in the disclosed methods and articles can have a number average particle size of about 0.04 millimeters to about 10 millimeters in the longest dimension. The foam particles can have a number average particle size of about 0.04 millimeters to about 7 millimeters in the longest dimension; about 0.04 millimeters to about 5 millimeters in the longest dimension; about 0.04 millimeters to about 4 millimeters in the longest dimension; about 0.04 millimeters to about 3 millimeters in the longest dimension; about 0.04 millimeters to about 2 millimeters in the longest dimension; about 0.04 millimeters to about 1.5 millimeters in the longest dimension; about 0.04 millimeters to about 1 millimeters in the longest dimension; about 0.04 millimeters to about 0.9 millimeters in the longest dimension; about 0.04 millimeters to about 0.8 millimeters in the longest dimension; about 0.04 millimeters to about 0.7 millimeters in the longest dimension; about 0.04 millimeters to about 0.6 millimeters in the longest dimension; about 0.04 millimeters to about 0.5 millimeters in the longest dimension; about 0.04 millimeters to about 0.4 millimeters in the longest dimension; about 0.04 millimeters to about 0.3 millimeters in the longest dimension; about 0.04 millimeters to about 0.2 millimeters in the longest dimension; or about 0.04 millimeters to about 0.1 millimeters in the longest dimension. The foam particles can have a number average particle size of about 0.04 millimeters; about 0.05 millimeters; about 0.06 millimeters; about 0.07 millimeters; about 0.08 millimeters; about 0.09 millimeters; about 0.10 millimeters; about 0.15 millimeters; about 0.20 millimeters; about 0.25 millimeters; about 0.30 millimeters; about 0.35 millimeters; about 0.40 millimeters; about 0.45 millimeters; about 0.50 millimeters; about 0.55 millimeters; about 0.60 millimeters; about 0.65 millimeters; about 0.70 millimeters; about 0.75 millimeters; about 0.80 millimeters; about 0.85 millimeters; about 0.90 millimeters; about 0.95 millimeters; about 1.0 millimeters; about 1.1 millimeters; about 1.2 millimeters; about 1.3 millimeters; about 1.4 millimeters; about 1.5 millimeters; about 1.6 millimeters; about 1.7 millimeters; about 1.8 millimeters; about 1.9 millimeters; about 2.0 millimeters; about 2.1 millimeters; about 220 millimeters; about 2.3 millimeters; about 2.4 millimeters; about 2.5 millimeters; about 2.6 millimeters; about 2.7 millimeters; about 2.8 millimeters; about 2.9 millimeters; about 3.0 millimeters; about 3.5 millimeters; about 4.0 millimeters; about 4.5 millimeters; about 5.0 millimeters; about 5.5 millimeters; about 6.0 millimeters; about 6.5 millimeters; about 7.0 millimeters; about 7.5 millimeters; about 8.0 millimeters; about 8.5 millimeters; about 9.0 millimeters; about 9.5 millimeters; about 10 millimeters; or any range or any combination of the foregoing values.

The foam particles used in the disclosed methods and articles can have a number average particle size of about 0.1 millimeters to about 10 millimeters in the longest dimension. The foam particles can have a number average particle size of about 0.3 millimeters to about 7 millimeters in the longest dimension; about 0.5 millimeters to about 5 millimeters in the longest dimension; about 1 millimeters to about 5 millimeters in the longest dimension; about 1 millimeters to about 4 millimeters in the longest dimension; about 1 millimeters to about 3 millimeters in the longest dimension; about 1 millimeters to about 2 millimeters in the longest dimension; about 1.5 millimeters to about 5 millimeters in the longest dimension; about 1.5 millimeters to about 4 millimeters in the longest dimension; about 1.5 millimeters to about 3 millimeters in the longest dimension; or about 1.5 millimeters to about 2.5 millimeters in the longest dimension. The foam particles can have a number average particle size of about 0.10 millimeters; about 0.15 millimeters; about 0.20 millimeters; about 0.25 millimeters; about 0.30 millimeters; about 0.35 millimeters; about 0.40 millimeters; about 0.45 millimeters; about 0.50 millimeters; about 0.55 millimeters; about 0.60 millimeters; about 0.65 millimeters; about 0.70 millimeters; about 0.75 millimeters; about 0.80 millimeters; about 0.85 millimeters; about 0.90 millimeters; about 0.95 millimeters; about 1.0 millimeters; about 1.1 millimeters; about 1.2 millimeters; about 1.3 millimeters; about 1.4 millimeters; about 1.5 millimeters; about 1.6 millimeters; about 1.7 millimeters; about 1.8 millimeters; about 1.9 millimeters; about 2.0 millimeters; about 2.1 millimeters; about 220 millimeters; about 2.3 millimeters; about 2.4 millimeters; about 2.5 millimeters; about 2.6 millimeters; about 2.7 millimeters; about 2.8 millimeters; about 2.9 millimeters; about 3.0 millimeters; about 3.5 millimeters; about 4.0 millimeters; about 4.5 millimeters; about 5.0 millimeters; about 5.5 millimeters; about 6.0 millimeters; about 6.5 millimeters; about 7.0 millimeters; about 7.5 millimeters; about 8.0 millimeters; about 8.5 millimeters; about 9.0 millimeters; about 9.5 millimeters; about 10 millimeters; or any range or any combination of the foregoing values.

The foam particles can have a density of about 0.1 grams per cubic centimeter to about 0.8 grams per cubic centimeter. The foam particles can have a density of about 0.30 grams per cubic centimeter to about 0.50 grams per cubic centimeter; or about 0.32 grams per cubic centimeter to about 0.48 grams per cubic centimeter. Alternatively or additionally, the foam particles can be characterized by their bulk density. Accordingly, the foam particles can have a bulk density of about 80 grams per liter to about 200 grams per liter. The foam particles can have a bulk density of about 90 grams per liter to about 200 grams per liter; about 90 grams per liter to about 190 grams per liter; about 90 grams per liter to about 180 grams per liter; about 90 grams per liter to about 170 grams per liter; about 90 grams per liter to about 160 grams per liter; about 90 grams per liter to about 150 grams per liter; about 90 grams per liter to about 140 grams per liter; about 90 grams per liter to about 130 grams per liter; about 100 grams per liter to about 200 grams per liter; about 100 grams per liter to about 190 grams per liter; about 100 grams per liter to about 180 grams per liter; about 100 grams per liter to about 170 grams per liter; about 100 grams per liter to about 160 grams per liter; about 100 grams per liter to about 150 grams per liter; about 100 grams per liter to about 140 grams per liter; about 100 grams per liter to about 130 grams per liter; about 110 grams per liter to about 200 grams per liter; about 110 grams per liter to about 190 grams per liter; about 110 grams per liter to about 180 grams per liter; about 110 grams per liter to about 170 grams per liter; about 110 grams per liter to about 160 grams per liter; about 110 grams per liter to about 150 grams per liter; about 110 grams per liter to about 140 grams per liter; or about 110 grams per liter to about 130 grams per liter. The foam particles can have a bulk density of about 80 grams per liter; about 85 grams per liter; about 90 grams per liter; about 95 grams per liter; about 100 grams per liter; about 105 grams per liter; about 110 grams per liter; about 115 grams per liter; about 120 grams per liter; about 125 grams per liter; about 130 grams per liter; about 135 grams per liter; about 140 grams per liter; about 145 grams per liter; about 150 grams per liter; about 155 grams per liter; about 160 grams per liter; about 165 grams per liter; about 170 grams per liter; about 175 grams per liter; about 180 grams per liter; about 185 grams per liter; about 190 grams per liter; about 195 grams per liter; about 200 grams per liter; or any range or any combination of the foregoing values.

Each individual foam particle can have a weight of from about 2.5 milligrams to about 50 milligrams.

The foam particles can have a compact outer skin. As used herein, a "compact skin" means that the foam cells in the outer region of the foamed particles are smaller than those in the interior. Optionally, the outer region of the foamed particles can have no pores.

The foam particles can be closed-cell foam particles.

The foam particles can further comprise one or more colorants, such as any colorant disclosed herein, or can be coated with a colorant in order to provide a desirable appearance. The plurality of foam particles can comprise two or more different colorants.

Binding Materials.

According to some of the disclosed methods, a binding material can be used to affix a plurality of foam particles. The binding material can be a thermal energy absorber, e.g., a microwave or infrared thermal energy absorber; an adhesive material, e.g., an adhesive comprising one or more monomers, one or more polymers, or combinations thereof; one or more solvents capable of softening or partially solubilizing a portion of a foam particle or capable of softening or partially solubilizing a coating applied to a foam particle; or combinations thereof.

The binding material can comprise a thermal energy absorber. The binding material comprising a thermal energy absorber can be a liquid or a flowable gel. The thermal energy absorber can be present in the binding material as a dispersion. Alternatively or additionally, the thermal energy absorber can be present in the binding material as an emulsion. The binding material comprising a thermal energy absorber can be provided through a printing head, such as an ink-jet print head. Thus, the binding material comprising the thermal energy absorber can have a viscosity that allows for dispersion through a print head. The thermal energy absorber can be present in the binding material which is provided via spraying using a spray head have one or more orifices of suitable diameter. In such instances, the binding material comprising the thermal energy absorber has a viscosity that allows for application via a spray head. The thermal energy absorber can comprise a form of carbon such as graphite, carbon fibers, carbon nanotubes, carbon black, or combinations thereof. The carbon black can be in the form of a nanoparticle.

The thermal energy absorber can be a microwave energy absorber. The microwave energy absorber can comprise a metal, a metal salt, metal oxide, a metal nitride, a metal carbide, a metal sulfide, a hydrated salt, a carbon, a clay, a silicate, a ceramic, a zeolite, a silica, an alumina, a titania gel, a vermiculate, a attapulgite, a molecular sieve, or combinations thereof. The microwave energy absorber can be a metal salt such as $CuX_n$ where n is an integer from 1 to 6 and X is a halogen; $ZnX_2$ or $SnX_2$ where X is a halogen, or combinations thereof. The microwave energy absorber can be a hydrated salt such as $NiCl_2.6H_2O$, $Al_2(SO_4)_3.18H_2O$, or combinations thereof. The microwave energy absorber can be a metal oxide, such as CuO, NiO, $Fe_3O_4$, $Co_2O_3$, $BaTiO_3$, or combinations thereof. The microwave energy absorber can be a metal sulfide such as $Ag_2S$, CuS, $MoS_3$, PbS, ZnS, FeS, $FeS_2$, or combinations thereof. The microwave energy absorber can be a metal carbide such as SiC, $W_2C$, $B_4C$, or combinations thereof. A variety of different metal nitrides are suitable for use as a microwave energy absorber, including, but not limited to TiN. The microwave energy absorber can be carbon, such as carbon in the form of graphite, carbon fibers, carbon nanotubes, carbon black, or combinations thereof. A carbon black can be any suitable form for use as a microwave energy absorber such a nanoparticle or a microparticle. A variety of different clays are suitable for use as a microwave energy absorber, including, but not limited to a sepiolite clay. The microwave energy absorber can be water or can further comprise water. The microwave energy absorber can have an average particle size of from about 0.1 nanometers to about 50 micrometers. The microwave energy absorber can be present in the binding material at from about 0.1 weight percent to about 25 weight percent based on the total weight of the binding material.

The thermal energy absorber can be an infrared energy absorber. There a variety of suitable infrared energy absorbers that can be used in the disclosed binding material. The infrared energy absorber can comprise a metal oxide, a metal complex compound, an infrared absorbing dye, or combinations thereof. The infrared energy absorber can be a metal oxide such as tin oxide, zinc oxide, copper oxide; antimony-doped tin oxide, indium-doped tin oxide, or combinations thereof. The infrared energy absorber can be a metal complex such as a zinc oxide comprising at least one element selected from the group consisting of In, Ga, Al, and Sb, or combinations thereof. The infrared energy absorber can be an infrared absorbing dye such as an anthraquinone dye, cyanine dye, polymethine dye, azomethine dye, azo dye, polyazo dye, diimonium dye, aminium dye, phthalocyanine dye, naphthalocyanine dye, indocyanine dye, naphthoquinone dye, indole phenol dye, triallylmethane dye, metal complex dye, dithiol nickel complex dye, azo cobalt complex dye, a squarylium dye, or combinations thereof. The binding material can comprise from about 0.001 weight percent to about 0.08 weight percent of the infrared energy absorber, based on the total weight of the binding material. The binding material can comprise from about 0.005 weight percent to about 0.06 weight percent of the infrared energy absorber, based on the total weight of the binding material.

The binding material can comprise an adhesive material. An adhesive material in the binding material can comprise one or more monomers, one or more polymers, or combinations thereof. The binding material comprising an adhesive material can be a liquid or a flowable gel. The adhesive material can be present in the binding material as a dispersion. Alternatively, the adhesive material can be present in the binding material as an emulsion. The binding material comprising an adhesive material can be deposited through a printing head, such as an ink-jet print head. Thus, the binding material comprising an adhesive material has a viscosity that allows the dispersion to flow through a print head. The adhesive material can be provided via spraying using a spray head having one or more orifices of suitable diameter. In such instances, the binding material comprising an adhesive material has a viscosity that allows for application via a spray head.

The binding material can include one or more monomers, one or more polymers, or combinations thereof. The one or more monomers can comprise one or more epoxy group, one or more acrylic acid group, one or more methacrylic acid, one or more methyl methacrylic acid group, or combinations thereof. The one or more polymers can comprise a photo-curable elastomeric resin, a heat activated resin, and combinations thereof. The one or more polymers can comprise a polyacrylate; a polyepoxide; a copolymer derived from one or more monomers comprising one or more epoxy group, one or more acrylic acid group, one or more methacrylic acid, one or more methyl methacrylic acid group; or combinations thereof. Useful copolymers include block copolymers comprising at least one polyacrylate block, polymethacrylate block, polymethylmethacrylate block, or combinations thereof. The binding material can further comprise an ultraviolet (UV) light-activated free radical polymerization initiator, a thermal energy-activated polymerization initiator, or combinations thereof.

The binding material can comprise one or more solvents capable of softening or partially solubilizing a portion of a foam particle or capable of softening or partially solubilizing a coating applied to a foam particle. The one or more solvents capable of softening or partially solubilizing a portion of a foam particle or capable of softening or partially solubilizing a coating applied to a foam particle is referred to herein as a "binding solvent." In some instances, the binding solvent can be applied to a plurality of foam particles, e.g., applying a pattern of binding solvent droplets, such that the solvent solubilizes and softens a portion of an outer layer of the foam particles, where at least some of the beads include outer layers which are in direct contact with the outer layers of other beads. The binding solvent can be applied to a plurality of foam particles comprising a coating, e.g., applying a pattern of binding solvent droplets, such that the solvent solubilizes and softens a portion of the coating, where at least some of the beads include coating on outer layers which are in direct contact with the coating on outer layers of other beads.

The binding material can have a viscosity suitable to application to depositing the binding material in a binding target area. For example, the viscosity can be between about 1 centipoise and about 50 centipoise, about 1 centipoise and about 40 centipoise, about 1 centipoise and about 30 centipoise, about 1 centipoise and about 20 centipoise, about 1 centipoise and about 10 centipoise, about 1 centipoise and about 5 centipoise, about 5 centipoise and about 50 centipoise, about 5 centipoise and about 40 centipoise, about 5 centipoise and about 30 centipoise, about 5 centipoise and about 20 centipoise, about 5 centipoise and about 10 centipoise, about 10 centipoise and about 50 centipoise, about 20 centipoise and about 50 centipoise, about 30 centipoise and about 50 centipoise, about 40 centipoise and about 50 centipoise, a subrange of any of the foregoing ranges, or a set of values within any of the foregoing ranges.

The binding material can have a surface tension suitable to application to depositing the binding material in a binding target area. For example, the surface tension can be between about 1 to about 50 millinewtons per meter, about 1 to about 40 millinewtons per meter, about 1 to about 30 millinewtons per meter, about 1 to about 20 millinewtons per meter, about 1 to about 10 millinewtons per meter, about 5 to about 50 millinewtons per meter, about 5 to about 40 millinewtons per meter, about 5 to about 30 millinewtons per meter, about 5 to about 20 millinewtons per meter, about 5 to about 10 millinewtons per meter, about 10 to about 50 millinewtons per meter, about 10 to about 40 millinewtons per meter, about 10 to about 30 millinewtons per meter, about 10 to about 20 millinewtons per meter, about 20 to about 50 millinewtons per meter, about 30 to about 50 millinewtons per meter, about 40 to about 50 millinewtons per meter, a subrange of any of the foregoing ranges, or a set of values within any of the foregoing ranges.

The binding material can have a vapor pressure suitable to application to depositing the binding material in a binding target area. For example, the vapor pressure can less than about 60 hectopascals, about 55 hectopascals, about 50 hectopascals, about 45 hectopascals, about 40 hectopascals, about 35 hectopascals, or about 30 hectopascals.

The binding material can comprise additives such as initiators, catalysts and delayers can be added to the particulate material which, for example, to enhance the bonding reaction. For example, the binding material can comprise monomeric binder systems based on urethanes, acrylates, methacrylates, styrenes, cross-linked or not cross-linked, polymerization triggered by UV light, radiation, heat, reactive activators. For example, the binding material can comprise monomers to form polyurethanes and one or more isocyanates. Such a binding material can be cured by depositing water or a water mist on the binding material to initiate the reaction.

The binding material can comprise multi-component glue systems such as polyurethane resins or epoxy resins for which cross-linking occurs through the reaction of two components. It is understood that a binding material comprising a multi-component system, such as a glue system mentioned above, that each component of the multi-component system can be dispensed via a separate nozzle and mixed during depositing, e.g., in a spray such that the streams dispensed from each nozzle mixes prior to depositing on a surface of a plurality of foam particles. Alternatively, each component of a multi-component system can be conveyed from a separate feed supply, and mixed in a mixing chamber immediately before dispensing from a nozzle.

The binding material can comprise a substance, such as an organic solvent or aqueous solution, which will dissolve all or part of the foam particles and bond them in this way.

The binding material can further comprise mixtures of different solvents and/or monomers, chemicals that cause cross-linking and/or reaction assisting chemicals such as delayers, catalysts and fillers as disclosed herein or as known to one skilled in the art. For example, in order to improve characteristics for depositing the binding material, the binder material can comprise yet further additives, e.g., for changing viscosity. That is, the binding material can comprise additives to increase or reduce viscosity, surface tension and/or other characteristics that change way the binding material is deposited on the foam particles, e.g. flows, sprays, dispenses from a nozzle, or combinations thereof. In this way, the depositing of the binding material can be improved.

The bonding of the foam particles can be achieved by a binding material comprising one or more solvents, a mixed solvent system, including a mixed solvent system comprising one or more organic solvents and optionally water or an aqueous solution. Non-limiting examples of solvents include alcohols, ketones, acetates, or mixtures thereof. It can also be a mixture of different solvents. The bonding function of the solvent is based on the foam particles being dissolved, at least in part, in the areas in which the binding material comprising the solvent is deposited. When the solvent escapes, the contact surfaces of the foam particles are bonded and a solid region is established. In some cases, a reduction in material can be seen.

The choice of one or more solvents to be included in the binding material is based, at least in part, upon the foam particles formulation and composition, e.g., the types and amounts of thermoplastic elastomer(s), additives, and fillers present, and the performance parameters for the curing and affixing steps of the disclosed methods, e.g., desired rate of dissolving the thermoplastic elastomers in the foam particles, whether all or only certain components of the foam particle formulation and composition should dissolve, cost, and compatibility with the additive manufacturing equipment being used. It is understood that the binding material composition, e.g., the specific solvent or solvents used and the relative amounts used, can be adjusted to fine tune or tailor the binding material to the solubility index of the foam particle formulation and composition, e.g., type and relative amounts of thermoplastic elastomers present therein.

That is, different solvents will be more effective at dissolving different polymers, and accordingly, the skilled artisan using the disclosed methods will assess the foam particle formulation and composition, e.g., type and relative amounts of thermoplastic elastomers present therein, and modify or tailor the binding material composition in a manner that matches a solvent that is effective at dissolving that particular chemistry or formulation. For example, a binding material comprising tetrahydrofuran and dimethylformamide can be used for foam particles comprising polyesters and/or low melt thermoplastic elastomers; or alternatively, a binding material comprising hexafluoroisopropanol and formic acid can be used for foam particles comprising aliphatic polyethers and various copolymers. In instances where the foam particles comprise a polyamide (nylon), a binding material comprising hexafluoroisopropanol can be used. The process of determining a solvent for use in the binding material can utilize experimental determination, various polymer solubility databases, and predictive methods (including software) making use of Hildebrand solubility parameters and/or Hansen solubility parameters.

The binding material can comprise a solvent that is water or an aqueous solution. For example, the aqueous solution can comprise, but is not limited to, acetic acid, formic acid, trifluoroacetic acid, or combinations thereof.

The binding material can comprise a solvent that is an organic solvent. For example, the organic solvent can comprise, but is not limited to, tetrahydrofuran, dimethylformamide, hexafluoroisopropanol, dichloromethane, or combinations thereof.

The binding material can comprise a solvent that is a mixed solvent system comprising a combination of at least two solvents. For example, the mixed solvent system can comprise, but is not limited to, mixed solvent systems comprising combinations of two or more of the following: acetic acid, formic acid, trifluoroacetic acid, tetrahydrofuran, chlorophenol, dimethylformamide, hexafluoroisopropanol, and dichloromethane. In a particular non-limiting example, the mixed solvent system can comprise formic acid and dichloromethane; formic acid and acetic acid; formic acid and chlorophenol; or formic acid and hexafluoroisopropanol.

The binding material comprising a solvent can further comprise compounds or materials that slow down the evaporation rate, thereby reducing deformation. For example, the rate of volatilization of an alcohol can be slowed through the addition of a moisture-containing material such as monoethylene glycol to the binding material. Alternatively, or in addition to the foregoing, the evaporation rate can be controlled by appropriate selection of the temperature used during the curing step.

The solvent or mixture of solvents can be altered to optimize the evaporation rate. For example, higher alcohols (n-butanol, pentanol, hexanol, etc.), which have higher boiling points and lower steam pressure, can provide a simple and effective way to reduce evaporation rate.

The binding material can comprise one or more polymers dissolved or partially solubilized in water, an aqueous solution, or an organic solvent. The binding material can comprise water-soluble materials such as starches or proteins or salts.

The binding material can be deposited and cured in a manner that provides relatively weak or temporary affixing of at least a portion of the arranged plurality of foam particles within the target area. For example, the article may be used as a pre-form which is subsequently compression molded. Accordingly, the level of adhesion needed between the beads may only need to be sufficient that the preform can be handled, including robotically handled, for transfer to a compression mold. In contrast, affixing at least a portion of the arranged plurality of foam particles within the target area may need to be relatively strong and/or permanent if the articles, and the foam beads therein, are used without a compression molding step.

The disclosed binding material can further comprise one or more colorants, such as any colorant disclosed herein, in order to provide a desirable appearance. The component can comprise two or more binding materials, each having a different colorant.

Additives.

In accordance with the present disclosure, the foam particles or binding material or both can optionally further comprise an additive. The additive can be incorporated directly into the disclosed foam particles or binding materials, or alternatively, applied thereto. Additives that can be used in the disclosed foam particles or binding materials include, but are not limited to, dyes, pigments, colorants, ultraviolet light absorbers, hindered amine light stabilizers, antioxidants, processing aids or agents, plasticizers, lubricants, emulsifiers, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

The optional additive can be an antioxidant such as ascorbic acid, an alkylated monophenol, an alkylthiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3, 5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methyl phenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonyl phenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3, 5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1, 5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl) isocyanurate, 1,3,5-tris(4-tert-butyl-3-hydroxy-2,6-di methyl benzyl)isocyanurate, 2,4,6-tris(3,5-di-tert-butyl-4-hydroxyphenylethyl)-1,3,5-triazine, 1,3,5-tris(3,5-di-tertbutyl-4-hydroxy-phenylpropionyl)-hexahydro-1,3,5-triazine, 1,3,5-tris(3,5-dicyclohexyl-4-hydroxybenzyl)isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis (3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N, N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethyl phenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis-(2,2,6,6-tetramethylpiperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

The optional additive can be a UV absorber and/or light stabilizer, including, but limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-(ω)-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butyl phenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β, β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, poly[methylpropyl-3-oxy-4-(2,2,6,6-tetramethyl-4-piperidyl)]siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethyl piperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-di methyl phenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3- sec-butyloxy-2-hydroxypropyloxy)phenylJ-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethylphenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2, 4,6-trimethyl phenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

The optional additive can be a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

The additive can be a polyamide stabilizer such as a copper salt of a halogen, e.g., iodide, and/or phosphorus compounds and salts of divalent manganese.

The optional additive can be a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

The optional additive can be a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. The additive can be a nucleating agent comprising both an inorganic and an organic material as disclosed herein above.

The optional additive can be a rheology modifier. The rheology modifier can be a nanoparticle having comparatively high aspect ratios, nano-clays, nano-carbon, graphite, nano-silica, and the like.

The optional additive can be a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyimide, polyester, polyurethane, polyimide, and the like), synthetic fibers (such as fibers comprising high molecular weight polyethylene, polypropylene, polystyrene, polyethylene ionomeric resins, polyimide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavyweight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

The optional additive can be a cross-linking agent. There are a variety of cross-linking agents that can be used in the disclosed thermoplastic compositions. For example, a cross-linking agent can be a free-radical initiator. The free radical initiator can generate free radicals through thermo cleavage or UV radiation. The free-radical initiator can be present in an amount from about 0.001 weight percent to about 1.0 weight percent. A variety of radical initiators can be used as the radical sources to make thermoplastic compositions have a crosslinked structure. Suitable radical initiators applied include peroxides, sulfurs, and sulfides. Exemplary peroxides include, but are not limited to, aliphatic peroxides and aromatic peroxides, such as diacetylperoxide, di-tert-butylperoxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl), or combinations of two or more of the foregoing.

The optional additive can be a colorant, as described further herein. For example, a colorant additive can be provided to the foam particle material before, during, or after formation of the foam particle. A colorant additive can be provided to the binder material before, during, or after deposition or curing of the binder material. A colorant additive can be provided to a plurality of foam particles during or after arranging or affixing the plurality of foam particles, or after formation of a component. It will be understood that the component can comprise more than one colorant additive. For example, the component can comprise a first colorant and a second colorant, wherein: the foam particles can comprise a first colorant, and the binding material can comprise a second colorant; a first portion of foam particles can comprise a first colorant and a second portion of foam particles can comprise a second colorant; a first portion of binding material can comprise a first colorant and a second portion of binding material can comprise a second colorant; or a combination thereof. In this instance, it is understood that the first colorant can comprise one or more dyes or pigments. Similarly, it is understood that the second colorant can comprise one or more dyes or pigments.
Decorating.

The present disclosure pertains to decorating a portion of the plurality of foam particles to provide a decorated component. Decorating can include applying a coating to at least a portion of the foam particles, embossing or debossing the portion of foam particles, or a combination thereof.

The method can include decorating the foam particles prior to or during arranging, prior to or during affixing, or after arranging and affixing, or a combination thereof. Where the method includes a plurality of iterations, the decorating can be performed during one or more iterations, after one or more iterations, between two iterations, or a combination thereof. The decorating can be performed after the last iteration, e.g., to the component.

The decorating can include embossing or debossing a portion of the component. The embossing or debossing can form a desired embossed or debossed surface pattern on a first surface of the component or a portion thereof. The embossing or debossing can be performed before, during or after any of the other decorating. For example, a surface of the component can be decorated such as by coating, dyeing, printing, etc., and then the decorated surface can be embossed or debossed. A surface of the component can be embossed or debossed, and then the embossed or debossed surface can be otherwise decorated such as by coating, dyeing, printing, etc.

The embossing or debossing can include contacting a first surface of the component with a second surface of an embossing or debossing medium having a relief or inverse of the desired embossed or debossed pattern. Subsequently, the component can be separated or removed from the second surface of the medium while the embossed or debossed surface pattern remains on the first surface of the component. The embossing or debossing medium can comprise a release paper, a mold, a drum, a plate, or a roller.

Contacting of the first surface with the second surface of the embossing or debossing medium can occur during or following increasing the temperature of the component to a first temperature at or above a softening or melting temperature of the component, and then forming the embossed or debossed surface. For example, the first temperature can be at or above a creep relaxation temperature, a heat deflection temperature, a Vicat softening temperature or a melting temperature of the thermoplastic material of the first surface, to at least partially melt or soften the first surface of the component. Subsequently, the temperature of the first surface of the component is reduced to a second temperature that is below the softening or melting temperature of the component, resulting in at least partially solidifying the material at the first surface of the component. For example, the second temperature can be below a creep relaxation temperature, a heat deflection temperature, a Vicat softening temperature or a melting temperature of the thermoplastic material of the first surface, to at least partially solidify the first surface of the component. The component can be removed or separated from the embossing or debossing medium prior to, during or after the temperature of the component being reduced to the second temperature. The first surface of the component retains the embossed or debossed surface pattern upon removing the embossing or debossing medium from the first surface of the component.

The embossing or debossing medium can provide energy to increase the temperature of the first surface of the component. The embossing or debossing medium can remove energy to decrease the temperature of the first surface to the second temperature. In some embodiments, pressure or vacuum may be applied to increase the contact between the first surface of the component and the second surface of the embossing or debossing medium.

The design of the embossing or debossing medium is a relief or inverse of the desired embossed or debossed surface pattern. The embossing or debossing medium can be made of material that can retain its surface design when applied to the component at temperatures and pressures in which the embossed or debossed surface pattern can be formed. The embossing or debossing medium can be made of one or a combination of materials such as a polymer, a metal, or a ceramic.

Applying a coating to all of or to a portion of the plurality of foam particles or to a portion of the component can comprise printing on the portion, painting on the portion, dyeing the portion, applying a film on the portion, or any combination thereof.

The coating can include one or more layers, such as a primer layer, a paint layer (e.g., dyes, pigments, and a combination thereof), an ink layer, a reground layer, an at least partially degraded polymer layer, a metal layer, an oxide layer, or a combination thereof.

The coating can be formed using digital printing, inkjet printing, offset printing, pad printing, screen printing, flexographic printing, heat transfer printing, physical vapor deposition including: chemical vapor deposition, pulsed laser deposition, evaporative deposition, sputtering deposition (radio frequency, direct current, reactive, non-reactive), plasma enhanced chemical vapor deposition, electron beam deposition, cathodic arc deposition, low pressure chemical vapor deposition and wet chemistry techniques such as layer by layer deposition, sol-gel deposition, or Langmuir-Blodgett film. Alternatively or in addition, the coating can be applied by spray coating, dip coating, brushing, spin coating, doctor blade coating, and the like.

The coating can have a percent transmittance of about 40% or less, about 30% or less, about 20% or less, about 15% or less, about 10% or less, about 5% or less, or about 1% or less, where "less" can include about 0% (e.g., 0 to 0.01 or 0 to 0.1), about 1%, about 2.5%, or about 5%.

The coating can include a paint composition that, upon applying to the structure, forms a thin layer. The thin layer can be a solid film having a colorant. The paint composition can include known paint compositions that can comprise one or more of the following components: one or more paint resin, one or more polymers, one or more dyes, and one or more pigments as well as water, film-forming solvents, drying agents, thickeners, surfactants, anti-skinning agents, plasticizers, mildewcides, mar-resistant agents, anti-flooding agents, and combinations thereof.

The coating can comprise a reground, and at least partially degraded, polymer layer. The reground, and at least partially degraded, polymer layer can have a color, such as those described above.

The coating can include a metal layer or oxide layer. The oxide layer can be a metal oxide, a doped metal oxide, or a combination thereof. The metal layer, the metal oxide or the doped metal oxide can include the following: the transition metals, the metalloids, the lanthanides, and the actinides, as well as nitrides, oxynitrides, sulfides, sulfates, selenides, tellurides and a combination of these. The metal oxide can include titanium oxide, aluminum oxide, silicon dioxide, tin dioxide, chromia, iron oxide, nickel oxide, silver oxide, cobalt oxide, zinc oxide, platinum oxide, palladium oxide, vanadium oxide, molybdenum oxide, lead oxide, and combinations thereof as well as doped versions of each. The metal oxide can be doped with water, inert gasses (e.g., argon), reactive gasses (e.g., oxygen or nitrogen), metals, small molecules, and a combination thereof.

The coating can be a coating on the surface of the component and/or a foam particle. The coating can be chemically bonded (e.g., covalently bonded, ionically bonded, hydrogen bonded, and the like) to the surface of the component and/or a foam particle.

The coating can comprise a polymeric material. The coating can be a product (or also referred to as "crosslinked product") of crosslinking a polymeric coating composition. The crosslinked coating can be a matrix of crosslinked polymers (e.g., a crosslinked polyester polyurethane polymer or copolymer). For example, the coating can comprise a water-borne dispersion of polymers such as a water-borne dispersion of polyurethane polymers (e.g., polyester polyurethane copolymers), and the water-borne dispersion of polymers can be crosslinked. The crosslinked coating can have a thickness of about 0.01 micrometers to 1000 micrometers. When the polymeric coating composition or a crosslinked product coating includes one or more colorants, such as solid pigment particles or dye, the colorants can be entrapped in the coating, including entrapped in the matrix of crosslinked polymers. For example, the coating can comprise a water-borne dispersion of polymers that includes one or more colorants, and the water-borne dispersion of polymers can be crosslinked to entrap the colorants. The solid pigment particles or dye can be physically entrapped in the crosslinked polymer matrix, can be chemically bonded (e.g., covalently bonded, ionically bonded, hydrogen bonded, and the like, with the coating including the polymeric matrix or with the material forming the surface of the article to which the coating is applied), or a combination of physically bonded and chemically bonded with the coating or article.

The coating (e.g., coating, polymeric coating composition (prior to curing), monomers and/or polymers of the matrix of crosslinked polymers, or precursors of the coating) can include a cross-linker, which functions to crosslink the polymeric components of the coating. The cross-linker can be a water-borne cross-linker. The cross-linker can include one or more of the following: a polycarboxylic acid crosslinking agent, an aldehyde crosslinking agent, a polyisocyanate crosslinking agent, or a combination thereof. The polycarboxylic acid crosslinking agent can be a polycarboxylic acid having from 2 to 9 carbon atoms. For example, the cross-linker can include a polyacrylic acid, a polymaleic acid, a copolymer of acid, a copolymer of maleic acid, fumaric acid, or 1, 2, 3, 4-butanetetracarboxylic acid. The concentration of the cross-linker can be about 0.01 to 5 weight percent or 1 to 3 weight percent of the coating.

The coating (e.g., coating, polymeric coating composition (prior to curing), monomers and/or polymers of the matrix of crosslinked polymers, or precursors of the coating) can include a solvent. The solvent can be an organic solvent. The organic solvent can be a water-miscible organic solvent. The coating may not include water, or may be essentially free of water. For example, the solvent can be or includes acetone, ethanol, 2-propanol, ethyl acetate, isopropyl acetate, methanol, methyl ethyl ketone, 1-butanol, t-butanol, or any mixture thereof.

The decorating can include applying a film to a surface of the component. For example, a film may be adhered to a surface of the component.

The decorating can include printing to a portion of the plurality of foam particles or to a portion of the component. The method can include printing a marking or plurality of markings onto a surface of one or more foam particles, or onto a surface of the component. The printing can include depositing at least one ink, or optionally a plurality of inks, onto a target print area of the foam particles or the component. The ink can include one or more colorants, pigments or dyes, as described herein. The ink can include a CMYK formulation or an RGB formulation. The printing can include screen printing, printing, ink jet printing, three-dimensional printing, flexographic printing, heat transfer printing, or any combination thereof. The printing can deposit the marking directly to a target region of the foam particles or component. The printing can deposit the one or more inks to a transfer media (e.g., a release paper) and then transferring the inks from the transfer media to the target region of the foam particles or the component.

The ink can be a sublimation ink formulation, and the printing can include depositing a sublimation ink on an outer surface of the component and then increasing the temperature of the component above the sublimation temperature of the sublimation ink. The sublimation ink can be provided on a transfer media such as a release paper printed with the sublimation ink and subsequently transferred from the transfer media to the component.

The ink can comprise an infrared radiation-absorber, and the printing can include depositing the ink on a target region that will be exposed to infrared radiation.

The printing can deposit one or more inks on top of another layer, such as a primer layer or a paint layer.

The printing can comprise affixing a printed film onto a surface of the component.

The printing can comprise printing a three-dimensional structure onto a surface of the component. The printing can have a three-dimensional structure. The printing can comprise an additive manufacturing process which deposits a polymeric material onto the exterior surface of the component, thereby creating a topography having a greater surface area on the exterior surface of the component as compared to the topography on the exterior surface of the component prior to the printing.

The printing can comprise receiving a set of predetermined information for the three-dimensional structure; wherein the set of predetermined information includes a first thickness for a region of the three-dimensional structure, and a thickness for a structural layer; calculating a number of structural layers to be printed in the region to achieve the first thickness for the region of the three-dimensional structure; instructing a printing device to print one or more structural layers onto the component using the set of predetermined information, wherein the number of structural layers is equal to the calculated number of structural layers; and printing the one or more structural layers onto the component to provide the three-dimensional structure having the first thickness. Printing a three-dimensional structure can include printing one or more color layers, or adding a colorant to the polymer composition.

The coating can include dyeing the foam particles, the affixed foam particles, the optional binding material, the component or a portion thereof, or any combination thereof. The dyeing can include providing a dye composition to the foam particles, affixed foam particles, the binding material, the component or a portion thereof, or any combination thereof. Providing the dye composition can include spraying the foam particles or component or portion thereof, immersing the foam particles or component in a dye composition, or a combination thereof.

The foam particles may be dyed before or during being infused with the supercritical fluid, such as by a nonionic or anionic dye dissolved or dispersed in the supercritical fluid, which optionally comprises a polar liquid. The foam particles may be dyed while being immersed in the heated fluid, where the heated fluid contains the dye. In particular, the heated fluid may be a heated aqueous dye solution, which may contain the quaternary ammonium salt and organic solvents as described. The foam particles can be dyed after being foamed such as by immersing the foam particles (e.g., in an unaffixed or affixed state) in a dye solution. The foam particles can be dyed after a component has been formed from affixed foam particles, e.g., by immersing the component or a portion of a component in a dye solution.

The dyeing can include providing two or more dye compositions. For example, a first dye composition can be provided to a first target dye region of the component, and a second dye composition can be provided to second dye region of the component. The first and second dye regions can independently include the plurality foam particles, or portions thereof, the affixed foam particles, the optional binding material, the component, coating, or portion thereof. The dyeing can include applying dye composition to a target region, wherein only a portion of the target region will retain the dye. For example, some materials may be resistant to retaining dye, or one or more additives may be provided to prevent the dye retention in predetermined areas.

Color and Colorants.

As described herein, various embodiments of decorating the component include providing one or more colorants to the component. For example, the foam particles, the binding material, the coating, the ink composition, etc., can each, independently, include one or more colorants. The term "colorant," as used herein, means a compound providing color to a substrate. The colorant can be an organic or inorganic pigment, a dye, or mixtures or combinations thereof.

The colorant can include one or more inorganic pigments or dyes. The pigment or dye can be an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. The inorganic pigment or dye can be a homogeneous inorganic pigments, core-shell pigments and the like. The inorganic pigment or dye can be a carbon pigment (e.g., carbon black), a clay earth pigments, or an ultramarine pigment. In some cases, the metal compound is not one comprising cadmium. In can be desirable in some instances that the inorganic pigment or dye is not one that contains a lead, cadmium and chromium (VI) compound. The pigment can be of a type known in the art as an extender pigment, which include, but are not limited to, calcium carbonate, calcium silicate, mica, clay, silica, barium sulfate and the like. The pigment can include any of those sold by KP Pigments such as pearl pigments, color shift pigments (e.g., CALYPSO, JEDI, VERO, BLACKHOLE, LYNX, ROSE GOLD, and the like), hypershift pigments, interference pigments and the like. The pigment or dye can be an organic compound such as a perylene, phthalocyanine derivative (e.g., copper phthalocyanine), an indanthrone, a benzimidazolone, a quinacridone, a perinone, and an azomethine derivative.

The colorant can be a dye such as an anionic dye, a cationic dye, a direct dye, a metal complex dye, a basic dye, a disperse dye, a solvent dye, a polymeric dye, a polymeric dye colorant, or a nonionic dye, or a combination thereof. The dye can be a water-miscible dye. The dye can be a solubilized dye. The anionic dye can be an acid dye.

The colorant can include an acid dye. Acid dyes are water-soluble anionic dyes. Acid dyes are available in a wide variety, from dull tones to brilliant shades. Chemically, acid dyes include azo, anthraquinone and triarylmethane compounds. The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes and nonionic disperse dyes are commercially available from many sources, including Dystar L.P., Charlotte, N.C. under the tradename TELON, Huntsman Corporation, Woodlands, Tex., USA under the tradename ERIONYL and TECTILON, BASF SE, Ludwigshafen, Germany under the tradename BASACID, Clariant International Ltd., Muttenz, Switzerland, under the trademarks of SOLVAPERM, HOSTASOL, POLYSYNTHREN, and SAVINYL, and Bezema AG, Montlingen, Switzerland under the tradename BEMACID.

The acid or nonionic disperse dye solution used to dye the substrate (e.g., foam particles, binding material, coating) may include, for example, from about 0.001 to about 5.0 grams per liter, preferably from about 0.01 to about 2 grams per liter of the acid or nonionic disperse dye compound or combination of acid or nonionic disperse dye compounds. The amount of acid or nonionic disperse dye compound use will determine how strong the color is and how quickly the substrates (e.g., foam particles, binding material, coating) or other articles are dyed, and may be optimized in a straight-forward manner; generally, a more concentrated dye solution can provide a stronger (deeper, darker, more intense) dyed color and can more quickly dye the pellets or other articles containing the thermoplastic elastomer.

The dye solution can include one or more solvents. Acid metal complex dyes are generally soluble in water, and therefore dissolved in a water solvent system prior to use. Solvent metal complex dyes are insoluble in water and therefore dissolved in a water/organic solvent system prior to use. The solvent system used for metal complex dyes should both dissolve the dyes and promote diffusion of dye molecules into the elastomeric substrates under mild conditions. Certain organic solvents not only dissolve dyes that are insoluble in water such as solvent metal complex dyes, but also promote or facilitate dye diffusion into a polymer substrate for both acid metal complex dyes and solvent metal complex dyes.

The solvent can include a water-soluble solvent. Water solubility of a particular organic solvent used in a particular amount in the dye solution is determined at 20 degrees Celsius and 1 atmosphere pressure at the concentration at which the alcohol is to be used in the dye solution; the organic solvent is water soluble if it fully dissolves or is fully miscible in water at 20 degrees Celsius and 1 atmosphere pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol phenyl ether (EGPE), ethylene glycol monobutyl ether, propylene glycol monomethyl ether, and propylene glycol monomethyl ether acetate. The water-soluble organic solvent may be included in concentrations of up to about 50 percent by volume, or up to about 25 percent by volume, or from about 1 percent to about 50 percent by volume, or from about 5 percent to about 40 percent by volume, or from about 10 percent to about 30 percent by volume, or from about 15 percent to about 25 percent by volume of the aqueous medium used to make the dye solution. Whether an organic solvent is used and how much organic solvent is used may be varied according to which dye is used and to the application method for contacting the dye solution with the substrate.

The solvent systems for solvent metal complex dyes can further comprise a third component, such as an additional organic solvent, to increase the solubility of the dyes. Suitable additional organic solvents include, but are not limited to, alcohols, ethers, esters and ketones.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether. In a two-phase solvent system, a solution is prepared containing a major amount of water and a minor amount of an organic solvent. The organic solvent is either partially miscible with water or nearly insoluble in water such that the water and organic solvent form a two phase system. The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets. A two-phase solvent composition can contain 1 to 30 volume percent, for example, 1 to 25 volume percent, organic solvent, and 70 to 99 volume percent, for example, 75 to 99 volume percent, water. These two-phase solvent compositions are particularly suitable for solvent dyes that have high solubility in organic solvents. Generally, dyes suitable for use in this embodiment include those that are highly soluble in organic solvent, but nearly insoluble in water The colorant can include the dye and a quaternary (tetraalkyl) ammonium salt, in particular when the dye is acidic dye, and the substrate (e.g., foam particles, binding materials, or coating) contains thermoplastic polyurethane elastomers or thermoplastic polyurea elastomers. The quaternary (tetraalkyl) ammonium salt can react with the dye (e.g., acid dye) to form a complexed dye that can be used in the coating. The "alkyl" group can include C1 to C10 alkyl groups. The quaternary (tetraalkyl) ammonium salt can be selected from soluble tetrabutylammonium compounds and tetrahexylammonium compounds. The colorant compound can comprise an anionic dye compound, a quaternary ammonium salt selected from soluble tetrabutylammonium compounds and tetrahexylammonium compounds, and, optionally, a water-soluble organic solvent.

The counterion of the quaternary ammonium salt should be selected so that the quaternary ammonium salt forms a stable solution with the dye (e.g., anionic dye). The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphate, borate, tetrafluoroborate, cyanide, isocyanide, azide, thiosulfate, thiocyanate, or carboxylate (such as acetate or oxalate). The tetraalkylammonium compound can be or include a tetrabutylammonium halide or tetrahexylammonium halide, particularly a tetrabutylammonium bromide or chloride or a tetrahexylammonium bromide or chloride.

When an acid dye solution is used to dye the foam particles or binding materials or coating that contain thermoplastic polyurethane elastomers or thermoplastic polyurea elastomers, the acid dye solution may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into the substrate and may be optimized in a straightforward manner. The process of dyeing the foam particles or binding materials containing thermoplastic polyurethane elastomers or thermoplastic polyurea elastomers with this dye solution containing the soluble tetraalkylammonium compound can produce strong color intensity in the dyed foam particles.

When used in a coating, the coating (e.g., coating, polymeric coating composition (prior to curing)) can include about 1 to 15 weight percent of the quaternary ammonium salt. The molar ratio of the acid dye to the quaternary ammonium compound can range from about 3:1 to 1:3 or about 1.5:1 to 1:1.5.

Having described various examples of decorating components and articles by adding colorants, we now turn to a discussion on the various ways to characterize color. The "color" of an article as perceived by a viewer can differ from the actual color of the article. The color as perceived by a viewer depends not only on the physics of the article, but also its environment, and the characteristics of the perceiving eye and brain. For example, as the color perceived by a viewer is determined by the actual color of the article (e.g., the color of the light leaving the surface of the article), by the viewer's ability to detect the wavelengths of light reflected or emitted by the article, by the wavelengths of light used to illuminate the article, as well as other factors such as the coloration of the environment of the article, and the type of incident light (e.g., sunlight, fluorescent light, and the like). As a result, the color of an object as perceived by a viewer can differ from the actual color of the article.

"Hue" is commonly used to describe the property of color which is discernible based on a dominant wavelength of visible light, and is often described using terms such as magenta, red, orange, yellow, green, cyan, blue, indigo, violet, etc. or can be described in relation (e.g., as similar or dissimilar) to one of these. The hue of a color is generally considered to be independent of the intensity or lightness of the color. For example, in the Munsell color system, the properties of color include hue, value (lightness) and chroma (color purity). Particular hues are commonly associated with particular ranges of wavelengths in the visible spectrum: wavelengths in the range of about 700 to 635 nanometers are associated with red, the range of about 635 to 590 nanometers is associated with orange, the range of about 590 to 560 nanometers is associated with yellow, the range of about 560 to 520 nanometers is associated with green, the range of about 520 to 490 nanometers is associated with cyan, the range of about 490 nanometers to 450 nanometers is associated with blue, and the range of about 450 to 400 nanometers is associated with violet.

The color can be a multi-hued color in which two or more hues are imparted by the color. For example, the color can be iridescent multi-hued color in which the hue of the color varies over a wide number of hues (e.g., 4, 5, 6, 7, 8 or more hues) when viewed at a single viewing angle, or when viewed from two or more different viewing angles that are at least 15 degrees apart from each other. The color can be limited iridescent multi-hue color in which the hue of the color varies, or varies substantially (e.g., about 90 percent, about 95 percent, or about 99 percent) over a limited number of hues (e.g., 2 hues, or 3 hues) when viewed from two or more different viewing angles that are at least 15 degrees apart from each other. A color having limited iridescence is limited to two, three or four hues selected from the RYB primary colors of red, yellow and blue, optionally the RYB primary and secondary colors of red, yellow, blue, green, orange and purple, or optionally the RYB primary, secondary and tertiary colors of red, yellow, blue, green, orange purple, green-yellow, yellow-orange, orange-red, red-purple, purple-blue, and blue-green.

The color (including hue, value and/or chroma) of a decorated foam particle or component does not change substantially, if at all, depending upon the angle at which the article is observed or illuminated. In instances such as this the color can be an angle-independent color in that the hue, the hue and value, or the hue, value and chroma observed is substantially independent or is independent of the angle of observation.

The other properties of the color, such as the lightness of the color, the saturation of the color, and the purity of the color, among others, can be substantially the same regardless of the angle of observation or illumination, or can vary depending upon the angle of observation or illumination. The color can have a matte appearance, a glossy appearance, or a metallic appearance, or a combination thereof.

Various methodologies for defining color coordinate systems exist. One example is L*a*b* color space, where, for a given illumination condition, L* is a value for lightness, and a* and b* are values for color-opponent dimensions based on the CIE coordinates (CIE 1976 color space or CIELAB). In certain embodiments, a decorated portion of foam particles or component can two or more colors that are not significantly different. That is, when measured and assigned values in the L*a*b* system, the two or more colors have coordinates that differ by less than 10 percent of the scale of the a* and b* coordinates, or by less than 5 percent of the scale of the a* and b* coordinates. In certain embodiments, a decorated portion of foam particles or component can two or more colors that are different. That is, the two or more different colors when measured and assigned values in the L*a*b* system, have coordinates that differ by at least 5 percent of the scale of the a* and b* coordinates, or by at least 10 percent of the scale of the a* and b* coordinates. The decorated portion of foam particles or component may, when measured according to the CIE 1976 color space under a given illumination condition at an observation angle between −15 degrees and +60 degrees, have a first color having a first color measurement with coordinates L1* and a1* and b1*, and a second color having a second color measurement with coordinates L2* and a2* and b2*, wherein: the L1* value is at least 10 percent greater or lesser than the L2* value; the a1* coordinate value is at least 10 percent greater or lesser than the a2* coordinate value; the b1* coordinate value is at least 10 percent greater or lesser than the b2* coordinate value; or a combination thereof.

A comparison of two color measurements in the CIELAB space can be determined mathematically. For example, a first color can have a first measurement with coordinates $L_1^*$, $a_1^*$ and $b_1^*$, and a second color can have a second measurement with coordinates $L_2^*$, $a_2^*$ and $b_2^*$. The total difference between these two measurements on the CIELAB scale can be expressed as $\Delta E^*_{ab}$, which is calculated as follows: $\Delta E^*_{ab} = [(L_1^* - L_2^*)^2 + (a_1^* a_2^*)^2 + (b_1^* - b_2^*)^2]^{1/2}$. Generally speaking, if two colors have a $\Delta E^*_{ab}$ of less than or equal to 1, the difference in color is not perceptible to human eyes, and if two colors have a $\Delta E^*_{ab}$ of greater than 100 the colors are considered to be opposite colors, while a $\Delta E^*_{ab}$ of about 2-3 is considered the threshold for perceivable color difference. In certain embodiments, the decorated portion of foam particles or component have a first color and a second color that is different from the first color, wherein when measured according to the CIE 1976 color space under a given illumination condition at an observation angle between −15 degrees and +60 degrees, the first color has a first color measurement having coordinates L1* and a1* and b1*, and the second color has a second color measurement having coordinates L2* and a2* and b2*, wherein the L1* and L2* values may be the same or different, wherein the a1* and a2* coordinate values may be the same or different, wherein the b1* and b2* coordinate values may be the same or different, and wherein the ΔE*ab between the first color measurement and the second color measurement is greater than or equal to about 60, where $\Delta E^* ab = [(L1^* - L2^*)^2 + (a1^* - a2^*)^2 + (b1^* - b2^*)^2]^{1/2}$, optionally is greater than or equal to about 80, or optionally is greater than or equal to about 100. Two colors can be considered as not being significantly different when the $\Delta E^*_{a}b$ is less than 60, or less than 50, or less than 40, or less than 30, at a certain illumination condition.

Another example of a color scale is the CIELCH color space, where, for a given illumination condition, L* is a value for lightness, C* is a value for chroma, and h° denotes a hue as an angular measurement. When measured in this color space, two colors may be considered not significantly different if they have an h° angular coordinate color that differs (higher or lower) by less than 10 degrees or less than 5 degrees within the CIELCH color space, under a given illumination condition. In certain embodiments, colors which, when measured and assigned values in the CIELCH system, differ (higher or lower) by at least 45 degrees in the h° measurements, are considered to be different colors. In certain embodiments, a decorated portion of foam particles or component has at least a first color and a second color that is different from the first color, wherein, when measured according to the CIELCH color space under a given illumination condition at an observation angle between −15 degrees and +60 degrees, the first color has a first color measurement having coordinates $L_1^*$ and $C_1^*$ and $h_1°$, and the second color has a second color measurement having coordinates $L_2^*$ and $C_2^*$ and $h_2°$, and wherein: the $L_1^*$ value is at least 10 percent greater or lesser than the $L_2^*$ value; the $C_1^*$ coordinate value is at least 10 percent greater or lesser than the $C_2^*$ coordinate value; the $h_1°$ coordinate value is at least 10 percent greater or lesser than the $h_2°$ coordinate value; or a combination thereof. The first color and the second color can have a difference of greater than about 10 degrees, or greater than about 20 degrees, or greater than about 30 degrees, or greater than about 40 degrees, or greater than about 50 degrees, or greater than about 60 degrees, in the h° measurements of the CIELCH system.

Another system for characterizing color includes the "PANTONE" Matching System (Pantone LLC, Carlstadt, N.J., USA), which provides a visual color standard system to provide an accurate method for selecting, specifying, broadcasting, and matching colors through any medium. In an example, a decorated portion of foam particles or component can have a first color and a second color that has a different PANTONE standard from the first color, or is more than a certain number of adjacent standards from the first color. Two colors may be considered not different if the color measured for the component is within a certain number of adjacent standards, e.g., within 20 adjacent PANTONE standards, of the other color.

Additional Manufacturing.

The disclosed methods can further comprise one or more additional manufacturing methods as necessary or desired. For example, the disclosed methods can further comprise compression molding. That is, the component manufactured using the disclosed methods can be a pre-form used in the manufacture of a component of footwear. It is understood in the art that can be a foamed article which will then be compression molded in a closed mold under heat and pressure. The compression molding process creates an outer skin on the molded article. The outer skin can provide a desirable aesthetics for a component used in the manufacture of footwear, e.g., it can impart a more uniform look with more controlled topography, as well as modify properties of the component, such as its compression set. Conventionally, pre-forms are cut from foam sheetstock or are injection molded and foamed simultaneously. Disclosed herein are methods to manufacture a pre-form using the disclosed additive manufacturing methods using foam particles, and then compression molding the pre-form using compression molding methods known to the skilled artisan. The disclosed methods provide a surprisingly efficient approach to reduce waste typically associated with manufacturing a component used in footwear, e.g., from the unused part of the sheetstock, or the runners from injection molding. The disclosed methods also generally eliminate the need for cutting tools if the pre-form is manufactured from sheetstock, or alternatively, eliminates the significant cost associated with tooling if the pre-form is an injection molded pre-form.

The disclosed methods can further comprise building a foam particulate structure, as described herein, directly, on an element, such as a textile element, a film element, a molded resin element, and the like, and thereby bonding or adhering the structure to that element. Alternatively or in addition, an element, such as a textile element, a film element, a molded resin element, and the like, can be placed in contact with affixed or unaffixed particulate foam, and more particulates can be then affixed on top of and/or around the element. This process can be used to create a layered structure including one or more layered elements between one or more layers of fused foam particulates. Alternatively or in addition, one or more elements can be completely or partially surrounded by affixed foam particulates. Optionally, the affixed foam particulates can be adhered to the element. For example, the foam particulates can be adhered to the element by a physical bond formed during the affixing process, either by melting or softening and then re-solidifying the foam particulates during the affixing process, or by melting or softening a portion of the element (e.g. a thermoplastic material forming the bulk of the element, or a thermoplastic material forming an outside layer of the element), or by applying an adhesive to at least a portion of the element.

The element onto which the affixed foam particulate structure is built can be a flexible element such as a textile element or a film element. For example, the flexible element can be a component of an article of footwear such as a strobel or an upper, and the affixed foam particulate structure built on the flexible element can be a cushioning element such as a midsole component or an ankle cushion or a tongue for an article of footwear. Alternatively, the flexible element can be a component of an article of apparel or sporting equipment, and the foam particulate structure built on the flexible element can be a cushioning element or an impact-absorbing element. Using an additive manufacturing process to fuse the foam particulates to form the component allows the affixed foam particulate portion of the component to be easily customized based on an individual's measurements, desired layer of cushioning or impact absorption, or both.

The element onto which the affixed foam particulate structure is built can be an element comprising a film element, such as, for example, a bladder. The bladder can be a sealed, fluid-filled bladder, or can be a bladder which has not yet been filled with a fluid and sealed. The film portion of the bladder can be a barrier membrane formed from multiple layers of different polymeric materials. For example, the film element can be a component of an article of footwear such as a bladder, and the combination of the affixed foam particulate structure and the film element can be a sole structure for an article of footwear, such as a midsole or a component of a midsole for an article of footwear. Alternatively, the film element can be a component of an article of apparel or sporting equipment, and the foam particulate structure built on the film element can be a cushioning element or an impact-absorbing element. Using the disclosed additive manufacturing processes to fuse the foam particulates to form the component allows the affixed foam particulate portion of the component to be easily customized based on an individual's measurements, desired layer of cushioning or impact absorption, or both.

The element onto which the affixed foam particulate structure is built can be a rigid element such as a molded resin element, including an injection molded or extruded resin element. For example, the rigid element can be a component of an article of footwear such as a midsole component (such as a support or plate structure) or a heel counter, and the affixed foam particulate structure built on the rigid element can be a cushioning element such as a midsole component or an ankle cushion for an article of footwear. Alternatively, the rigid element can be a component of an article of apparel or sporting equipment, and the foam particulate structure built on the flexible element can be a cushioning element or an impact-absorbing element. For example, the rigid element can be a component of an article of protective gear, and the affixed foam particulate structure can be built directly onto the rigid element to form a cushioning or impact absorbing element for the article of protective gear. Using the disclosed manufacturing process to fuse the foam particulates to form a cushioning or impact absorbing portion of an article allows the affixed foam particulate structure to be easily customized based on an individual's measurements, desired layer of cushioning or impact absorption, or both.

The disclosed methods can further comprise affixing the foam particulates, prepared as described herein, directly, and thereby adhered to, into a variety of structures. In one example, the affixed foam particulates can be affixed to form a structure having an interior surface and an exterior surface. The affixed foam particulate structure can be a structure having a plurality of interior surfaces and a plurality of exterior surfaces, such as a honeycomb structure. The affixed foam particulate structure can include hollow regions which are sealed or open. Optionally, the hollow regions can be filled with a plurality of unaffixed foam particulates, or with one or more rigid elements. The affixed foam particulate structure can have a cylindrical or polyhedral geometry. In one example, the affixed foam particulate structure can be a sealed structure having an interior surface and an exterior surface, and can have a spherical, ellipsoidal, cylindrical, or polyhedral geometry. Using a hollow foam particulate structure can allow for a reduction in the density of the overall structure as compared to a solid structure having the same geometry. The hollow or sealed foam particulate structures can be used to form support elements, such as support columns. In one example, the columns can be designed to buckle in a particular direction or under a particular load based on the degree to which the foam particulates are affixed in particular regions of the column structure. A plurality of the hollow or sealed foam particulate structures can be grouped or affixed together to form a larger structure, such as a midsole or other cushioning component.

Elastomeric Thermoplastic Polymers.

Having described the various methods of forming and decorating a component comprising a plurality of foam particles, we now describe in more detail the elastomeric thermoplastic polymers referenced herein. The foam particles of the present disclosure can be prepared from a suitable thermoplastic elastomer. For example, thermoplastic elastomer can be selected from a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, and any blend thereof.

The thermoplastic elastomer used to prepare the foam particles can comprise a thermoplastic copolyetherester elastomer. It is understood that as used herein, "thermoplastic copolyetherester elastomer" can be used interchangeably with "thermoplastic polyether-polyester block copolymers," "thermoplastic polyester/polyether block copolymers," "copolyester elastomer," "poly-ether-ester block copolymer," "block poly-ether-ester," "polyester elastomer," "thermoplastic poly-ether-ester," "copoly(ether ester)," and "copolyester thermoplastic elastomer." The thermoplastic copolyetherester elastomer can comprise hard (or crystalline) polyester segments dispersed within soft (or amorphous) polyether segments. The thermoplastic copolyetherester elastomer can be a block copolymer. The thermoplastic copolyetherester elastomer can be a segmented block copolymer. The thermoplastic copolyetherester elastomer can be a block copolymer comprising segments or blocks of polyester and segments or blocks of polyether.

The thermoplastic copolyetherester elastomer used to prepare the foam particles can comprise polyesters segments, produced by the reaction of dicarboxylic derivative (such as terephthalate) and diols (such as butanediol) and polyether segments (such as polyalkylene (ether) glycol or polyol).

The polyester segments can comprise polybutylene terephthalate (PBT). The polyester segments can comprise polyethylene terephthalate (PET). The polyester segments can have a segment molecular weight of about 3000 Daltons to about 9000 Daltons. The polyester segments can have a segment molecular weight of about 5000 Daltons to about 7000 Daltons.

The polyether segments can comprise long-chain polyols. The polyether segments can be polyethylene glycol (PEG), polypropylene glycol (PPG) or polypropylene ether glycol (PPEG), polytetramethylene glycol (PTMG or PTHF) polytetramethylene ether glycol, and combinations thereof. The polyether segments can have a segment molecular of about 200 Daltons to about 4000 Daltons. The polyether segments can have a segment molecular of about 1000 Daltons to about 3000 Daltons.

The thermoplastic copolyetherester elastomer can comprise a polytetramethylene ether terephthalate soft segment and a polybutylene terephthalate hard segment. Thermoplastic copolyetherester elastomers are commercially available, and non-limiting examples are available under the tradenames HYTREL (DuPont Company, Wilmington, Del.), ARNITEL (DSM Engineering Plastics, Evansville, Ind.), and PELPRENE (Toyobo Co., Ltd., Osaka, Japan).

The thermoplastic copolyetherester elastomer polymers can comprise a polyether segment obtained by polymerization of tetrahydrofuran (i.e. poly(tetramethylene ether)) and a polyester segment obtained by polymerization of tetramethylene glycol and phthalic acid (i.e. 1,4-butylene terephthalate). Generally, the more polyether units incorporated into the copolyetherester, the softer the polymer. The poly (tetramethylene ether) glycol used to make the copolyetherester can have a molecular weight of from about 500 Daltons to about 3500 Daltons, or about 800 Daltons to about 2500 Daltons.

The thermoplastic copolyetherester elastomer polymers can comprise repeat units derived from 30 to 70 weight percent of 1,4-butylene terephthalate and from 10 to 70 weight percent of poly(tetramethylene ether) terephthalate. The thermoplastic copolyetherester elastomer polymers can comprise repeat units derived from 55 to 60 weight percent of 1,4-butylene terephthalate, from 23 to 27 weight percent of 1,4-butylene isophthalate, from 10 to 15 weight percent of poly(tetramethylene ether) terephthalate, and from 3 to 7 weight percent of poly(tetramethylene ether) isophthalate. The poly(tetramethylene ether) glycol used to make the copolyetherester can have a molecular weight of from about 800 to about 1200.

The thermoplastic copolyetherester elastomer polymers can comprise repeat units derived from 30 to 40 weight percent 1,4-butylene terephthalate, and from 60 to 70 weight percent poly(tetramethylene ether) terephthalate. The poly (tetramethylene ether) glycol used to make the copolyetherester preferably has a molecular weight of from 1500 to about 2500.

The thermoplastic copolyetherester elastomer can be a block copolymer of short-chain diol terephthalate and long-chain polyether diol terephthalate, comprising about 60 weight percent of hard segments of polybutylene terephthalate and about 40 weight percent of soft segments of polytetramethylene ether terephthalate, has a Durometer hardness (ASTM D-2240) of Shore 55D, a melting point (ASTM D-2117) of 211° C.; a Vicat Softening Point (ASTM D1525) of 180° C. and flexural modulus (ASTM D790) of 207 megapascals (MPa). A suitable material with the foregoing characteristics is commercially available under the tradename HYTRELO 5556 (DuPont Company, Wilmington, Del.).

The thermoplastic copolyetherester elastomer can be a block copolymer of short-chain diol terephthalate and long-chain polyether diol terephthalate, comprising about 42 weight percent of hard segments of polybutylene terephthalate and about 58 weight percent of soft segments of polytetramethylene ether terephthalate, has a Durometer hardness of 92A/40D; a melting point of 168 degrees Celsius; a Vicat Softening Point of 112 degrees Celsius and flexural modulus of 48.3 megapascals. A suitable material with the foregoing characteristics is commercially available under the tradename HYTREL 4056 (DuPont Company, Wilmington, Del.).

The thermoplastic copolyetherester elastomer can be a block copolymer of short-chain diol terephthalate and long-chain polyether diol terephthalate, comprising about 80 weight percent of hard segments of polybutylene terephthalate and about 20 weight percent of soft segments of polytetramethylene ether terephthalate, has a Durometer hardness of about 72D; a melting point of 219 degrees Celsius; a Vicat Softening Point of 207 degrees Celsius and a flexural modulus of 585 megapascals. A suitable material with the foregoing characteristics is commercially available under the tradename HYTRELO 7246 (DuPont Company, Wilmington, Del.).

The thermoplastic copolyetherester elastomer can comprise long-chain ester units of formula I:

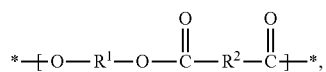

and short-chain ester units of formula II:

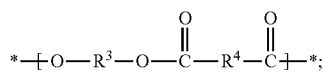

wherein $R^1$ comprises a divalent radical remaining after removal of terminal hydroxyl groups from poly(alkylene ether) having a carbon-to-oxygen ratio from about 2.0 to about 4.3 and a number average molecular weight from about 400 Daltons to about 6000 Daltons; wherein $R^2$ comprises a divalent radical remaining after removal of carboxyl groups from a dicarboxylic acid having a molecular weight less than about 300 Daltons; wherein $R^3$ comprises a divalent radical remaining after removal of hydroxyl groups from a low molecular weight diol having a molecular weight less than about 250 Daltons; wherein $R^4$ comprises a divalent radical remaining after removal of carboxyl groups from a dicarboxylic acid having a molecular weight less than about 300 Daltons; wherein the long-chain ester units represented by formula I comprise about 5 weight percent to about 95 weight percent of the thermoplastic copolyetherester elastomer; and wherein the short-chain ester units represented by formula II comprise about 95 weight percent to about 5 weight percent of the thermoplastic copolyetherester elastomer.

$R^1$ can comprise a divalent radical remaining after removal of terminal hydroxyl groups from poly(tetramethylene ether). $R^1$ can have a number average molecular weight from about 500 Daltons to about 3500 Daltons; about 600 Daltons to about 3000 Daltons; about 800 Daltons to about 1200 Daltons; about 800 Daltons to about 2000 Daltons; about 800 Daltons to about 2500 Daltons; about 800 Daltons to about 3000 Daltons; about 800 Daltons to about 3500 Daltons; about 800 Daltons to about 4000 Daltons; about 1000 Daltons to about 3000 Daltons; or about 1500 Daltons to about 2500 Daltons.

$R^2$ can comprise a divalent radical remaining after removal of carboxyl groups from an aromatic dicarboxylic acid. $R^2$ can comprise a divalent radical remaining after removal of carboxyl groups from 1,4-benzendicarboxylic acid.

$R^3$ can comprise a divalent radical remaining after removal of hydroxyl groups from a C2-C6 alkyl diol. $R^3$ can comprise a divalent radical remaining after removal of hydroxyl groups from 1,4-butanediol.

$R^4$ can be a divalent radical remaining after removal of carboxyl groups from an aromatic dicarboxylic acid. In a further aspect, $R^4$ can be a divalent radical remaining after removal of carboxyl groups from 1,4-benzendicarboxylic acid.

The long-chain ester units represented by formula I can comprise about 10 weight percent to about 60 weight percent of the thermoplastic copolyetherester elastomer; about 20 weight percent to about 60 weight percent of the thermoplastic copolyetherester elastomer; about 30 weight percent to about 60 weight percent of the thermoplastic copolyetherester elastomer; about 10 weight percent to about 70 weight percent of the thermoplastic copolyetherester elastomer; about 20 weight percent to about 70 weight percent of the thermoplastic copolyetherester elastomer; about 30 weight percent to about 70 weight percent of the thermoplastic copolyetherester elastomer; about 10 weight percent to about 80 weight percent of the thermoplastic copolyetherester elastomer; about 20 weight percent to about 80 weight percent of the thermoplastic copolyetherester elastomer; or about 30 weight percent to about 80 weight percent of the thermoplastic copolyetherester elastomer.

The short-chain ester units represented by formula II can comprise about 20 weight percent to about 90 weight percent of the thermoplastic copolyetherester elastomer; about 40 weight percent to about 90 weight percent of the thermoplastic copolyetherester elastomer; about 20 weight percent to about 80 weight percent of the thermoplastic copolyetherester elastomer; about 40 weight percent to about 80 weight percent of the thermoplastic copolyetherester elastomer; about 20 weight percent to about 70 weight percent of the thermoplastic copolyetherester elastomer; about 40 weight percent to about 70 weight percent of the thermoplastic copolyetherester elastomer; about 40 weight percent to about 60 weight percent of the thermoplastic copolyetherester elastomer; or about 20 weight percent to about 60 weight percent of the thermoplastic copolyetherester elastomer.

Optionally, at least about 50 weight percent of the short-chain ester units represented by formula II can be identical.

The thermoplastic copolyetherester elastomer can comprise polybutylene terephthalate blocks and poly(tetramethylene ether) terephthalate blocks, wherein the thermoplastic copolyetherester elastomer comprises from about 95 weight percent to about 5 weight percent of the polybutylene terephthalate blocks, and from about 5 weight percent to about 95 weight percent of the poly(tetramethylene ether) terephthalate blocks, and wherein the poly(tetramethylene ether) terephthalate blocks have a number average molecular weight from about 200 Daltons to about 6000 Daltons.

The thermoplastic copolyetherester elastomer can comprise polybutylene terephthalate blocks and poly(tetramethylene ether) terephthalate blocks, wherein the thermoplastic copolyetherester elastomer comprises from about 70 weight percent to about 20 weight percent of the polybutylene terephthalate blocks, and from about 5 weight percent to about 95 weight percent of the poly(tetramethylene ether) terephthalate blocks, and wherein the poly(tetramethylene ether) terephthalate blocks have a number average molecular weight from about 200 Daltons to about 6000 Daltons.

The thermoplastic copolyetherester elastomer can comprise polybutylene terephthalate blocks and poly(tetramethylene ether) terephthalate blocks, wherein the thermoplastic copolyetherester elastomer comprises from about 80 weight percent to about 30 weight percent of the polybutylene terephthalate blocks, and from about 5 weight percent to about 95 weight percent of the poly(tetramethylene ether) terephthalate blocks, and wherein the poly(tetramethylene ether) terephthalate blocks have a number average molecular weight from about 200 Daltons to about 6000 Daltons.

The thermoplastic copolyetherester elastomer can comprise polybutylene terephthalate blocks and poly(tetramethylene ether) terephthalate blocks, wherein the thermoplastic copolyetherester elastomer comprises from about 70 weight percent to about 20 weight percent of the polybutylene terephthalate blocks, and from about 30 weight percent to about 80 weight percent of the poly(tetramethylene ether) terephthalate blocks, and wherein the poly(tetramethylene ether) terephthalate blocks have a number average molecular weight from about 200 Daltons to about 6000 Daltons.

The poly(tetramethylene ether) terephthalate blocks can have a number average molecular weight from about 800 Daltons to about 1200 Daltons; about 1500 Daltons to about 2500 Daltons; or about 1000 Daltons to about 3000 Daltons.

The thermoplastic elastomer used to prepare the foam particles can comprise a thermoplastic polyurethane elastomer. The thermoplastic polyurethane elastomer can be selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof. The thermoplastic polyurethane elastomer can be a thermoplastic polyester-polyurethane elastomer. The thermoplastic polyurethane elastomer can be a thermoplastic polyether-polyurethane elastomer. The thermoplastic polyurethane elastomer can be a thermoplastic polycarbonate-polyurethane elastomer.

Thermoplastic polyurethane from which the foam particles are prepared may have a melt index (also called a melt flow index or melt flow rate) of at least about 160 grams/10 minutes (at 190 degrees Celsius, 21.6 kilograms) as measured according to ASTM D1238. The melt index can be from about 160 to about 250 grams/10 minutes (at 190 degrees Celsius, 21.6 kilograms) or from about 160 to about 220 grams/10 minutes (at 190 degrees Celsius, 21.6 kilograms), in each case as measured according to ASTM D1238.

Thermoplastic polyurethanes can be produced via reaction of (a) diisocyanates with difunctional compounds reactive toward isocyanates. In general, the difunctional compounds have two hydroxyl groups (diols) and may have a molar mass of from 62 Daltons (the molar mass of ethylene glycol) to about 10,000 Daltons, although difunctional compounds having other isocyanate-groups (e.g., secondary amine) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric. In certain examples, such as when the molded article is an outsole for an article of footwear, the particles may advantageously be prepared using a rigid thermoplastic polyurethane or combination of thermoplastic polyurethanes. When the molded article is a midsole for footwear, the particles may advantageously be prepared using an elastomeric thermoplastic polyurethane or a combination of elastomeric thermoplastic polyurethanes.

Suitable thermoplastic polyurethanes include thermoplastic polyester-polyurethanes, polyether-polyurethanes, and polycarbonate-polyurethanes. Non-limiting, suitable examples of these include, without limitation, polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from ethylene oxide, propylene oxide, or combinations of ethylene oxide and propylene oxide, and polycarbonate diols such as polyhexamethylene carbonate diol and poly(hexamethylene-co-pentamethylene)carbonate diols. The elastomeric thermoplastic polyurethane may be prepared by reaction of one of these polymeric diols (polyester diol, polyether diol, polylactone diol, polytetrahydrofuran diol, or polycarbonate diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., substantially all of the reactants are di-functional).

Non-limiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. The carboxylic acid can include adipic acid and the diol can include 1,4-butanediol. Typical catalysts for the esterification polymerization are protonic acids, Lewis acids, titanium alkoxides, and dialkyl tin oxides.

Hydroxy carboxylic acid compounds such as 12-hydroxy stearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. The lactone can be E-caprolactone. Useful catalysts include those mentioned above for polyester synthesis. Alternatively, the reaction can be initiated by forming a sodium salt of the hydroxyl group on the molecules that will react with the lactone ring.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonates may be prepared by polycondensation of aliphatic diols with dialkyl carbonates, (such as diethyl carbonate), cyclic glycol carbonates (such as cyclic carbonates having five- and six-member rings), or diphenyl carbonate, in the presence of catalysts like alkali metal, tin catalysts, titanium compounds, or diphenyl carbonate. Another way to make aliphatic polycarbonates is by ring-opening polymerization of cyclic aliphatic carbonates catalyzed by organometallic catalysts. The polycarbonate diols can also be made by copolymerization of epoxides with carbon dioxide. Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols and polyether diols described above, that are used in making an elastomeric thermoplastic polyurethanes synthesis preferably have a number average molecular weight (determined for example by the ASTM D-4274 method) of from about 300 Daltons to about 8,000 Daltons, or from about 300 Daltons to about 5000 Daltons, or from about 300 Daltons to about 3000 Daltons.

The synthesis of a thermoplastic polyurethanes may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4'-biphenylene diisocyanate, 3,3'-dimethyl-4,4'-biphenylene diisocyanate, 1,3-diisocyanatobenzene, 1,4-diisocyanatobenzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. The chain extension agents can include alcohols and amines. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether; 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenebis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described di-functional extenders, a small amount of tri-functional extenders such as trimethylolpropane, 1,2,6-hexanetriol and glycerol, and/or mono-functional active hydrogen compounds such as butanol or dimethyl amine, may also be present. The amount of tri-functional extenders and/or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethanes. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25 weight percent to about 65 weight percent of the elastomeric thermoplastic polyurethanes, and preferably from about 25 weight percent to about 50 weight percent of the elastomeric thermoplastic polyurethanes.

The thermoplastic polyurethane elastomer used to prepare the foam particles can comprise a long-chain polyol. The long-chain polyol can be selected from a polyether polyol, a polyester polyol, a polycarbonate polyol, a polyolefin polyol, a polyacryl polyol, and any copolymer thereof. The long-chain polyol can be a polyether polyol, a polyester polyol, and any copolymer thereof. The long-chain polyol can be a polyether polyol. The long-chain polyol can be a polyester polyol. The long-chain polyol can have a number-average molecular weight of not less than about 500 Daltons. The long-chain polyol can have a number-average molecular weight of about 500 Daltons to about 10,000 Daltons; about 600 Daltons to about 6,000 Daltons; or about 800 Daltons to about 4,000 Daltons.

One non-limiting example of commercially available elastomeric thermoplastic polyurethanes having a melt flow index of from about 160 to about 220 grams/10 minutes (at 190 degrees Celsius, 21.6 kilograms) suitable for making thermoplastic polyurethanes foam particles is ELASTOLLAN SP9213 (melt flow index of 200 grams/10 minutes (at 190 degrees Celsius, 21.6 kilograms)), which is available from BASF Polyurethanes GmbH.

A thermoplastic polyurethane that is more rigid may be synthesized in the same way but with a lower content of the polymeric diol segments. A rigid thermoplastic polyurethane may, for example, include from about 0 to about 25 weight percent of the polyester, polyether, or polycarbonate diol segments. Synthesis of rigid polyurethanes is well-known in the art and described in many references. Rigid thermoplastic polyurethane having a melt index of at least about 160 grams/10 minutes (at 190 degrees Celsius, 21.6 kilograms) as measured according to ASTM D 1238 are commercially available and include those sold under the trademark Isoplast® ETPU by Lubrizol Corp., Wickliffe, Ohio.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-di-amino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene)diamines, and poly(tetramethylene ether)diamines. The amine- and hydroxyl-functional extenders already mentioned may be used as well. Generally, as before, trifunctional reactants are limited and may be used in conjunction with monofunctional reactants to prevent crosslinking.

The thermoplastic elastomer can comprise a thermoplastic polyamide elastomer. Optionally, the thermoplastic polyamide elastomer can comprise nylon 6, nylon 12, or combinations thereof.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180 degrees Celsius to about 300 degrees Celsius Specific examples of suitable polyamide blocks include NYLON 6, NYLON 66, NYLON 610, NYLON 11, NYLON 12, copolymerized NYLON, NYLON MXD6, and NYLON 46.

The thermoplastic elastomer can comprise at least one thermoplastic polystyrene elastomer. The thermoplastic polystyrene elastomer can be a styrene block copolymer elastomer. The thermoplastic styrene block copolymer elastomer can be a styrene ethylene butylene styrene block copolymer. The styrene block copolymer elastomer can be a poly(styrene-butadiene-styrene), a poly(styrene-ethylene-co-butylene-styrene), a poly(styrene-isoprene-styrene), any copolymer thereof, and any blend thereof.

The thermoplastic elastomer used to prepare the foam particles can be characterized by a broad peak indicating a range of melting temperatures ($T_m$) when determined using differential scanning calorimetry. The melting temperature can be characterized by a melting range of about 15 degrees Celsius to about 200 degrees Celsius or about 50 degrees Celsius to about 90 degrees Celsius. The melting temperature of the thermoplastic elastomer can be characterized by a melting range of about 30 degrees Celsius to about 150 degrees Celsius from initial onset to a melting temperature peak. The melting temperature can be characterized by a melting range of at least about 30 degrees Celsius or by a melting range of at least about 50 degrees Celsius.

Methods of Characterizing the Disclosed Articles.

Several methods of measuring resiliency and/or energy return of foams exist in the art. One method of measuring resiliency of foams is based on ASTM D 2632-92, which is a test for solid rubber materials. For use with foams, the test sample is prepared as described in ASTM D2632-92, but uses a sample of foam in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used. The resiliency and/or energy return can be determined using force/displacement behavior determined using methods known to one skilled in the art.

Force/displacement behavior for the disclosed articles can be measured using an Instron Electropuls E10000 (Instron, Norwood, Mass., USA) with a stainless steel 4 5 millimeters circular cross section impact geometry. The test foam slabs can be approximately 10 millimeters, although thinner or thicker foam slabs can also be used. Each sample can be evaluated by two different compression cycles: "running" and "walking". A "running" compression cycle consists of samples being compressed under displacement control from 0 Newtons to 300 Newtons and back to 0 Newtons in 180 milliseconds, followed by a pause of 400 milliseconds for a total of ~1.7 Hertz. The "walking" compression cycle consist of samples compressed from 0 Newtons to 144 Newtons and back to 0 Newtons in 600 milliseconds followed by a pause of 400 milliseconds for a total of ~1 Hertz.

Compression can be measured by preparing a sample of a standard thickness (e.g., 10 millimeters) of a foam. Samples having a thickness less than the standard can be stacked to make a sample having the standard thickness. The sample is loaded into a metal compression plate and compressed to a height of 50 percent of the original thickness (e.g., 5 millimeters). The sample is placed in a 50 degrees Celsius oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50 percent compressed thickness from the original sample thickness, (c) dividing (a) by (b), and (d) multiplying the result by 100 to obtain the percent compression set (where all thicknesses are measured in millimeters).

Energy input can be taken as the integral of the force-displacement curve during compression force loading. Hysteresis is taken as the ratio: (energy output)/(energy input), which can also be viewed as the energy efficiency of the foam. Fatigue behavior is judged by changes in the foam displacement at the max load of a cycle. All measured properties: stiffness, hysteresis, and fatigue are measured for multiple cycles for both running and walking compression cycles. Typical characterization using the compression sequence above can be run for 5000 cycles, which simulates approximately ~5-10 miles of walking/running and takes about 45 minutes of testing time on the Instron Electropuls E10000 instrument. Longer runs up to 100,000 compression cycles can be done to simulate accelerated materials response to ~100-200 miles of use.

The tensile strength can be measured on a die cut sample of the article in the shape of a dumbbell of a standard size such as a 2.5 centimeters in width by 11.5 centimeters in length, with a minimum thickness of 3 to 4 millimeters. The dumbbell follows the shape described in ASTM D412, die C. The sample is loaded symmetrically into and tested using a long travel extensometer such as the Instron 2603-080 which allows for a minimum of 1000 percent strain with a gauge length of 25 millimeters and a resolution of at least 0.1 millimeters. The tensile value at the failure point of the sample (the point during testing when the load value initially drops) is recorded.

The melt flow index is determined according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow index values are calculated in cubic centimeter per 10 minutes, or grams per 10 minutes.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Definitions

All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, "comprising" is inclusive and is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, the term "and/or" includes any and all combinations of one or more of the associated listed items.

As used herein, in substance or substantially means at least 50 percent, 60 percent, 75 percent, 90 percent, 95 percent, or more, as determined based on weight or volume.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated plus or minus 10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning. Expressions such as "at least one of," when preceding a list of elements, modify the entire list of elements and do not modify the individual elements of the list.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

As used herein the terms "percent by weight", "weight percent," "wt %," and "wt %," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100. Similarly, the terms "percent by volume", "volume percent," "vol %," and "vol. %," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

As used herein, the term "effective amount" refers to an amount that is sufficient to achieve the desired modification of a physical property of the composition or material. For example, an "effective amount" of a filler refers to an amount that is sufficient to achieve the desired improvement in the property modulated by the formulation component, e.g. achieving the desired level of modulus. The specific level in terms of weight percent in a composition required as an effective amount will depend upon a variety of factors including the amount and type of the component, amount and type of composition, and end use of the article made using the composition.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are determined at a standard atmospheric pressure (i.e. 1 atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or disubstituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. An organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

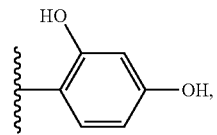 [SMILES: *c1ccc(O)cc1O]

regardless of whether 2,4-dihydroxyphenyl is used to prepare the compound. The radical (for example an alkyl) can be further modified (i.e., substituted alkyl) by having bonded thereto one or more "substituent radicals." The number of atoms in a given radical is not critical to the present invention unless it is indicated to the contrary elsewhere herein.

As used herein, the terms "number average molecular weight" or "$M_n$," can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

EXAMPLES

Now having described aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Figure 14:
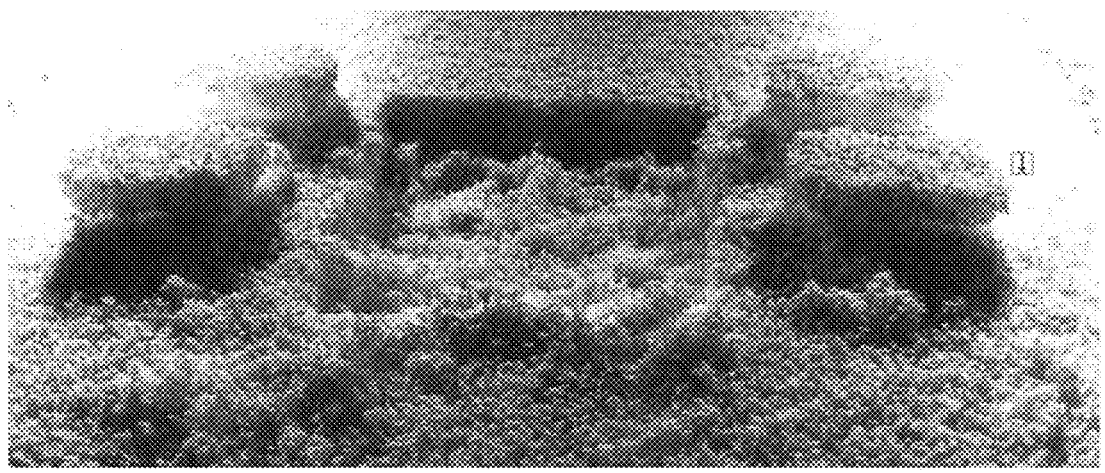
FIG. 14 shows an image of a representative article prepared using the disclosed methods.
Figure 15:
FIG. 15 shows an image of a representative midsole on a production platform with non-affixed particles surrounding the midsole.
Figure 16:
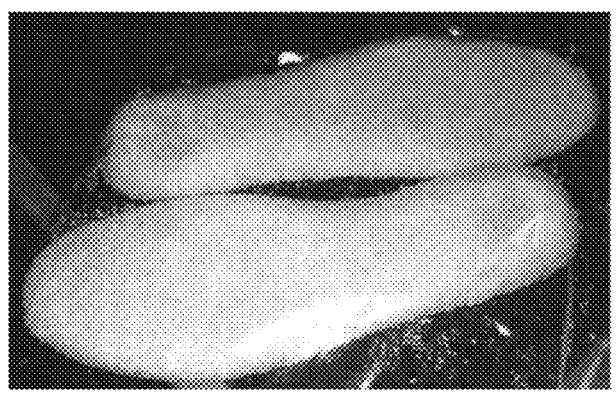
FIG. 16 shows an image of the representative midsole shown in FIG. 15 following clean-up and removal of non-affixed particles.
Figure 17:
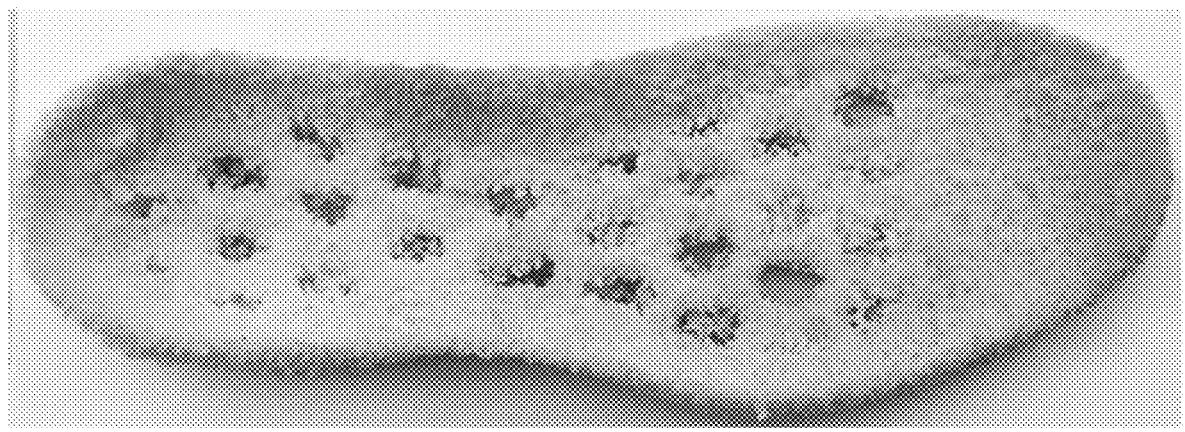
FIG. 17 shows an image of a representative midsole prepared using the disclosed methods. The representative midsole was dyed following fusing of the foam particles by dipping the midsole into an aqueous dye solution comprising one or more of acid dyes and/or reactive dyes in isopropyl alcohol heated to 60 degrees Celsius.
Figure 18:
FIG. 18 shows an image of a section of the representative midsole shown in FIG. 17 at higher magnification.
Figure 19:
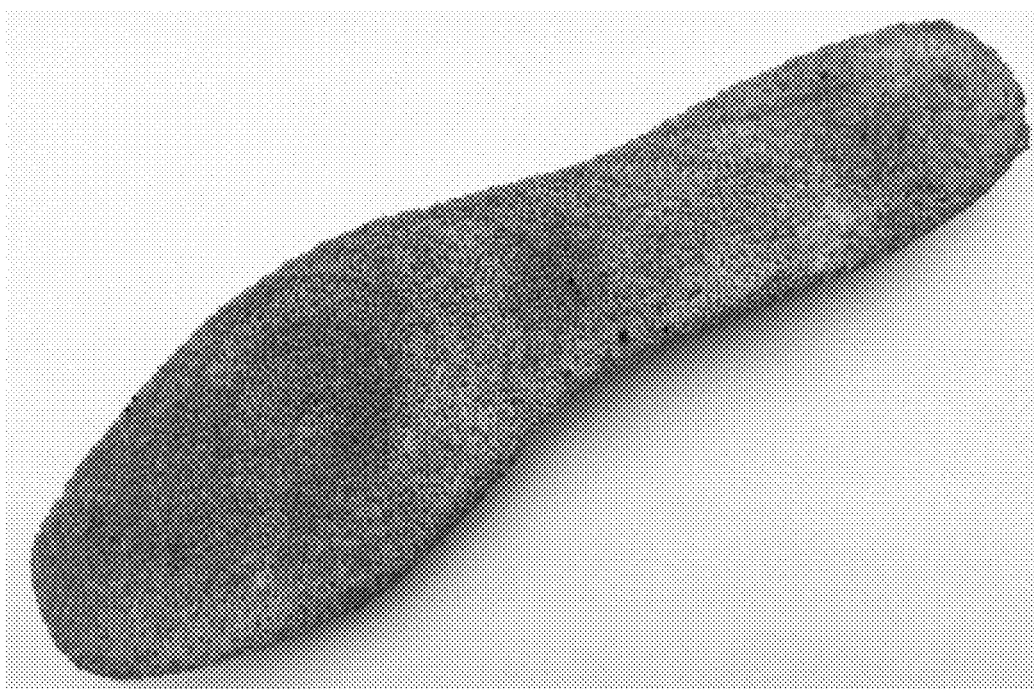
FIG. 19 shows an image of a representative midsole prepared using the disclosed methods. The representative midsole was dyed following fusing of the foam particles by dipping the midsole into an aqueous dye solution comprising one or more of acid dyes and/or reactive dyes in isopropyl alcohol heated to 60 degrees Celsius.
Figure 20:
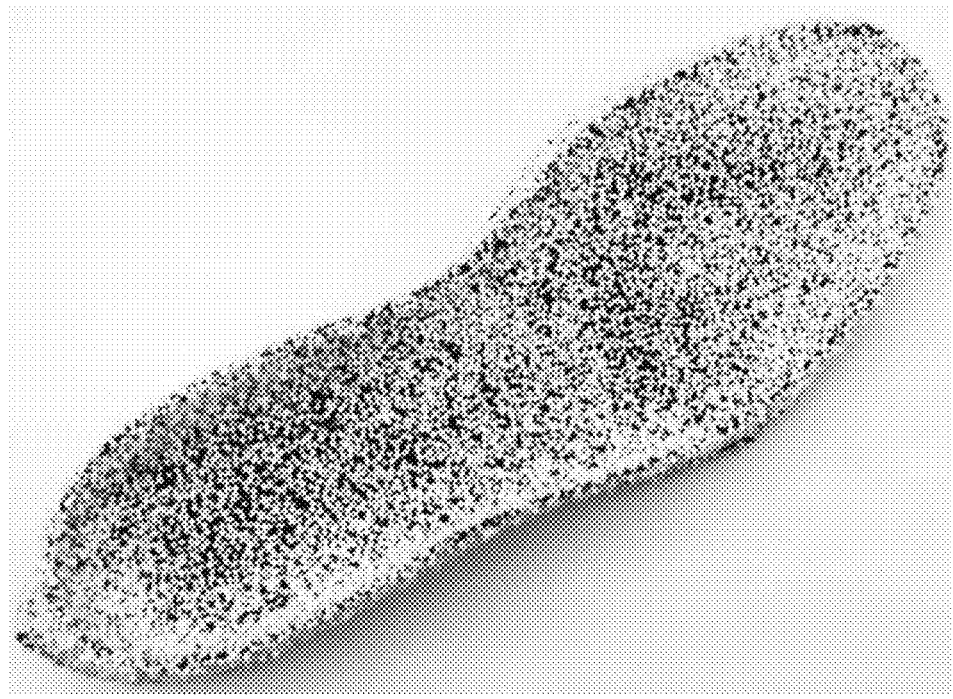
FIG. 20 shows an image of a representative midsole prepared using the disclosed methods. Briefly, white foam particles were arranged, then were affixed to one another by depositing a black-colored energy-absorbing ink, followed by heating the foam particles to melt surfaces of the foam particles, thereby fusing them together.
Figure 21:
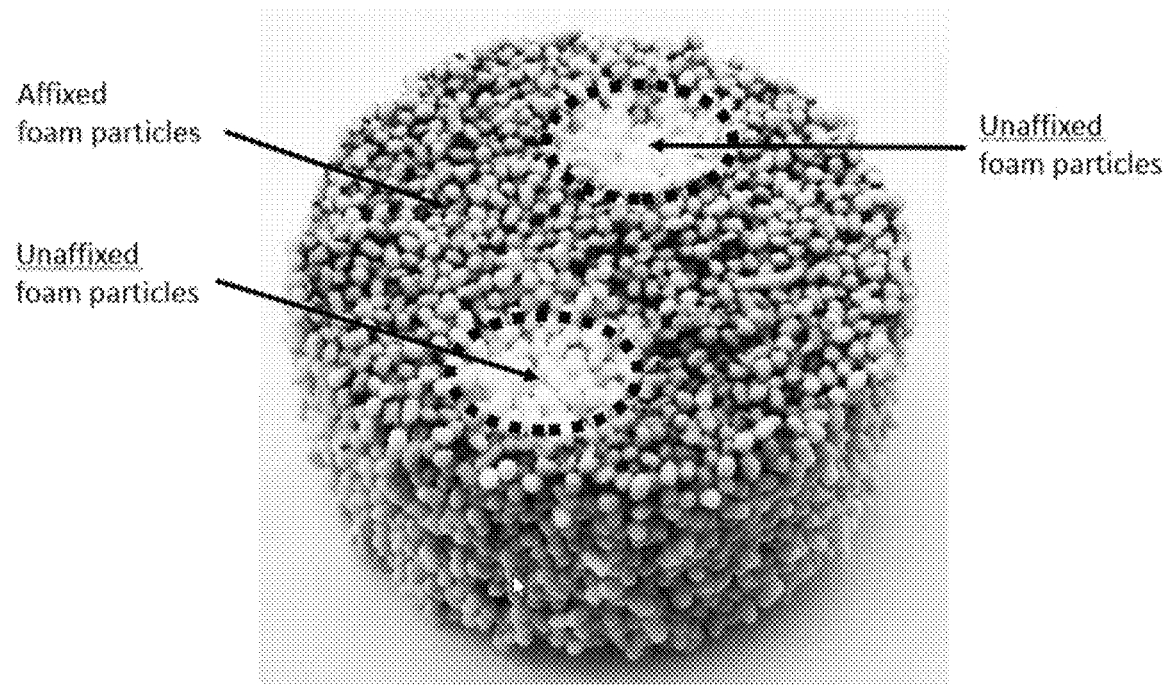
FIG. 21 shows an image of a representative article prepared using the disclosed methods similar to those described for FIG. 20. The article comprises areas which were not subject to depositing of the energy-absorbing ink (the circular white areas apparent on the interior surface of the article), and as such, the foam particles are substantially unaffixed in these areas (see the figure for highlighting of the two areas with a dashed line comprising unaffixed foam articles and indicated by the appropriate arrows). The other areas of the article were subject to depositing of the energy-absorbing ink, followed by heating. As such, the foam particles in these areas are affixed to one another.
Figure 22:
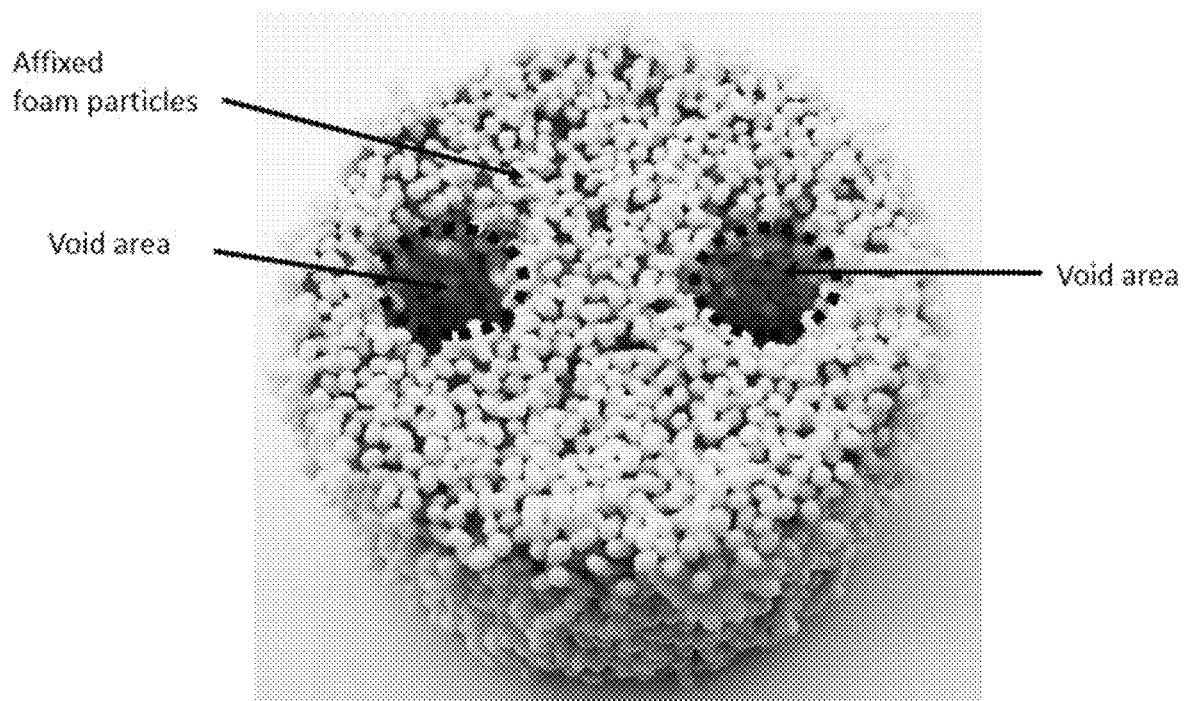
FIG. 22 shows an image the representative article described in FIG. 21. However, the foam particles in the areas comprising the unaffixed foam particles have been removed, thereby creating void areas (see the figure for highlighting with a dashed line of the two void areas in which unaffixed foam articles are removed and indicated by the appropriate arrows). The other areas of the article were subject to depositing of the energy-absorbing ink, followed by heating. As such, the foam particles in these areas remain affixed to one another.
Figure 23:
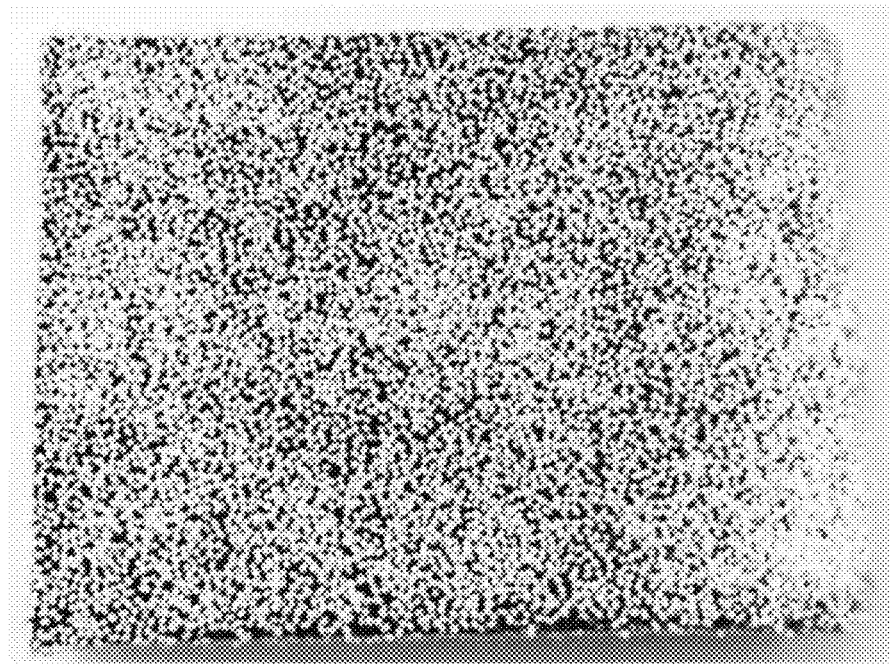
FIG. 23 shows an image of a representative article prepared using the disclosed methods similar to those described for FIG. 20. However, for the article shown, a greater concentration of the binder material was applied to the left side of the block as compared to the right side, such that the bulk density and the stiffness of the left side are greater than the right side.
Figure 24:
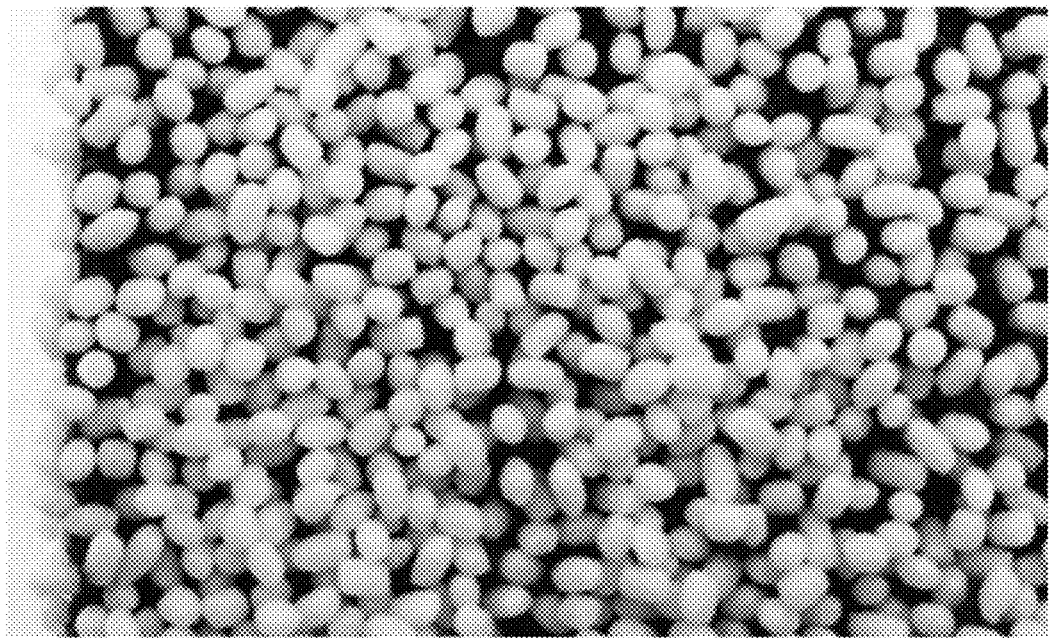
FIG. 24 shows an image of a section along the left edge of the representative midsole shown in FIG. 23 at higher magnification.
Figure 25:
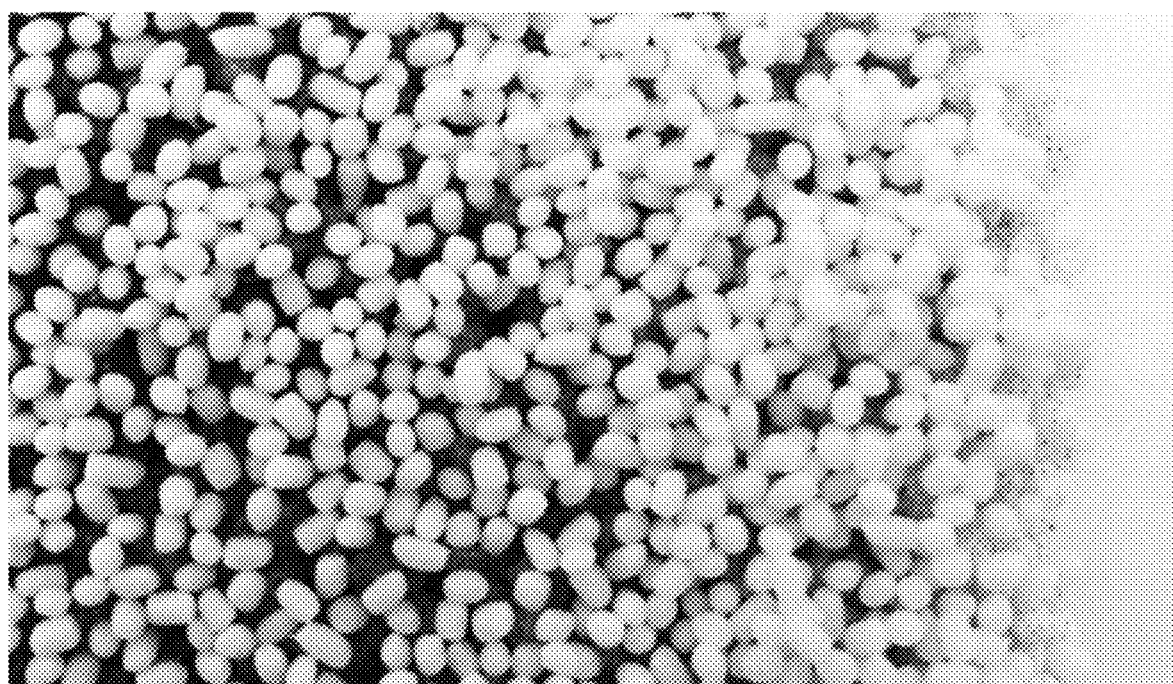
FIG. 25 shows an image of a section along the right edge of the representative midsole shown in FIG. 23 at higher magnification. The image shows individual spots formed by droplets of the binder material on the foam particles.

Exemplary articles were made using the methods and materials disclosed herein above (see FIGS. 14-16). Components were made from foam particles that were prepared using a thermoplastic block copolyester comprising crystalline (or hard) segments comprising polybutylene terephthalate and amorphous (or soft) segments comprising polyether (referred to herein as "thermoplastic COPE foam particles"). FIG. 14 shows an article comprising a plurality of affixed foam particles. The foam particles were prepared using a thermoplastic block copolyester comprising crystalline (or hard) segments comprising polybutylene terephthalate and amorphous (or soft) segments comprising polyether (referred to as "thermoplastic COPE foam particles"). The foam particles were arranged and affixed in a series of layers that were sintered in a manner that resulted in four solid pier structures elevated from a surface of foam particles with a central cavity with highly sintered edges. FIGS. 15 and 16 show a shoe midsole comprising thermoplastic COPE foam particles. The midsole in FIG. 15 is shown immediately post-production on the sintering platform and surrounded by loose, unsintered foam particles with the midsoles therein. Following removal of the unsintered foam particles, the clean midsoles are shown in FIG. 16.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure. It is intended that the specification and examples be considered as exemplary only, with a true scope and spirit of the disclosure being indicated by the following claims.

What is claimed:

1. A method of forming an article, the method comprising:
   decorating a portion of a plurality of foam particles, and
   arranging a plurality of foam particles, wherein the arranged plurality of foam particles comprises a first thermoplastic elastomeric material, and wherein the arranged plurality of foam particles has a number average particle size of about 0.04 millimeters to about 10 millimeters in a longest dimension; and
   affixing together at least a portion of the plurality of foam particles, wherein the arranging and affixing are carried out for two or more iterations, forming a component, wherein affixing together at least a portion of the plurality of foam particles comprises:
   depositing a binding material in a binding material target area, wherein the binding material target area comprises at least a portion of the arranged plurality of foam particles, and wherein the depositing coats at least a portion of defining surfaces of the arranged plurality of foam particles with the binding material; and
   curing deposited binding material coating at least a portion of the defining surfaces of the arranged plurality of foam particles within at least the binding material target area, wherein curing comprises affixing at least a portion of the arranged plurality of foam particles within the target area, wherein the curing comprises:
   applying energy within the infrared spectrum to the deposited binding material and the arranged plurality of foam particles in an amount and for a duration sufficient to soften the first thermoplastic elastomer material of the coated at least a portion of the defining surfaces of the arranged plurality of foam particles; and
   decreasing a temperature of the region of the arranged plurality of foam particles to a temperature at or below which the softened thermoplastic elastomer material re-solidifies, thereby affixing at least a portion of the coated at least a portion of the defining surfaces of the arranged plurality of foam particles in the binding material target area.

2. The method according to claim 1, wherein the decorating comprises:
   applying a coating on the portion; or embossing or debossing the portion; or both.

3. The method according to claim 2, wherein the applying the coating on the portion of the plurality of foam particles comprises printing on the portion, painting on the portion, dyeing the portion using a dye composition, applying a film on the portion, or any combination thereof.

4. The method according to claim 3, wherein the portion of the plurality of foam particles have a first color, and the coating has a second color which is different than the first color.

5. The method according to claim 1, wherein the arranging a plurality of foam particles comprises depositing an essentially planar layer comprising the plurality of foam particles.

6. The method according to claim 1, wherein the arranging and affixing are carried out for three or more iterations.

7. The method according to claim 6, wherein the decorating is performed during an iteration, after an iteration, between two or more iterations, or a combination thereof.

8. The method according to claim 6, wherein the decorating is performed on the component after the last iteration.

9. The method according to claim 1, wherein the decorating is performed between the arranging and the affixing.

10. The method according to claim 1, wherein the curing comprises solidifying the deposited binding material and binding the deposited binding material to the coated at least a portion of the defining surfaces of the arranged plurality of foam particles.

11. The method according to claim 3, wherein the printing comprises screen printing, pad printing, ink jet printing, 3D printing, flexographic printing, heat transfer printing, or any combination thereof.

12. The method according to claim 11, wherein printing comprises printing a marking onto at least a portion of an exterior surface of the component after forming the component.

13. The method according to claim 3, wherein dyeing comprises dyeing the foam particles, the affixed foam particles, the binding material, the component or a portion thereof, or combinations thereof.

14. The method according to claim 3, wherein applying the coating comprises applying a coating to the foam particles, the affixed foam particles, the binding material, the component or a portion thereof, or combinations thereof.

15. The method according to claim 2, wherein embossing or debossing the component or a portion thereof comprises: contacting a first surface of the component with a second surface of a relief device; and, following the contacting, removing the second surface of the relief device from the first surface of the component, while retaining an embossed or debossed texture on the first surface on the component.

16. The method according to claim 1, wherein the arranging a plurality of foam particles comprises arranging a plurality of first foam particles comprising a first thermoplastic elastomeric material and a plurality of second foam particles comprising a second thermoplastic elastomeric material.

17. The method according to claim 1, wherein the method comprises mixing together the plurality of first foam particles with the plurality of second foam particles prior to the arranging.

18. The method of claim 3, wherein the printing on the portion comprises depositing at least one ink formulation, the ink formulation of which includes an infrared-absorber, onto a target print area of the component, the target print area of which will be exposed to infrared radiation.

19. The method according to claim 3, wherein the dye composition includes infrared absorbing dye.

20. The method according to claim 19, wherein the infrared absorbing dye is added to the binding material at from about 0.001 weight percent to about 0.08 weight percent based on the total weight of the binding material.

* * * * *